United States Patent [19]

Durkos et al.

[11] 3,742,196
[45] June 26, 1973

[54] METHOD AND ELECTRONIC CONTROL FOR THE ANALYZATION OF SERUM CHEMISTRIES

[75] Inventors: Larry George Durkos, Indianapolis; Robert Wayne Cole, Zionsville; Jerry William Denney, Carmel, all of Ind.

[73] Assignee: American Monitor Corp., Indianapolis, Ind.

[22] Filed: Sept. 9, 1971

[21] Appl. No.: 179,135

[52] U.S. Cl..... 235/151.3, 235/151.35, 250/43.5 R, 250/218, 356/81, 356/204
[51] Int. Cl. .......................................... G06f 15/42
[58] Field of Search.................... 235/151.13, 151.3, 235/151.35; 250/43.5 R, 218; 356/39–42, 81–82, 201, 204; 23/230 M, 253 R

[56] References Cited
UNITED STATES PATENTS

| 3,528,749 | 9/1970 | Bowker........................... 356/204 X |
| 3,553,444 | 1/1971 | Tong............................... 235/151.35 |
| 3,633,012 | 1/1972 | Wilhelmson et al............. 235/151.3 |
| 3,609,047 | 9/1971 | Marlow........................... 250/218 X |
| 3,552,863 | 1/1971 | Smith.............................. 250/218 X |
| 3,428,796 | 2/1969 | Martens et al............. 235/151.35 X |
| 3,531,202 | 9/1970 | Wilkinson et al..................... 356/81 |
| 3,652,850 | 3/1972 | Briggs ........................... 250/43.5 R |

Primary Examiner—Eugene G. Botz
Assistant Examiner—Jerry Smith
Attorney—Verne A. Trask et al.

[57] ABSTRACT

An electronic control logic system for processing the results of a spectrophotometer analysis of a serum chemistry comprised of a serum and one or more chemical reagents. The spectrophotometer output representing air as a light path and another output representing the test chemistry as a light path are integrated and the air path integrated value allowed to exponentially decay until its value is equal to that of the integrated test chemistry path value. The decay time is converted into a train of digital pulses representative of the optical density of the test chemistry. These pulses are counted and their total stored for comparison with the corresponding optical density of a standard solution. The concentration of the element for which the particular test was designed to detect is known for the standard solution, so the percentage concentration of that element in the test chemistry may be thereby ascertained. Programable variations are provided to enable the evaluation of test results from a kinetic or an end point test. The results of the analysis, together with a test identification number and a patient identification number is selectively applied by a printer control logic section for suitable printing of the data.

10 Claims, 28 Drawing Figures

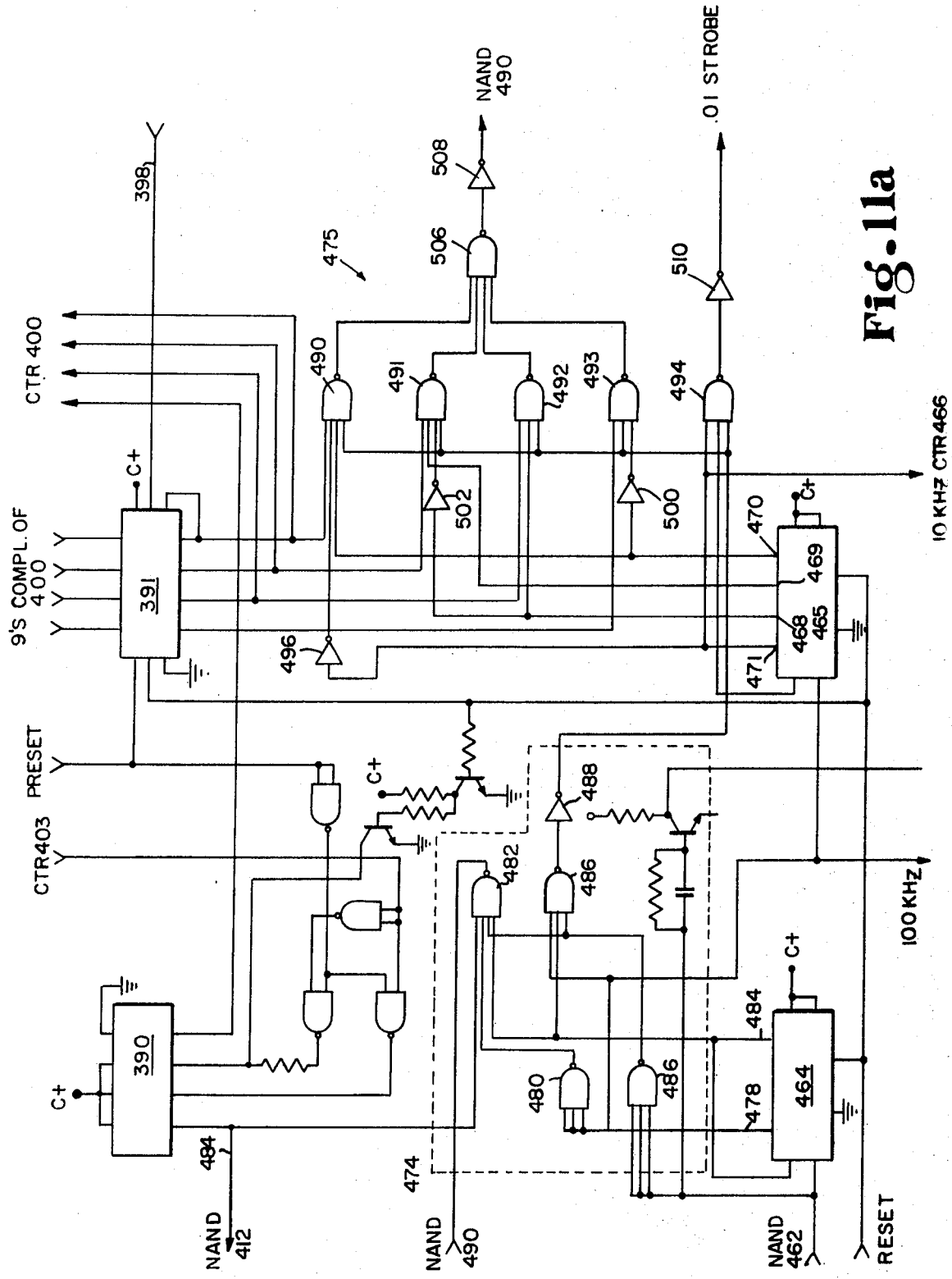

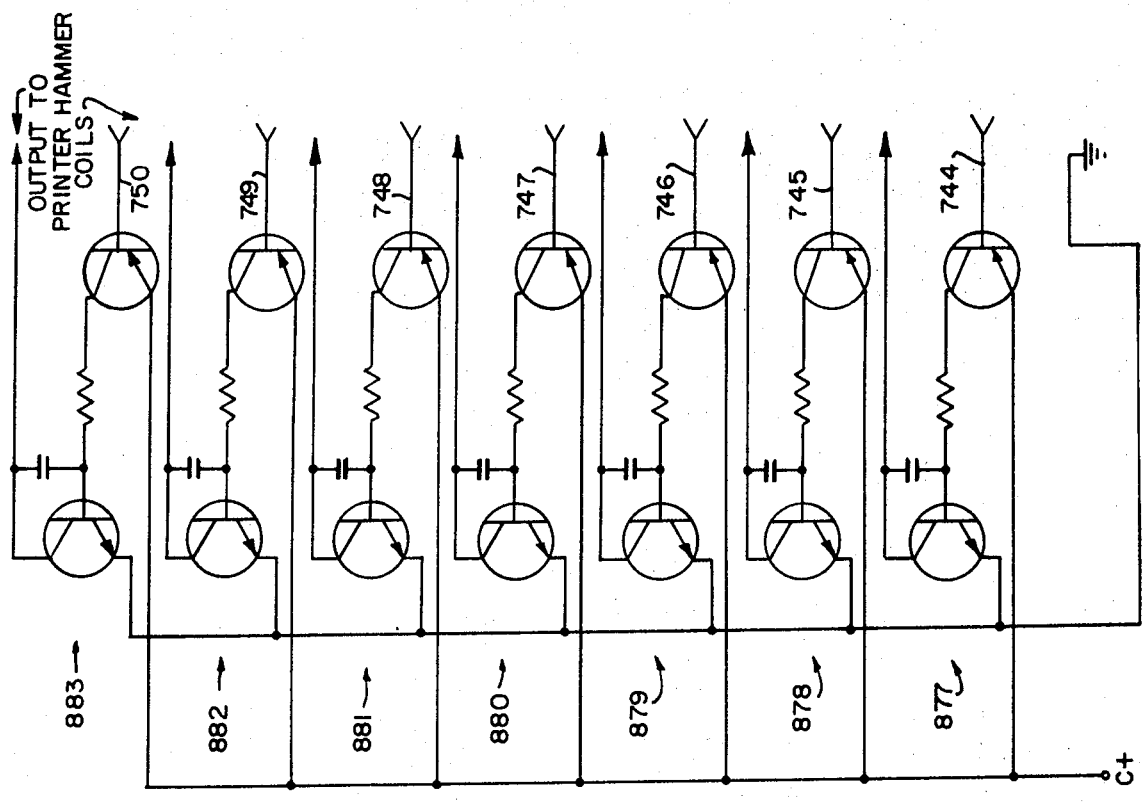
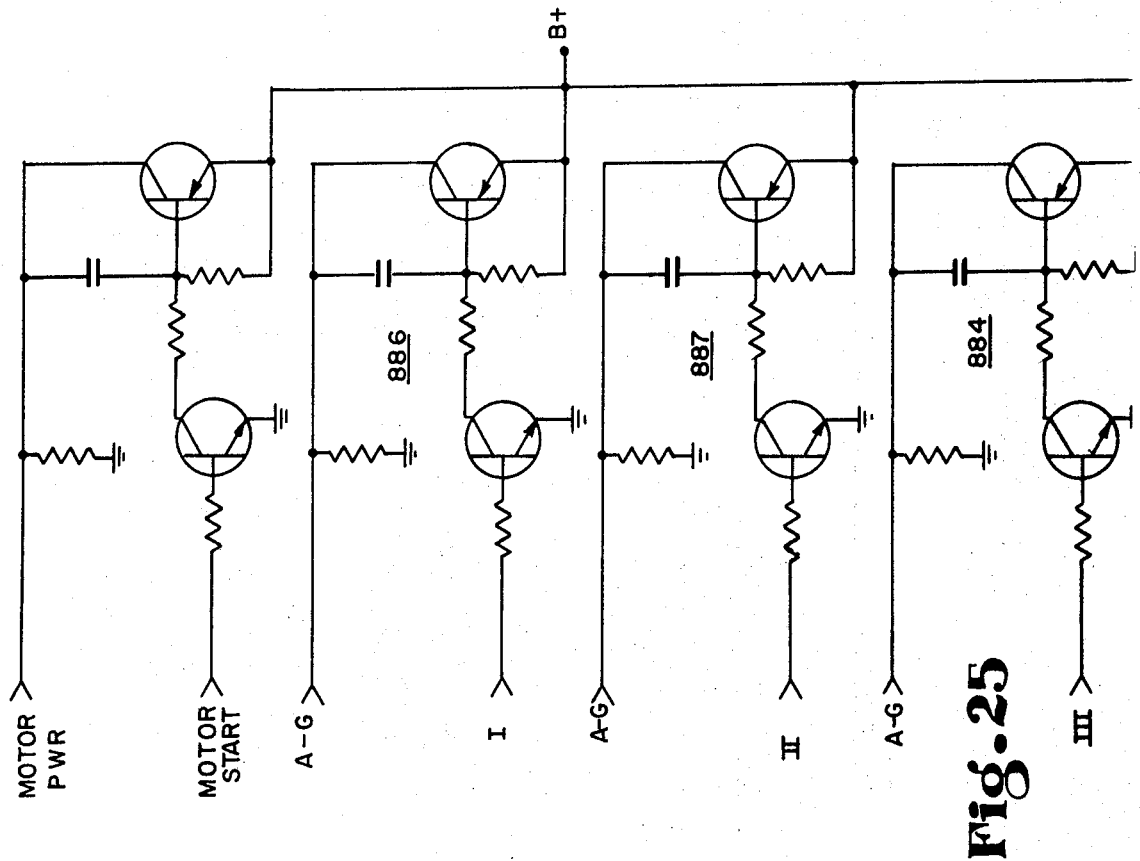
Fig. 25

METHOD AND ELECTRONIC CONTROL FOR THE ANALYZATION OF SERUM CHEMISTRIES

BACKGROUND OF THE INVENTION

This invention relates to an electronic system and method for processing a signal obtained from the electro-optical analyzation of a precisely prepared serum chemistry.

The chemical analyzation of a serum, e.g., for the presence of sugar or albumin content, or any of many other assays vital to medical diagnosis, is generally performed by adding specific amounts of various reactive chemicals or reagents to a sample of serum in a specific sequence and under specified conditions of temperature and time thereby causing a change in color or light absorbance to occur which is related to the amount of the substance being measured in serum. Various manual and automated procedures have been used.

Manual procedures are usually performed in a laboratory by a trained technician. The technician prepares a test sample, commonly referred to as a test chemistry, comprised of a portion of a serum specimen to be tested and the proper amounts of the chemical reagents specified for that particular test. The resulting test chemistry, after formulation, must be analyzed with specific care taken to note the extent to which a desired reaction has taken place.

The reaction evaluation is done using a spectrophotometer. The output of the spectrophotometer represents the amount of a certain band width of light which the chemistry under test passes with respect to the amount of the same band width of light passed by a sample containing all other constituents in the test except the serum. The level of this comparative transmittance must be then transformed into units which represent the element concentrations or optical density of the test chemistry to present meaningful data to the technician so that he might evaluate the test.

Disadvantages of manual procedures include not only an undue amount of time and labor, but this type of laboratory testing is at most, even under the most optimum conditions only proportioned to the skill of the technician.

Several systems have also been proposed and used which present the optical density of test chemistries by means of a strip recorder. This technique results in a cumbersome amount of data paper, along with the inherent reading problems which are highly susceptible to error.

SUMMARY OF THE INVENTION

In accordance with the invention, a serum chemistry may be loaded into the flow cell of a spectrophotometer for optical analysis. The difference in light transmittance between an air path and a path through the test chemistry is detected by a photomultiplier tube, the output of which is connected to an amplifier and associated control circuits. Feedback means may be provided to automatically adjust the voltage across the photomultiplier tube to provide changes in its sensitivity due to operating temperature or to the wave length of the observed light.

The position of the flow cell may be used to set up logic conditions to institute the selective integration at the amplified photomultiplier tube output for both the test and reference air paths. The integrated value of the reference path signal is always greater than that of the integrated value of the test path signal since the reference path consists of air while the test path consists of test solution. The integrated value of the reference signal may be permitted to logarithmically decay until it equals that of the integrated value of the test signal. The time required for the integrated reference signal to decay to the value of the integrated test value is proportional to the optical density at the test solution. This relies in part on the relationship that optical density is equal to the logarithm of the incident light minus the logarithm of the transmitted light. The required decay time is transformed into a proportional digital pulse train and selectively placed in an optical density memory.

The processing of the digital representation of the optical density of a test chemistry is done under the control of a logic programmer section. This programmer section receives information from a programmed card which is interpreted by a card reader in a manner explained and described in a co-pending application, U. S. Ser. No. 179,133.

Several different types of tests may be programmed each of which require the processing of the optical density signal in a different manner. For the most part, the end point light absorbance of the reaction between a serum sample and test reagents is observed. The optical density of the reacted test chemistry may be compared within a calculation portion of the electronic system to that of a serum blank or a reagent blank. In the performance of the former, two serum samples are mixed with two different combinations of reagents to effect two different test reactions. The optical density of the first test chemistry must then be compared with the optical density of the second test chemistry to obtain the desired comparative optical density.

An end point reagent blank test requires that a chemistry consisting of reagents alone must be first spectrally analyzed and the resulting optical density reading stored for comparison with subsequent test chemistry readings. The test chemistries in this case are comprised of different serum samples all having the same reagents added to them.

A test may also be performed which requires that the optical density of the same test chemistry be ascertained at two precisely controlled points in time. Furthermore, it may be required that this be done for two or three such intervals to ensure that the reaction is taking place properly and is linear.

The arithmetic portion of the electronic system is preferably calibrated before the performance of any of the above tests to effect a standardization of the results with respect to a known base value and to simultaneously convert the optical density of the chemistries into concentration units. This calibration is completely automatic and may be done by the use of a solution with a known concentration. A solution, herein referred to as the blank and comprised of a full complement of reagents for a given test, is first placed in the flow cell for ascertainment of its optical density. The difference in optical densities of the blank and the specimen test chemistry may be stored in an optical density memory. The contents of this memory are used to alter the frequency of a known clock frequency. Unaltered clock frequency may be used to clock a counter at the same time that the altered clock frequency is used to clock a second counter. This has the effect of creating a ratio representative of the difference between the optical density of the blank reagent solution and the optical density of the standard solution. This standard value is stored so that all subsequent test results may be derived from it. The optical density of each of the solutions is proportional to its percentage concentrations so that by using a standard solution of a known percentage concentration to develop a proportionality constant based on optical density, the percentage concentrations of each of the test chemistries may be ascertained.

Printer logic may be provided which is able to sequentially and selectively present the test results, a patient identification number and the test identification number to a drum printer.

BRIEF DESCRIPTION OF THE DRAWINGS

The accompanying drawings illustrate the invention and, by way of example, show a preferred embodiment of the invention. In such drawings:

FIG. 25 is a schematic diagram showing a portion of the printer control logic.

DETAILED DESCRIPTION OF THE PREFERRED EMBODIMENT

Figure 1:
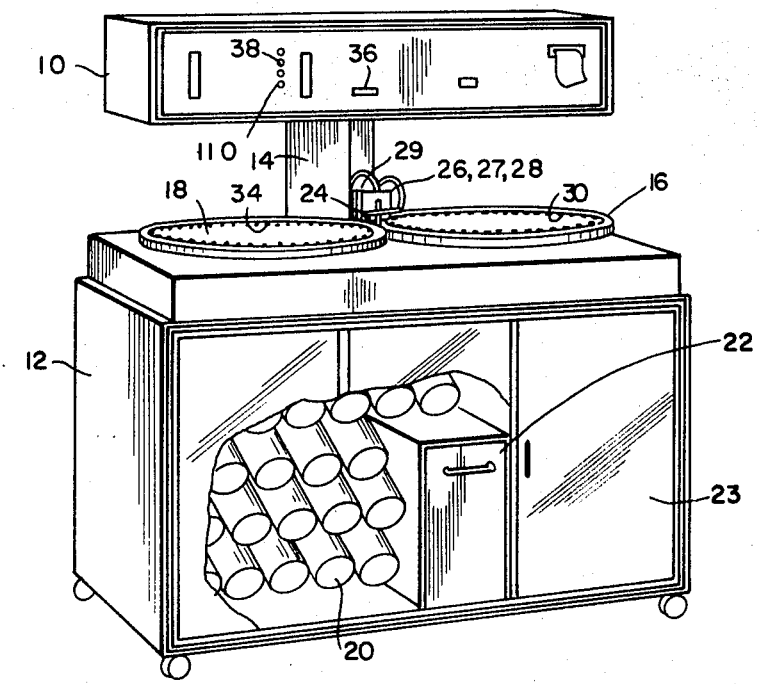
FIG. 1 is a perspective view of a machine compatible for use with the invention.

The chemical analyzation machine shown in FIG. 1 is for the serial analyzation of serum samples which have been obtained from respective patients by conventional means. The term "serum" is used to designate any animal fluid. This analyzation machine and the electronic control logic which controls its operation are shown and described in copending applications, U. S. Ser. No. 179,013 and U. S. Ser. No. 179,133 respectively.

By way of background, the machine shown in FIG. 1 comprises an upper housing 10 supported on a lower housing 12 by a post 14. A serum specimen wheel 16 and a test wheel 18 are supported in and by the top of the lower housing 12. The drive motor for these wheels 16 and 18 is located within the lower housing 12. The bottom portion of the lower housing 12 encloses an array of pressurized bottles 20, some of which are enclosed in a refrigerated compartment 22. These bottles 20 contain the various chemical reagents used in the performance of a serum analysis by the machine. They may be pressurized with inert nitrogen gas to prevent degradation of the reagents. Dark transparent doors on the front of the lower housing 12 permit the bottle compartment to be observed.

A serum transfer apparatus 24, a plurality of reagent dispensing heads 26, 27 and 28, and a test chemistry extraction head 29 are located in close proximity to the serum specimen wheel 16 and the test wheel 18.

Serum specimens may be placed in a plurality of specimen cups 30 which are carried in equally-spaced cavities in the top of the sample conveyor wheel 16. Each of the cavities is numbered and has a patient identification selection switch (not shown) associated with it. In a similar manner, test tubes 34 are carried in equally-spaced peripheral holes (not shown) in the test conveyor wheel 18. A serum specimen is appropriately taken from the specimen cups 30 in the specimen wheel 16 and transferred to a waiting test tube 34 in the test wheel 18 by the serum transfer apparatus 24. Properly selected reagents are added via the dispensing head 26, 27 and 28 to each of the serum samples which have been transferred to test tubes as the test tubes 34 are indexed through the dispensing stations. The resulting test chemistries are then serially extracted for subsequent optical analyzation as in a spectrophotometer or a fluorometer by the test chemistry extraction head 29. The spectrophotometer or fluorometer may be housed within the supporting post 14.

The electronic control circuitry for controlling each of these operations may be contained in the upper housing 10. This circuitry may be programmed by a specially prepared card which is inserted in a slot 36 leading to a card reader (not shown) also supported in and by the upper housing 10. An array of push buttons 38 may be located adjacent the card reader slot 36 for manually controlling part or all of the machine operations. An electronic measurement and reporting system consisting of the spectrophotometer, calculator, programmer and printer electronics in addition to a printer mechanism may also be housed in the upper housing 10 to convert the output signal from the spectrophotometer or like device into more usable forms of data such as milligram percentage concentrations.

The spectral analysis of fully complemented specimen test chemistries is conducted in a conventional spectrophotometer which has been modified to provide means by which the flow cell is moved in and out of a light path instead of disturbing that path with rotating mirrors or chopper and beam splitter techniques. The directing of the light beam is required so that its transmittance through air may be compared with its transmittance through the test chemistry in the flow cell.

Figure 2:
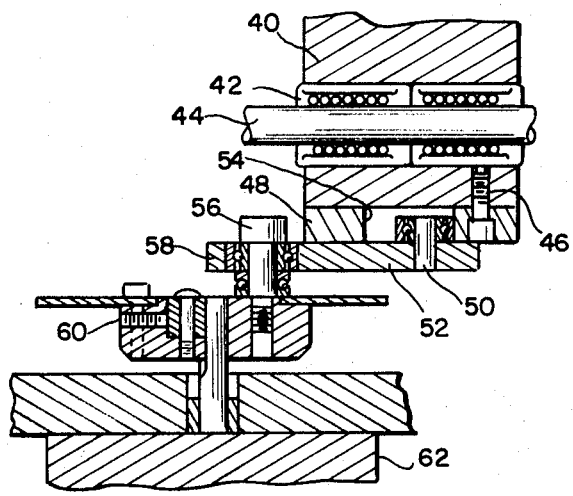
FIG. 2 is a vertical section view showing the reciprocating apparatus for the flow cell.

A flow cell 40 is shown in FIG. 2 with its associated reciprocating apparatus. This cell 40 is supported by bearings 42 on a rail 44 which permits and guides linear movement of the flow cell 40. The base of the flow cell 20 is connected, as by a pin 46, to a slotted member 48. A finger member 50 is mounted and is eccentrically driven on a wheel 52 and moves within the slot 54 in the slotted member 48. A shaft 56 is eccentrically mounted by a ball bearing 58 to its finger supporting wheel 52. The shaft 56 is connected to a second circular and rotating wheel 60 at a location offset from the center of rotation of that wheel 60. The latter wheel 60 is rotated at approximately 30 rpm by an electric motor 62. The finger supporting member 52 is eccentrically driven as the motor rotates this wheel 60 to reciprocate the flow cell 40 on its supporting rod 44. As can be seen from FIG. 2, this reciprocation serves to move the flow cell and the test chemistry contained therein in and out of the light path. The light source intensity 64 is highly regulated and prefocused. The reciprocation of the flow cell and test chemistry provides a continuous source of calibrating signals for the spectrophotometer. The electronic measurement and reporting system used to convert the spectrophotometer output into a more usable and meaningful form of data will be hereinafter described.

The above described machine is capable of performing what are known as end point serum blank tests, end point reagent blank tests and kinetic tests. In the end point serum blank test, an amount of each serum sample to be tested is placed in two consecutive test tubes 34 in the test wheel 18. One group of reagents is dispensed into and combined with the serum samples in one of the thereby associated pairs of test tubes, while a different set of reagents is added to and combined with the remaining serum sample. These two sets of reagents may have one or more reagents in common. The former being referred to as the blank and the latter being referred to as the test. It is required to measure the optical density (O.D.) of both the blank and test and subtract the O.D. of the blank from the O.D. of the test to obtain the desired results. The resulting difference of optical densities is proportional to the concentration of the material for which the test is designed to measure.

An end point reagent blank consists of adding the same combination of reagents to a number of test tubes and then adding a sample of water to the first tube, which is referred to as the reagent blank, and a different serum sample to each of the following tubes. In order to arrive at the desired test results, it is required to measure the optical density of the contents of each test tube and subtract from the optical density thereby measured the optical density of the reagent blank. The difference is proportional to the concentration of the material in the sample for which the test was designed to measure.

The kinetic test analyzes the rate of reaction of a specific combination of reagents and a serum sample. The test consists of measuring the rate of reaction of a specific combination of reagents and a serum sample. It is possible to do this by measuring the optical density of the test solution at a certain time, +1, and again at a subsequent time, +2, and subtract the difference between these readings. This may be repeated any number of times for the same test; and each time the results should be the same as long as the reaction rate is linear. It is important to determine if the rate is constant and to record results during that portion of the reaction. The optical density difference as a function of time may be calibrated by performing an identical test on a sample with a known concentration of the material for which the test is designed. The above described procedure may be performed in several ways. The first being that of placing the test solution in the flow cell and measuring its optical density at precisely controlled timed intervals. A second procedure, which provides for a higher overall rate of sample analysis involves placing an amount of one serum sample into three consecutive test tubes. Reagents are appropriately and selectively added to each of the three samples at a different point in time. Each group of three test chemistries are identical in composition when extracted and placed in the flow cell except that they are serially extracted at the end of precisely controlled time intervals. This latter method has been found to yield better and faster results, since the necessary time intervals have elapsed prior to placing the test chemistries in the flow cell.

Figure 3:
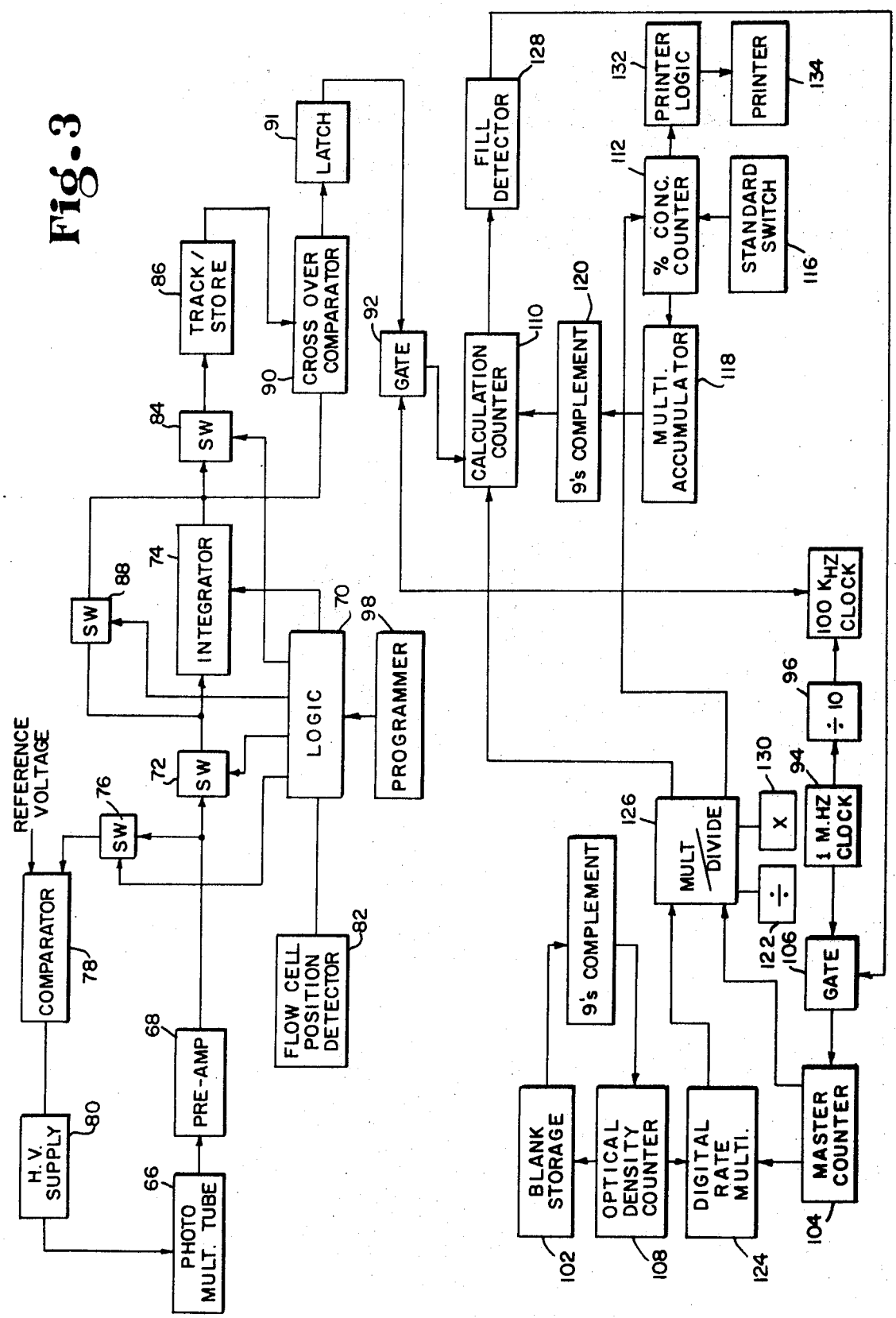
FIG. 3 is a block diagram showing the interrelationship of the various portions of the invention.

A block diagram is shown in FIG. 3 which illustrates in block form the electronic processing of the spectrophotometer output to transform the output into a more meaningful form of data to enable comparison with a standard solution whose characteristics are known. The light emitted by the light source, shown in FIG. 2 in conjunction with the flow cell 40, falls upon a photomultiplier tube 66. The output of the photomultiplier tube 66 is connected directly to a preamplifier 68 for converting the output current at the photomultiplier tube to a proportional DC level.

Assuming that the test chemistries are still being formulated in the test wheel 18, and that none have reached the flow cell for analysis as yet, the spectro module control logic 70 maintains a solid state switch 72 leading from the preamp 68 to an integrator 74 opens so that the preamp output is applied through a closed switch 76 to one input of a voltage comparator 78. A reference voltage is also applied to this comparator 78. The comparator 78 compares the preamp output with the reference voltage and uses the difference between the two to control a high voltage supply 80 for application across the photomultiplier tube 66.

The loop comprising the photomultiplier tube 66, the preamp 68, the voltage comparator 78 and the high voltage supply 80 is used as an automatic gain control and calibration adjustment for the photomultiplier tube 66. This adjustment is needed because the photomultiplier tube characteristics change a great deal with time and temperature, and because the photomultiplier tube does not have the same sensitivity over the entire light spectrum. This closed loop feedback condition permits the photomultiplier tube output to be stabilized with respect to the particular wave length of light which it will be concerned with in the upcoming test.

The presence of a first test chemistry to be analyzed in the flow cell is sensed by the spectro control logic 70 which then opens the switch 76 in the feedback path leading from the preamp to the high voltage supply 80 and closes the integrator switch 72 leading from the preamp 68 to the integrator 74. Preferably, this switch is also opened each time the empty flow cell interrupts the light path by the spectro control logic 70 acting on a signal from a flow cell position detection switch 82.

The flow cell position detection switch 82 signals the spectro control logic 70 when the flow cell is between the light source and the photomultiplier tube 66 and, conversely, when the flow cell is out of this path so that the light uninterrupted from the light source is incident on the photomultiplier tube 66. The photomultiplier tube 66, and thereby the preamp 68, have a higher DC level output when the light path comprises only air than when the light passes through a test chemistry and the flow cell. Both signals are important for later comparison.

The first signal to be applied by the preamp 68 to the integrator 74, after the integrator switch 72 has been closed, represents the amount a given wave length of light striking the photomultiplier tube after passing through a test chemistry. This DC signal is integrated by the integrator 74 for a specific length of time, as controlled by the spectro control logic 70. The integrator output is initially zero, but as it integrates the preamp output its output then become a ramp function.

The ramp function, as it is generated, is applied through a closed tracking switch 84 to a track and store network block 86. The tracking switch 84 is also controlled by the spectro control logic 70. The track and store network 86 tracks the integrator output until the integration interval is terminated by the spectro control logic 70. The termination signal is also used to open the tracking switch 84 which then causes the DC level to which the preamp output has been integrated to be stored in the track and store network 86.

The flow cell is then moved out of the light path from the light source to the photomultiplier tube 66. This movement is detected by the flow cell position detector switch 82 which signals the spectro control logic 70. The preamp 68 output now represents the photomultiplier tube output with only an air path between the light source and that tube 66.

The control logic 70 initiates a reference signal integration interval and causes the integrator 74 to integrate the preamp output for an amount of time precisely identical to the integration time for the test chemistry. The integrator 74 now integrates the DC signal representing the photomultiplier tube 66 output for an air path for an interval of time precisely equal to that of the integration interval for the test chemistry. At the conclusion of this interval, a decay switch 88 in a feedback path around the integrator 74 is closed by the control logic 70 which causes the voltage at the output of the integrator to decay exponentially.

It should be noted that if, at the end of both integration intervals, the integrator 74 output representing the air path, and the track and store circuit 86 output representing the test chemistry path were equal, it would mean that the optical density of the test chemistry is zero and that it has a light transmittance equal to that of air. This, however, is never the case even for an empty flow cell, so the light transmittance of a flow cell containing a test chemistry is always less than that of free air. The exponential decay of the air path reference integrator output is conducted as the first part of an analog to digital conversion of the light transmittance of the test chemistry with a simultaneous conversion to optical density units.

The exponential decay of the reference air path integrated output is continued until the decreasing signal is equal in amplitude to the signal level held by the track and store network 86. The comparison of the decaying signal and the track and store held signal is effected in a crossover comparator 90. The signal which closed the decay switch 88 also enabled a latch 91 coupled to the output of the crossover comparator 90 to allow the comparator output to be applied to one input of a counter gate 92. The output of a one megahertz clock 94 is divided by 10 by a division section 96 and the resulting 100 kilohertz clock applied to the other input of the counter gate 92. The output of the counter gate 92 is a train of pulses occurring at a 100 kilohertz rate when there is an enabling signal from the output of the comparator 74. This output is enabling only as long as coincidence has not been detected by the crossover comparator 90 between the track and store network 86 contents and the decaying integrating output. When such coincidence is detected by the comparator 90, the input from that comparator to the counter gate 92 is turned off, thereby stopping the pulse train.

It should be seen that the number of pulses in this train corresponds to the amount of time that the integrator output was permitted to decay before it reached the signal level of the signal held in the track and store network 86. It should also be seen that the pulse train represents or is proportional to the logarithm of the transmittance of light in an air path minus the logarithm of the transmittance of light through a test chemistry. This makes the pulse train proportional to the optical density of the test chemistry.

As previously mentioned, the entire analog to digital conversion as well as the light transmittance readings are taken under the control of the spectrophotometer control logic 70. This logic is appropriately controlled through a programmer 98 whose output signals to the control logic 70 reflect the particular test which has been selected on the program card, i.e., end point serum blank test, end point reagent blank or kinetic test. The remaining blocks of the calculator section will be explained with reference to the specific tests under way.

At the beginning of each of the tests mentioned a blank calibration is performed. The first test chemistry which would be put into a flow cell is either a reagent blank or a serum blank. In the end point reagent blank test the reagent blank is comprised of the reagents which the rest of the chemistries will receive but without any serum. The optical density of this blank is used, as will hereinafter be explained, to calibrate the calculator section 100 of the spectrophotometer processing logic. In the case of the serum blank test, the first test chemistry to reach the flow cell is a serum blank comprised of a serum specimen and reagents. The next chemistry to reach the flow cell subsequent to this one will be one comprised of the same serum with different reagents.

A blank storage register 102 for later storing the optical density of the reagent or serum blank is first reset to zero by the programmer 98. A master counter 104 which is clocked through a master counter control gate 106, the operation of which will be described later, from the 1 megahertz clock 94 is then reset to zero. An optical density counter 108 for storing the digital optical density of the solution in the counter part of the optical density of the solution in the flow cell is also reset to zero. A calculation counter 110 and the percentage concentration counter 112 used in the calculation of percentage concentrations are also reset to zero.

After the resetting phase is completed, the optical density counter 108 is preset with the nines complement of the contents of the blank storage register 102. The nines complement of the blank storage 102 is taken by a nines complement conversion block 114. Since the blank storage register 102 had been reset to zero, the nines complement preset into the optical density counter 108 would be equal to 1999. The percentage concentration counter 112 is then preset with the number which has been dialed in on a set of switches 116. This value represents the percentage concentration of a standard solution which will be placed in the flow cell at a subsequent point in time. A multiplier accumulator 118 is then preset with the percentage concentration in the percentage concentration counter 112. The nines complement is then taken of this value, which has been preset into the multiplier accumulator 118, by a nines complement converter 120. The nines complement of the known standard concentration is then preset into the calculation counter 110. The percentage concentration counter 112 is then reset to zero.

After completion of the above, the integration and analog to digital conversion is permitted to take place to determine the optical density of the blank solution in the flow cell. Up until this time, the feedback switch 76 in the preamp 68 feedback circuit has been closed when the flow cell was out of the light path which permitted the photomultiplier tube to be calibrated. The string of pulses representing the optical density of the flow cell and its contained blank solution is applied to the optical density counter 108 through the counter gate 92. The counter gate 92, as before explained, is opened when the correct number of pulses has been applied to the optical density counter 108. The value in the optical density counter is then preset into the blank storage register 102 and the nines complement of this value taken by the nines complementor 114 and the result preset back into the optical density counter 108.

The blank solution is then removed from the flow cell. The next chemistry to be put into the flow cell is the standard chemistry, the element concentration for which was dialed in on the standard switch input 116. The light transmittance of this chemistry is then determined and the analog to digital conversions repeated, with the optical density pulse train of the standard chemistry being put into the optical density counter 108 together with the nines complement of the optical density of the blank chemistry. The resulting number in the optical density counter represents the difference in optical density between the blank and the standard solutions.

The scale factor for use in all further percentage element concentration calculations must be determined using this difference between the blank optical density and the standard optical density. To do this, a 100 kilohertz clock is applied by the master counter 104 to a digital rate multiplier 124 and through a multiply and divide selector block 126 to the percentage concentration counter 112. The 100 kilohertz pulse train is multiplied in the digital rate multiplier 124 by the value in the optical density counter 108 to proportionately alter the frequency of the 100 kilohertz pulse train. The altered pulse train is applied through the multiply and divide block 126 to the calculation counter 110 which already contains the nines complement of the known percentage concentration of the standard solution. The calculation counter 110 and the percentage concentration counter 112 continue to be clocked by their respective clock lines until a fill detector 128 senses that a number of pulses have been received by the calculation counter 110 from the digital rate multiplier 124 equal to the known standard percentage concentration. This fill detector 128 is used to inhibit the master counter gate 106 which has heretofore been supplying the master counter 104 with clock pulses from the 1 megahertz clock 94. The number of pulses which have reached the percentage concentration counter 112 in this interval represent the scale factor which will be used as the basis for all subsequent tests. In effect, this procedure divides the dialed in standard concentration by the difference in optical density between the standard chemistry and the blank chemistry and stores the resulting value in the percentage concentration counter 112. As will be seen, the optical densities of the test chemistries will be multiplied by this normalized value to calculate their percentage concentrations. It should be seen that such calculated values will be in the same units as the standard concentration that was dialed in.

By way of example of the above process, assume an optical density difference between the blank solution and the standard chemistry of 0.5. The optical density counter 108 will then contain the binary equivalent of 0500. The multiply and divide section 126 enables the master counter 104 to apply 100 kilohertz clocking pulses to the percentage concentration counter 112. The 100 kilohertz clock is also applied to the digital rate multiplier 124 which multiplies this frequency by the number in the optical density counter 108, i.e., 0.500. The calculation counter 110 thereby receives 500 pulses each time the percentage concentration counter 112 receives 1,000 pulses. Assume further that the known standard concentration dialed in on the input switches 116 was represented by 1,000. The nines complement of 1,000 would now be in the calculation counter 110. By the time the calculation counter 110 has received the 1,000 pulses necessary to initiate the inhibiting action of the fill detector 128 the percentage concentration counter 112 will have received 2,000 pulses which represents the normalized value by which all subsequent O.D. values will be multiplied to ascertain the corresponding percentage concentrations. As a last step, the multiplication accumulator 118 is preset with this number, i.e., 2,000, and the programmer 98 is reset.

The actual test procedure is now ready for initiation. The blank storage register 102 contains the value of the optical density of the blank solution. The master counter 104, the calculation counter 110 and the percentage concentration counter 112 are all reset to zero. The optical density counter 108 is then preset with the nines complement of the blank storage register 102 which, in effect, is the negative of that number. The calculation counter 110 is then preset with the nines complement, from the nines complementor 120, of the scale factor contained in the multiplication accumulator 118.

By this time, a test chemistry has entered the flow cell and the photomultiplier tube 66 has an output which is applied to the preamp 68. Under control of the spectrophotometer control logic 70, this output is integrated and converted from an analog signal to the digital pulse train representative of the optical density of the test chemistry in the flow cell. This pulse train is then applied to the optical density counter 108 on top of the nines complement of the optical density of the blank solution which in effect subtracts the blank optical density from the test optical density. The value now in the optical density counter 108 represents the true optical density of the test chemistry.

The calculation of the concentration of the test chemistry with respect to that of the standard chemistry is now performed. The first step in this procedure is that the programmer logic 98 selects the multiplication portion of the multipler and divide circuit 126. This selection serves to route the digital rate multiplier 124 output to the input of the percentage concentration counter 112. A 100 kilohertz master counter 104 output is concurrently routed to the calculation counter 110. The master counter 104 begins on signal from the programmer clocking the percentage concentration counter 110 with its 100 kilohertz output.

The digital rate multiplier 124 multiplies the frequency of another 100 kilohertz output frequency clock of the master counter 104 by the optical density value in the optical density counter 108 and applies the resulting pulse train to the percentage concentration counter 112. This clocking continues until the fill detector 128 detects that the calculation counter 110 has received a number of pulses from the master counter 104 equal to the scale factor which originated in the multiplier accumulator 118.

At this time, the master counter gate 106 is inhibited, thereby prohibiting further pulsing of the master counter 104 by the 1 megahertz clock 94. The opening of the gate 106 also stops the pulsing of the percentage concentration counter 112. The contents of this counter 112 at this time represents the concentration of the test chemistry in the flow cell with respect to the known standard value. This value is applied through printer logic 132 to the printer 134 along with identification information.

At the beginning of an end point blank serum test the blank storage register 102, the master counter 104, the optical density counter 108, the percentage concentration counter 112 and the calculation counter 110 are all reset to zero. This resetting is performed at the conclusion of the blank and standard calibration explained above. The programmer 98 then presets the optical density counter 108 with the nines complement of the contents in the blank storage register 102. This register 102 was reset to zero, so the value of the nines complement is equal to 1,999. The calculation counter 110 is then preset with the nines complement; through the nines complementor 120, of the scale factor contained in the multiplication accumulator 118.

The programmer logic initiates, at this time, the analog to digital conversion of the light transmittance of the patient blank test chemistry in the flow cell at that time which is comprised of a serum specimen plus one or more reagents. The representative pulse train of the optical density of this patient blank is applied to the optical density counter 108. This value is then preset into the blank storage register 102, is nines complemented by the nines complementor 114 and is preset into the optical density counter 108.

The patient test chemistry is then examined by the photomultiplier tube 66 and the pulse train representing its optical density is applied to the optical density counter 108 which already contains the nines complement of the optical density of the patient blank. This results in the difference in optical density between the two residing in the optical density counter 108. The master counter 104 is then allowed to apply, through the multiplication and divide circuit 126, its 100 kilohertz pulses to the calculation counter 110 which already contains the nines complement of the standard scale value. The digital rate multiplier 124 multiplies another 100 kilohertz output of the master counter 104 by the contents of the optical density counter 108 and accordingly clocks the standard units value counter 112.

Again, when the fill detector 128 notes that the number of master counter pulses applied to the calculation counter 110 equals the standard scale factor, the detector 128 opens the master counter gate 106 from the one megahertz clock 94 to the master counter 104. The value in the percentage concentration counter 112 then represents the percentage concentration of the patient test with respect to the patient blank. This value is applied by the printer logic to the printer 134 along with identification information. The programmer 98 is reset at the conclusion of the test series.

The performance of a kinetic test requires a special calibration. This calibration includes resetting the blank storage register 102, the master counter 104, the optical density counter 108, the calculation counter 110 and the percentage concentration counter 112. The only other thing that occurs in the kinetic calibration mode is the presetting of the percentage concentration counter 112 with the standard percentage concentration value dialed in on the switches 116. The contents of the percentage concentration counter 112 is then preset into the multiplication accumulator 118 to complete the calibration for the kinetic test.

The kinetic test may be conducted in one of two different ways due to the difference in reactions possible in the various test chemistries. The first way involves the inspection of a test chemistry upon the elapse of two or more precisely controlled intervals of time. A rate of increase in optical density is looked for, thereby permitting the first test chemistry reading to be used as the base for all subsequent readings. The other type of kinetic tests involves a rate of decrease in optical density. To standardize this mode of operation, the standard element concentration is used and all subsequent readings taken in relation to that value.

For a kinetic optical density increase test, the blank storage register 102 and all of the counters 104, 108, 110 and 112 are reset to zero. The optical density counter 108 is then preset with the nines complement of the contents of the blank storage register 102, which is 1999. The calculation counter 110 is then preset with the nines complement, through the nines complementor 120, of the scale factor contained in the multiplication accumulator 118. The sequence is then inhibited and the first digital pulse train representing the optical density of the test chemistry in the flow cell is put into the optical density counter 108.

The optical density counter contents is then preset into the blank storage register 102 and the sequence inhibited again until a second reading is taken of the test chemistry in the flow cell. The application of the digital pulse train representing the optical density obtained at the latter reading is put into the optical density counter 108 with the nines complement of the blank storage register contents, which serves to subtract the former from the latter.

The multiply and divide circuit 126 is then enabled to apply the 100 kilohertz output of the master counter 104 to the calculation counter 110 at the same time that the 100 kilohertz rate is multiplied by the contents of the optical density counter 108 in the digital rate multiplier 124 and applied to the percentage concentration counter 112. As before, when the number of pulses from the master counter 104 reaching the calculation counter 110 equals the standard value which originated in the multiplier accumulator 118, the fill detector 128 opens the master counter gate 106 and stops its enabling pulses.

The value in the percentage concentration counter at this time represents the change in optical density in the time interval between test chemistry readings. Several such pairs of readings may be obtained to ensure that the desired linear reaction is taking place. This value is then applied to the printer logic 132 which controls the printer 134 accordingly.

An optical density loss kinetic test, as previously mentioned, is used to determine the rate at which the optical density of a test chemistry decreases from that of a known standard starting point, Initially, the blank storage register 102 as well as all of the counters 104, 108, 110 and 112 are reset to zero. The calculation counter 110 is then preset with the nines complement of the scale factor from the multiplication accumulator 118. Further sequencing is inhibited until a first light transmittance reading is obtained from the test chemistry and the value obtained converted to an optical density pulse train and clocked into the optical density counter 108. The contents of this counter 108 is then preset into the blank storage register 102, nines complemented by the nines complementor 104 and preset into the optical density counter 108.

A second reading is then taken of the light transmittance of the test chemistry, and the resulting optical density pulse train applied to the optical density counter 108 on top of the nines complemented value of the first reading. The resulting contents of the optical density counter 108 is then equal to the net change in optical density of the test chemistry in the time interval between the two readings.

This value is then preset into the blank storage register 102 and nines complemented before reinsertion in the optical density counter 108. The multiplier line in the multiply and divide circuits 126 is selected by the programmer 98 and the 100 kilohertz output from the master counter 104 is thereby applied to the calculation counter 110. Concurrently, the nines complement of the change in optical density during the time interval is multiplied by the rate of the 100 kilohertz pulses received by the digital multiplier 124 from the master counter 104.

The fill detector 128 detects when the number of pulses from the master counter 104 has reached the standard value already in the calculation counter 110 and terminates the one megahertz clock 94 input to the master counter 104 by inhibiting the clock gate 106. The value in the percentage concentration counter 112 represents the amount the optical density of the test chemistry decreased from that of the standard value during the reaction time interval. This value is applied by the printer logic 132 to the printer 134 for appropriate print out.

It should be understood that the type of kinetic test, i.e., an increasing or decreasing optical density analysis, may be controlled two different ways. One way has just been described in that the programmer 98 changes the electronic processing of the signals in accordance with the type of test under way. Instead of changing or reversing the electronic calculation of the test analysis, the order in which the test chemistries are placed in the flow cell may be reversed to effect the same reversal as that done by the programmer 98.

Figure 4:
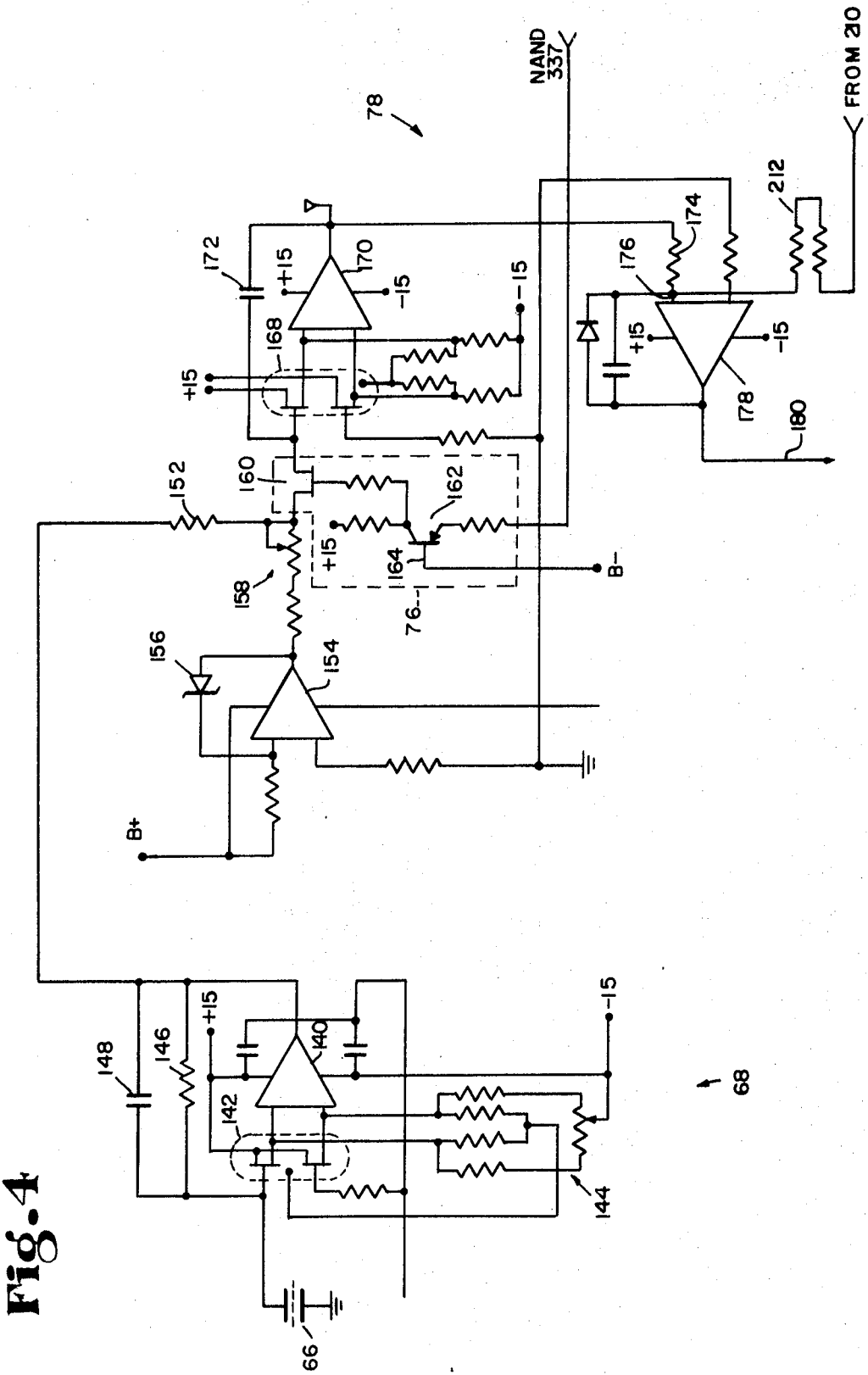
FIG. 4 is a schematic diagram showing the pre-amp and voltage comparator.
Figure 5:
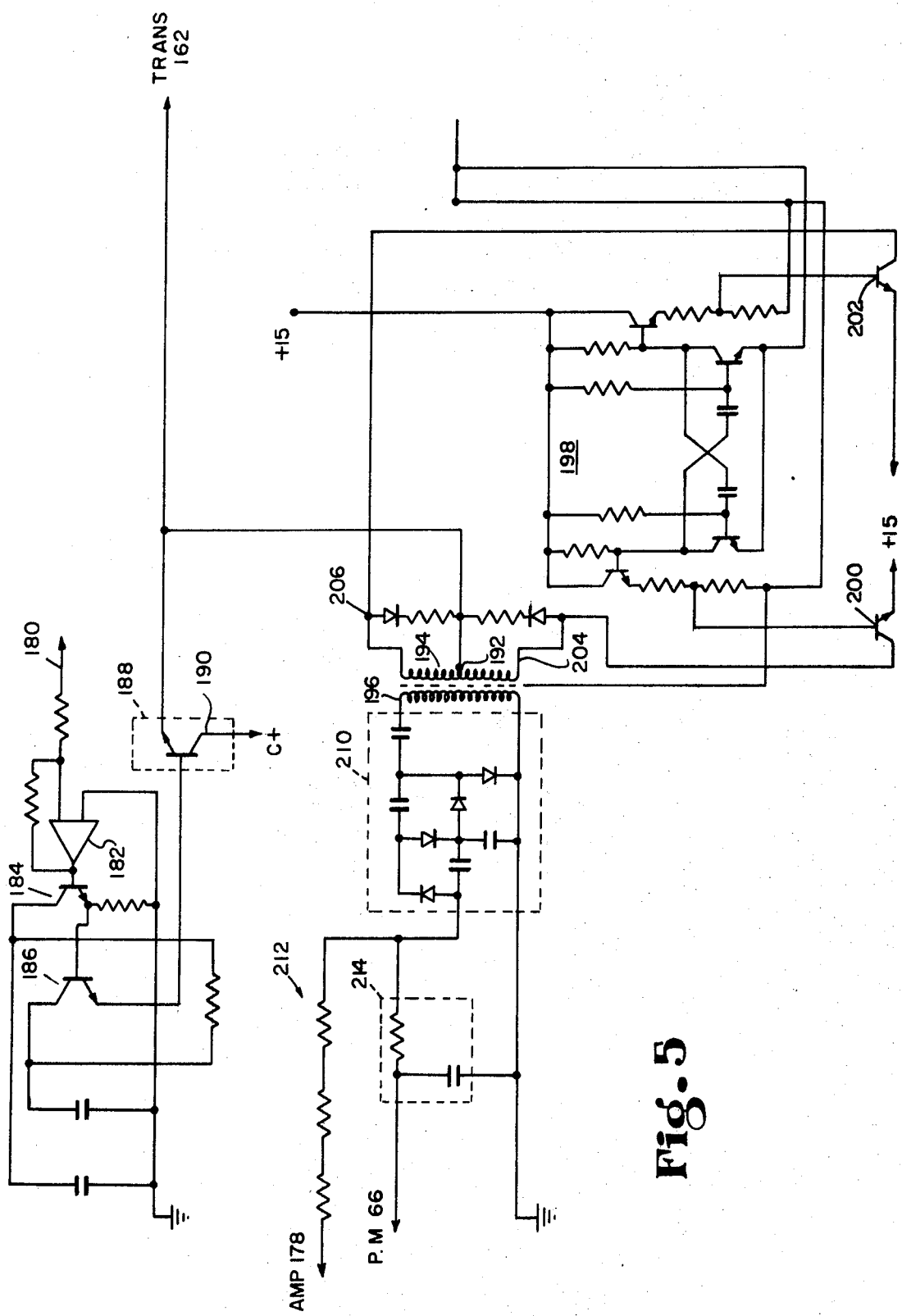
FIG. 5 is a schematic diagram showing the high voltage supply and its control.

The actual circuit configuration for the photomultiplier tube output preamp 68 and the combination high voltage supply and comparator 80 and 78 in the automatic gain control path from the output of the preamp 68 to the photomultiplier tube 66, is shown in FIG. 4 and FIG. 5. The comparator 78 and high voltage supply 80 maintain and adjust the sensitivity and gain of the photomultiplier tube resulting from temperature and light frequency variances. The pre-amp 68 includes an operational amplifier 140 with a dual field effect transistor (FET) 142 connected across its input leads. A resistive balancing network 144 may be used to adjust the operational amplifier input offset voltage.

The photomultiplier tube 66 is connected to the operational amplifier input FET 142 in a current mode. The photomultiplier tube receives light from the light source and creates a current, due to photoelectric emission, proportional to the intensity of the light reaching it. The output of the operational amplifier (op-amp) 140 is a DC voltage whose level is proportional to the amount of current received by it from the photomultiplier tube. Feedback is provided for the op-amp 140 by a resistor 146 connected from the output of the amplifier 140 to its input. A capacitor 148 is connected in parallel to this resistor 146 to provide high frequency gain suppression.

The pre-amp output is applied to a current summing point 150 in the comparator 78 through a resistor 152. The reference voltage is applied to the comparator 78 from a reference operational amplifier 154 whose input is supplied from a B+ voltage supply. A Zener diode 156 is used as feedback for the operational amplifier 154 to establish the reference voltage at the output of the op-amp 154. The current resulting from the voltage drop across an adjustable resistor 158 of the reference amplifier 154 output is summed at the current summing point 150 with the current originating at the pre-amp output 68.

An FET 160 and its biasing transistor 162 comprise the feedback path switch 76 in the pre-amp to comparator path of FIG. 3. The path from the drain to the source of the FET 160 is closed by the spectro control logic 70 which places a true signal on the base 164 of the biasing transistor 162. Current either flows into or out of the drain 166 of the FET 160 according to the difference between the pre-amp output and the reference amplifier output 156. The resulting voltage applied to the dual input FET 168 of a first stage comparator op-amp 170 is the difference between the pre-amp output and the B+ reference voltage.

The feedback path switch 76 is opened by the flow cell position detection switch 84 as the empty spectro flow cell is moved into the light path to interrupt the light reaching the photomultiplier tube 66. The output of the operational amplifier 170 which is the negation of the voltage on its input 150 is retained when the feedback switch 76 is opened by a feedback capacitor 172 which has charged to this value.

The retained voltage on the output of the first stage comparator op-amp 170 is applied across an input resistor 174 to the summing junction 176 of a second stage comparator op-amp 178. The output terminal 180 of this op-amp 178 is connected to the variable high voltage supply source 80. More specifically, the output terminal of the second comparator op-amp 178 is inverted by an inverting amp 182 before passing through a pair of current amplifiers 184 and 186. The output of the second current amplifier 186 is connected to the base of a power amplifier transistor 188. The collector 190 of this transistor 188 is connected to a highly regulated voltage supply C+. The output of the power gain transistor 188 is applied to the center tap 192 of the primary winding 194 of a step-up transformer 196. The two ends 204 and 206 of the primary winding 194 are alternately connected to ground by a chopping multivibrator 198 whose two outputs are connected to power switches 200 and 202. The two leads 204 and 206 of the primary winding 194 of the transformer 196 are also respectively connected to these power switches 200 and 202. The secondary 208 of the step-up transformer 196 is connected to a voltage doubling and rectifier circuit 210. This voltage doubling circuit 210 has two outputs, one through resistors 212 to the summing junction 176 of the second comparator operational amp 178; and the other output is connected through a resistor - capacitor filter circuit 214 to power the photomultiplier tube 66.

The output of the voltage doubling circuit 210 which is applied through resistors 212 to the summing junction 176 of the second comparator op-amp 178 is summed at that point with the output voltage of the first comparator 170 which is the difference between the output of the pre-amp 68 and the output of the reference voltage op-amp 154. The summing junction 176, due to the characteristics of the operational amp 178, must be maintained at zero voltage, or a virtual ground. The output voltage moves up and down to effect this zero voltage maintenance. In terms of the photomultiplier tube 66, the moving around of the voltage on the output 180 of the second comparator amp 178 serves as an automatic gain control and sensitivity adjustment.

The placing of a test chemistry in the flow cell and the flow cell being positioned in the light path, as signalled by the flow cell position detection switch 82, signals the spectro control logic 70 to open the pre-amp feedback switch 76 and to selectively close the integrator switch 72 leading from the pre-amp 68 to the integrator 74.

Figure 6:
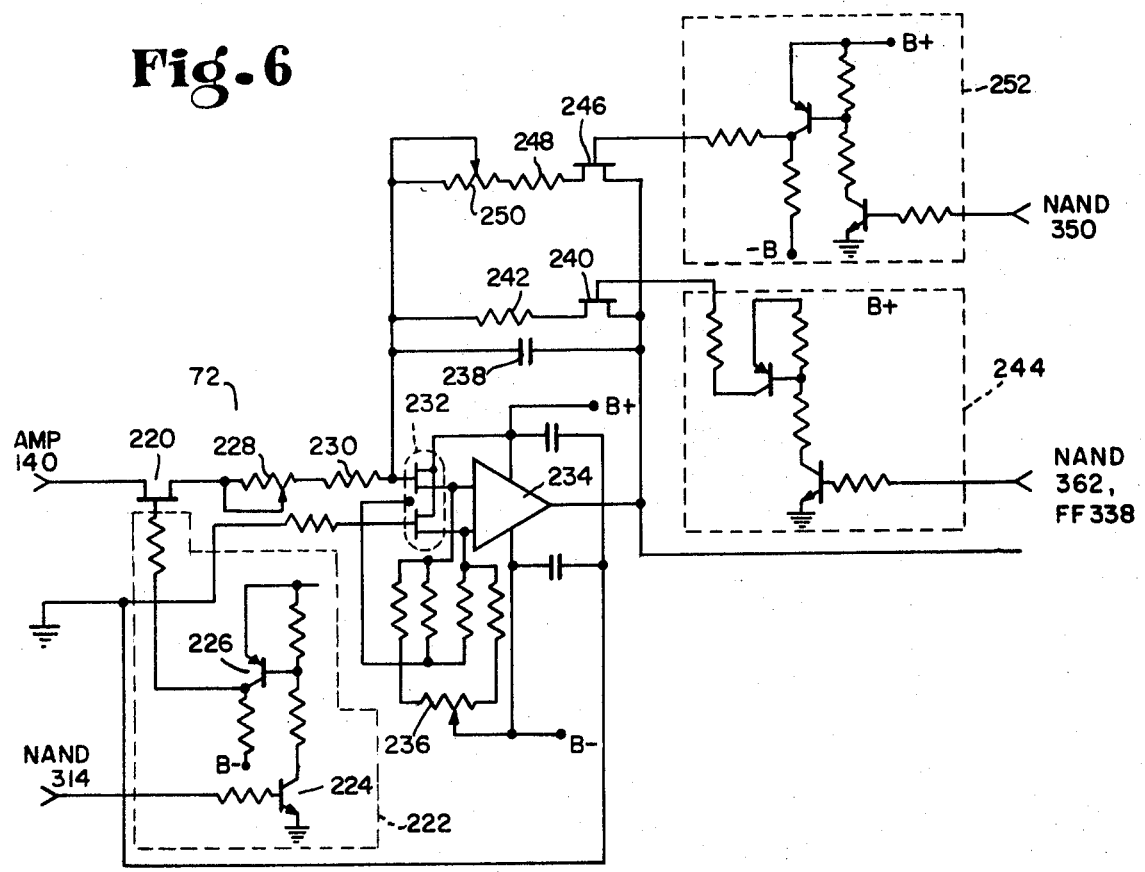
FIG. 6 is a schematic diagram showing the integrator and its controlling switches.

The switch 72 and integrator 74 are shown in detail in FIG. 6. The integrator switch 72 is comprised of an FET 220 which is controlled from a biasing network 222. The biasing network 222 receives a true or positive voltage input from the spectro control logic 70 for the period of time during which the integrator 74 is to integrate the output of the pre-amp 68. The precisely controlled integration interval is preferably 160 milliseconds in duration. During this interval, the positive voltage applied to the base of the first transistor 224 is inverted and applied to the base of a second transistor 226 which again inverts the voltage to apply a positive voltage to the gate of the FET 220 to turn the FET on. During its ON period, the FET 220 permits the output of the op-amp 140 in the pre-amp 68 to be applied through a potentiometer 228 and resistor 230 to the gate of a dual FET 232.

This dual FET 232 serves as the input device for the op-amp 234 providing a very low input bias current for the op-amp. The input offset voltage for this op-amp 234, as well as the gate to source FET resistance, is balanced by an adjustable resistance balancing network 236 connected to the other input of the integrator amp 234. Three feedback paths are selectively provided for the amp 234. The first contains the integrating capacitor 238. The second feedback path contains an FET integrator resetting switch 240 and a serially connected resistor 242. The FET switch 240 is turned on by a biasing network 244 identical to the one hereinbefore described when a positive or true voltage is applied to this network 244.

The third feedback path is provided through an FET switch 246, a serially connected precise resistance 248 and a potentiometer 250. The FET 246 is controlled by a positive signal applied to its biasing network 252.

Figure 7:
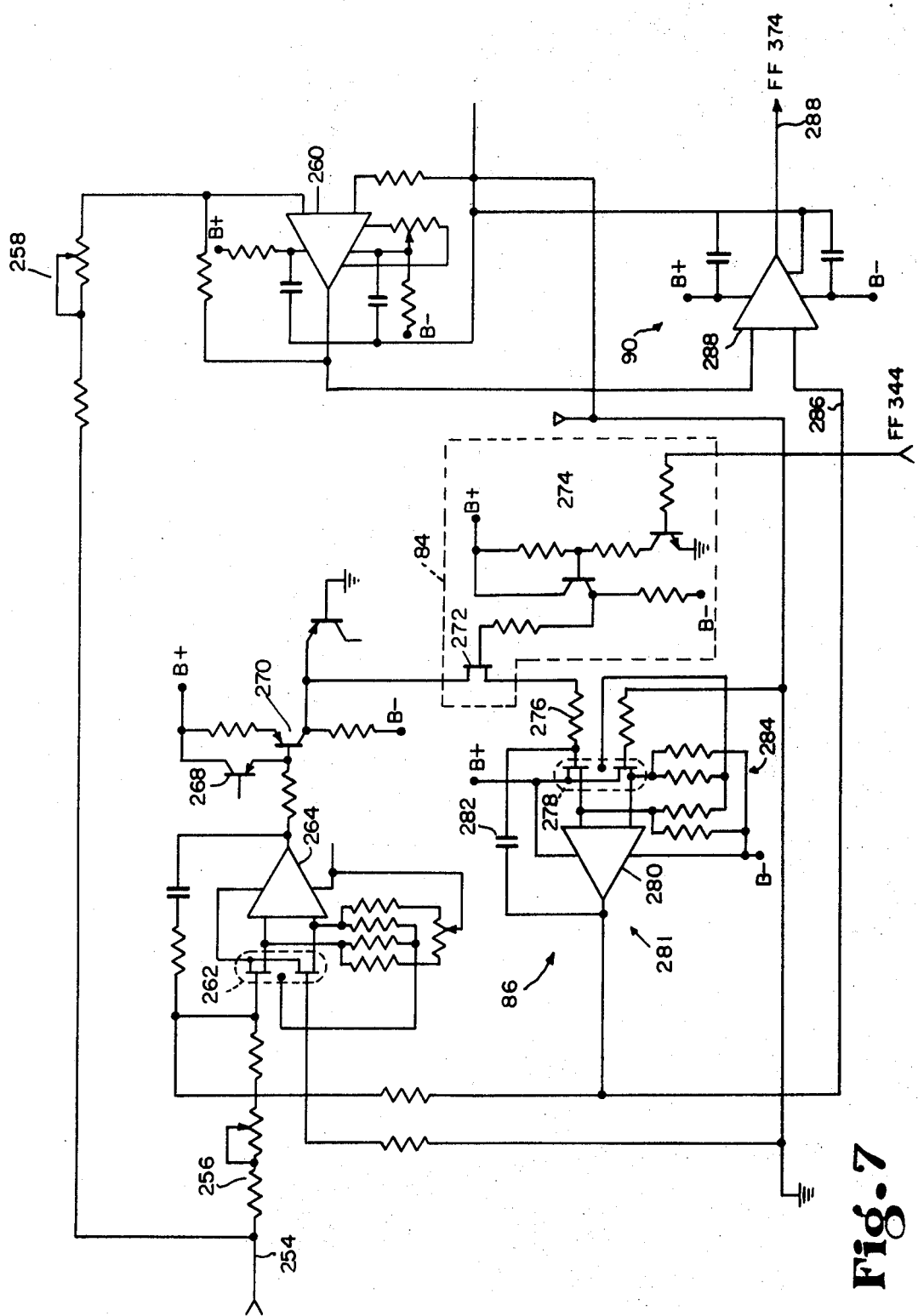
FIG. 7 is a schematic diagram showing the track/store control logic and the cross-over comparator control logic.

The output conductor 254 from the integrator amp 234 is connnected to one side of an input resistor 256 of the track and store network 86 shown with the comparator 90 in FIG. 7. It is also connected to one side of a resistor 258 serving as an input for an inverting amplifier 260 in the crossover comparator 90. The other side of the former resistor 256 is connected to the gate terminal of a dual FET 262 serving as the input device for an op-amp 264. The op-amp 264 inverts the incoming signal from the integrator op-amp 234 and applies it through a resistor 266 to the emitter of a transistor 268 used as a Zener diode. The base of this transistor 268 is unconnected. The transistor 268 maintains a voltage on the base of a linear mode transistor 270 of approximately 9 volts to 15 volts DC. The output signal from the second transistor 270, taken from its base electrode, is applied to the drain of an FET 272 which, with its biasing network 274, comprises the track and store switch 84. This switch 84 is closed by a positive signal on its input conductor 276 from the spectro control logic 70 during the integration interval occurring when a test chemistry is being examined. When this switch 84 is closed, the output from the linear mode transistor 270 is connected by the FET 272 to the input resistor 276 leading to the gate of a dual FET 278.

The dual FET 278 is the input device for an integrating amp 280. Feedback for the op-amp 280 is obtained through a feedback capacitor 282. A resistive network 284 is connected to one input of the op-amp 280 to balance the input offset voltage of the operational amp 280. The op-amp 280 integrates the input from the linear mode transistor 270 to negatively duplicate the main integrator 74 output. This integrating op-amp 280 continues to integrate and follow the output of the integrator 74 until the expiration of the test chemistry integration interval which causes the spectro control logic 70 to open the track and store input switch 84.

The removal of the input to the integrator 281 stops the integration, but the DC level to which the output has risen is maintained by the feedback capacitor 282. The output of the integrator 281, it should be noted, is also applied to the input 286 of an op-amp 288 serving as the basis for the crossover comparator 90.

The inverting amplifier 260 to which the output of the integrator 74 is also connected provides a negation of the integrator output and applies such inverted signal to the other input of the crossover comparator op-amp 288.

In operation, two identical length integration intervals are associated with the analysis of each test chemistry. The first of these is used to integrate the pre-amp 68 output when the test chemistry and flow cell are in the light path falling on the photomultiplier tube 66. The second interval is used to integrate the pre-amp 68 output when the flow cell is retracted and the light falling on the photomultiplier tube 66 passes through only an air path. Each of these integration intervals is 160 milliseconds long. At the beginning of the first of these intervals, the integration switch 72 is turned on to permit the output of the op-amp 140 in the pre-amp 68 to be applied to the input of the integrating operational amp 234. This DC signal is integrated causing the output of the integrator amp 234 to rise in a ramp function. The ramp function is applied to the first operational amp 264 in the track and store section and is limited to a certain voltage range by the transistor 268 used as a Zener diode. The resulting DC voltage level is applied through the track and store switch 84 to the input of a second integrator op-amp 280 which integrates the signal for application to one input 286 of the crossover comparator 288.

The conclusion of the test integration interval signals the control logic 70 to open the track and store FET switch 272 thereby removing the input from the integrating amp 280 so that the DC level to which the output has risen is maintained across the feedback capacitor 282. The expiration of the test integrating interval is also used, at a delayed point in time to close the FET 240 in the second feedback path for the integrating amp 234 to provide a rapid discharge of the integrator capacitor 238. This discharge returns the integrator output to zero.

The flow cell, at the conclusion of its two second inspection cycle, is removed from the light path to the photomultiplier tube 66. This movement is sensed by the flow cell position detection device 82 which signals the spectro control logic 70 to begin the second integration interval. This second interval is used to integrate the output of the preamp 68 corresponding to the photomultiplier tube output when the path from the light source is comprised of air only. During the air integration, the integrating amp 234 output is again applied to an amp 264 in the track and store tracking integrator by the closed track and store switch 84. The integrating amp 234 output is also applied through an inverting amplifier 260 to the crossover comparator 288. The output of this comparator, as will be seen hereinafter, is inhibited until the termination of the air integration interval.

At the conclusion of the second, or air integration interval, the integrator 74 has integrated to a DC level which is greater than that to which it integrated for the test integration interval. This occurs because the light transmittance of air is always greater than any other material. The FET 246 in the top or third feedback path around the integrating operational amp 234 is turned on by a true pulse from the spectro control logic 70 which also removes the inhibit on the comparator output latch 91. The closed feedback switch provides a discharge path through the resistor 248 and adjustable potentiometer 250 for the integrator capacitor 238. The output voltage on the integrating amp 234 is thereby caused to exponentially decay. The exponential decay continues until the crossover comparing op-amp 288 senses that the output of the integrator 74 has decayed to a DC level equal to that of the DC voltage stored in a track and store integrator 281. When such coincidence is obtained, the output of the comparator amp 288 goes false. The amount of time which the output of the comparator op-amp 288 was true after the initiation of the integrator output decay is proportional to the optical density of the test chemistry which was examined.

The output of the comparator op-amp 288 is connected to a latching circuit 91 which applies the crossover comparator output to the optical density counter gate 92 only on command from the control logic 70. The latching of this signal by the latch 91, will hereinafter be explained in connection with the spectro control logic 70. In general, the latch 91 applies the output of the crossover comparator 90 to the optical density counter gate 92 at the beginning of the decay period on signal from the spectro control logic 70.

Figure 8:
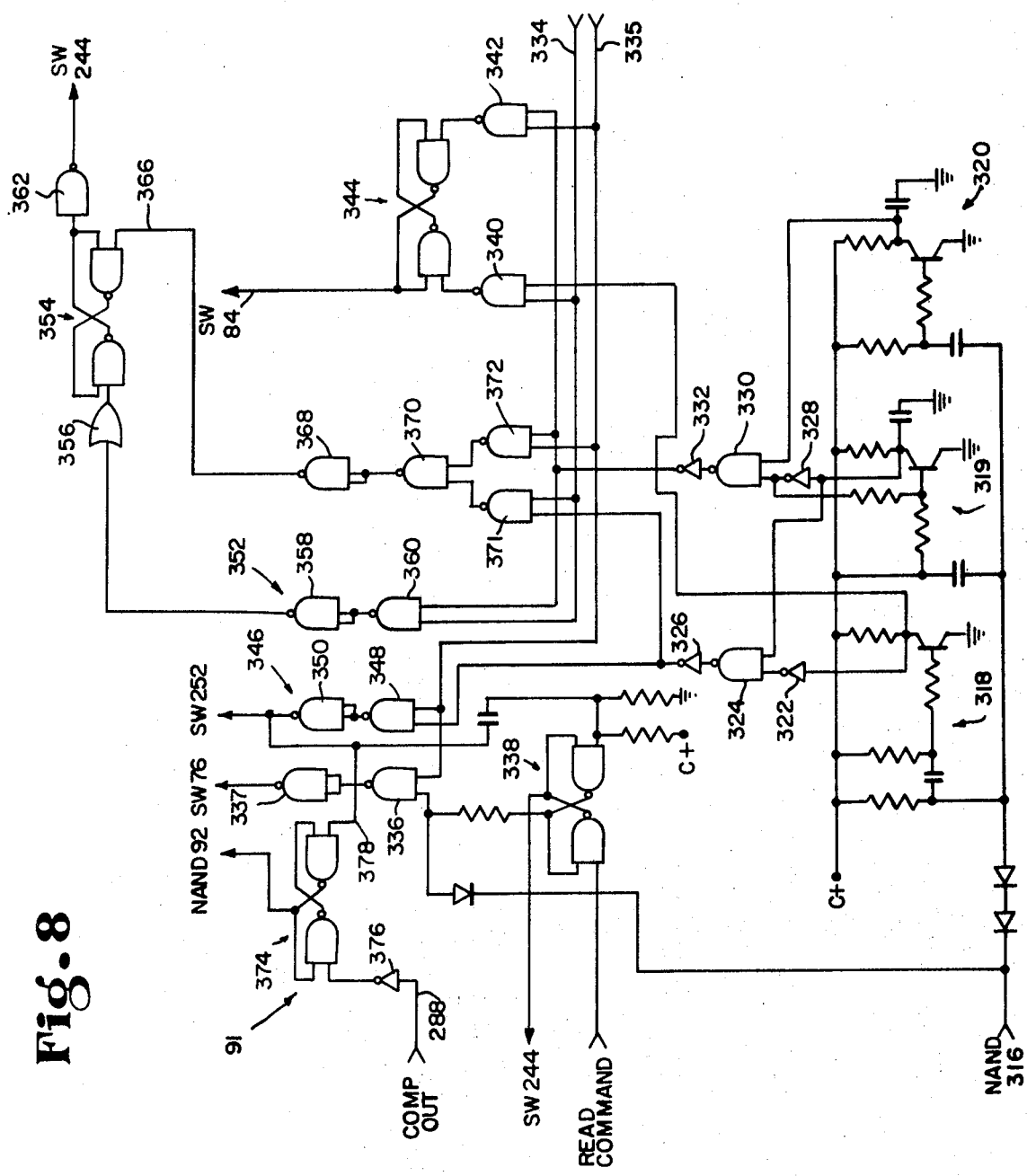
FIG. 8 is a schematic diagram of the spectrophotometer control logic.
Figure 9:
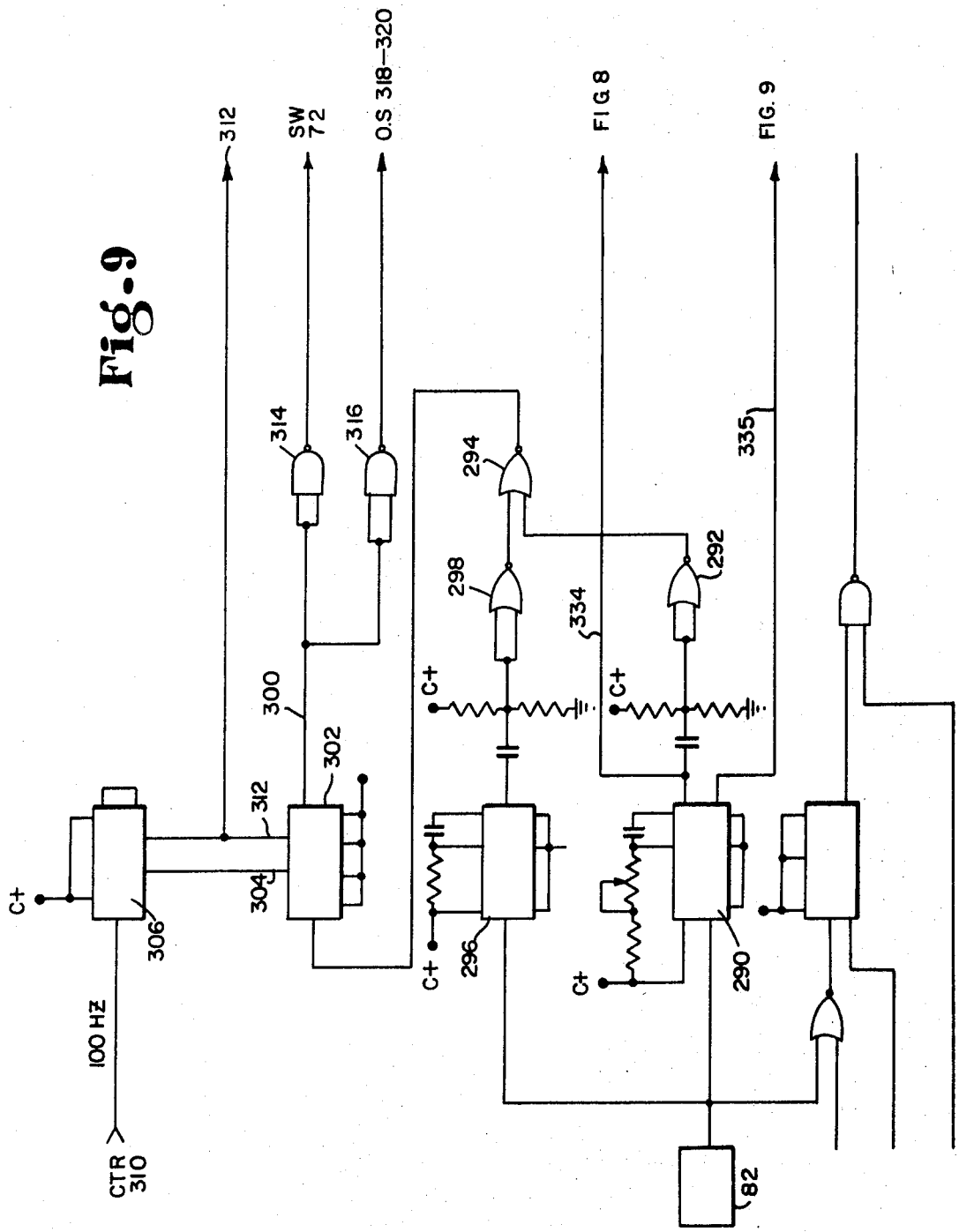
FIG. 9 is a schematic diagram showing part of the spectrophotometer logic control.

The spectro control logic 70 is shown in detail in FIGS. 8 and 9. It should be recalled that the flow cell is moved into the light path of the spectro for two seconds and out for two seconds. A signal from the flow cell position detection switch 82 applies a signal to a one-shot 290 in the spectro control logic 70 when the flow cell leaves the light path. The output of this one-shot, preferably having a duration of approximately 1.2 seconds, allows the flow cell to get out of the light path. The output is applied to a NOR gate 292. At the conclusion of the 1.2 second time period, the negative going edge of the output of the one-shot 290 allows the NOR gate 292 to place a positive pulse at the input of another NOR gate 294. The signal from the flow cell position detection switch 82 also initiates the timing cycle of a second one-shot 296 whose output lasts approximately 10 milliseconds. The trailing edge of the output of this one-shot 296 causes the output of a NOR 298 to which the one-shot 296 is applied to go positive for a short time. The output of this NOR 298 is also applied to the input of the NOR gate 294 so that whenever either of the NOR gate inputs go false the output will go true for the same amount of time.

The output of the one-shot controlled NOR gate 294 is connected to the preset input of a J-K flip-flop 302. One of the outputs 300 of this J-K flip-flop 302 is normally true, while the other output 304 is normally false. The normally false output 304 maintains a resetting signal on the reset terminal 305 of an integration interval counter 306 as well as holding a reset signal on the reset input 309 on a 100 hertz oscillator 310, shown in FIG. 10 as part of the programmer 98. This 100 hertz clock 310 is controlled by the 1 megahertz clock 94.

The 100 hertz oscillator 310 output is applied to the clocking input of the integration interval counter 306.

The expiration of the output signal of the 10 millisecond one-shot 296 results in a preset signal being applied to the J-K flip-flop 302. This reverses the signals on the two outputs of the J-K flip-flop 302 such that the formerly false output 304 now becomes true and the formerly true output 300 becomes false. This reversal removes the reset from 100 hertz oscillator 310 and the integration interval counter 306 so that the integration interval counter 306 begins to be clocked at 100 hertz.

On the 15th clock pulse, a conductor 312 connected to the $2^3$ output line of the integration interval counter 306 has a true signal applied to it. On the 16th count this line 312 goes false so that the flip-flop 302, which has its clocking impulse connected to this conductor 312, is clocked which again reverses the flip-flop outputs. This resets the 100 hertz counter 310 and the integration interval counter 306. This reversal also applies a true signal to the input of two NAND gates 314 and 316 which have their inputs connected to the now true terminal 300 of the J-K flip-flop 302.

The output of the first of these NAND gates 314 is connected to the integrator switch 72 between the preamp 68 and the integrator 74. The output of this NAND gate 314 was true during the time in which the integration interval counter 306 was able to count. The resetting of the integration interval counter 306 also removed the true output from this NAND gate 314 which opened the integrator switch 72 to stop the integration.

The output of the other NAND gate 316 is connected to initiate the action of three one-shots 318, 319 and 320 shown in FIG. 8. The second 319 of these one-shots has an output pulse twice as long as the first 318 and the third of these one-shots 320 has an output pulse width twice as large as the pulse width of the second one-shot 319. The output of the first one-shot 318 will hereafter be called $I_1$, the output of the second one-shot 319 will hereafter be called $I_2$ and the output of the third one-shot 320 will hereafter be called $T_3$. $T_1$ is inverted by an inverting amplifier 322 and applied to a NAND gate 324 to which $T_2$ is also applied. The output of this NAND gate 324 is inverted in another inverting amplifier 326 so that the pulse width of the output of the second inverting amplifier 326 is equal to $T_2$ minus $T_1$. In a similar manner, $T_2$ is inverted in an inverting amplifier 328 and applied to a NAND gate 330 whose other input is $T_3$. The output of this NAND gate 330 is negated by an inverting amplifier 332 so that the output of the second inverting amplifier 332 has a pulse width represented by $T_3$ minus $T_2$. These two signals $T_2 - T_1$ and $T_3 - T_2$ are used with the signals 334 and 335 from the 1.2 second one-shot 290 leading from the flow cell position detector switch 82. The first of these signals 334 goes true when the flow cell position detector switch 82 applies an input to the one-shot 290. The other one-shot output 335 only goes true at the end of the 1.2 second time interval of the one-shot.

The remaining portion of the spectrophotometer control logic 70 is comprised of the controls for the various functions hereinbefore explained. These functions are controlled by the use of the various time intervals, i.e., $T_1$, $T_2 - T_1$, $T_3 - T_2$, and the signals from the flow cell position one-shot 290 which are always opposite in sign.

More specifically, the high voltage feedback loop switch 76 (FIG. 3) is controlled through two NAND gates 336 and 337. The output signal from the latter NAND gate 337 is true only when the output of a read command flip-flop 338 controlled by the programmer and set when a test reading is sought by the programmer section 98 from the spectro logic section 99 is false. The other requirement for the high voltage gain adjust switch 76 to be closed is that the 1.2 second one-shot 290 has timed out, putting a true signal on its second output 335 which signifies that the flow cell is well out of the light path.

The control for the track and store enabling switch 84 comprises two NAND gates 340 and 342 and a flip-flop 344. The flip-flop 344 is normally set so that a true signal is present on its output 346 which keeps the track and store switch 84 closed, enabling the track and store circuit 86 to track the output of the integrator 74. The normally set condition of the flip-flop 344 is the result of the inputs from its controlling NAND gates 340 and 342. The inputs to the first of these NAND gates 340 are the time intervals $T_1$ and the output from the 1.2 second one-shot 290 which goes true for 1.2 seconds when the one-shot 290 is pulsed. This output will be called the "Q" output of the one-shot 290. Its other output will be called the "not Q" output. The inputs to the other NAND gate 342 are the $T_3 - T_2$ time interval and the "not Q" output of the 1.2 second one-shot 290. It should be recalled that the Q output of the one-shot 290 is true for 1.2 seconds after the flow cell position detection switch 82 initiates its operation. The "not Q" output of the one-shot 290 is always the opposite of the Q output. The $T_1$, $T_2$, and $T_3$ time intervals begin, as mentioned above, after the 160 millisecond integration interval has been completed. The Q input is always true during the first such integration interval, but since its trailing edge triggers the second integration interval it is always false during that second interval. During the first integration interval, the flip-flop 344 is in a set condition and has a true output. At the conclusion of that interval $T_1$ goes true to reset the output of the flip-flop to zero. This opens the FET 272 in the track and store switch 84 to store the output of the integrator 74 in the track and store circuit 86.

The output of the flip-flop 344 remains false until the trailing edge or conclusion of the second integration interval which is used to integrate the air path or reference pre-amp output. At this time, the "not Q" output of the one-shot 290 is true and, when the time interval $T_3 - T_2$ occurs, the output of the NAND gate 342 goes true to once again set the flip-flop 344 in preparation for the next test chemistry integration interval.

The expiration of the second integration interval begins the analog to digital conversion of the value to which the test chemistry photomultiplier tube output was integrated. The exponential decay control 346 is comprised of a control NAND 348 and an inverting NAND 350. The output of the inverting NAND 350 is connected to operate the FET 246 in the exponential decay switch 88 in the third path of the integrating op-amp 234. This FET 246 is rendered operational by a true output from the inverting NAND 350 in the exponential decay control 346. The conditions needed for this NAND 350 to have a true output are that the control NAND 348 have two true inputs. This condition occurs when the "not Q" signal of the one-shot 290 is true at the same time that the time interval $T_2 - T_1$ time interval at the conclusion of the second integration interval.

An integrator reset control 352 is also controlled by the various time intervals created in the spectro control logic 70. The setting of an enabling flip-flop 354 in this resetting control 352 is controlled through an OR gate 356, an inverting NAND gate 358 and a control NAND gate 360. The control NAND 360 has as its inputs the time interval $T_2 - T_1$ as well as the "Q" output of the 1.2 second one-shot 290. This combination of inputs to the control NAND 360 enables the inverting NAND 358 to have a true output at the conclusion of the first integration interval. The true output of the inverting NAND 358 is applied through an OR gate 356 to the setting input of the flip-flop 354. Another input to this OR gate 356 is from the flow cell position detection switch 82 which also applies a true signal to the flip-flop 354 when it is actuated. The combination of these signals to the input of the OR gate 356 set the flip-flop 354 when the flow cell moves out of the light path and again at the conclusion of the first integration interval. The output of the flip-flop 354 is used to close the FET 240 in the integrator 74 feedback path to rapidly reset the integrator output to zero.

The enabling flip-flop 354 has a resetting input 366 which is supplied to it through an inverting NAND gate 368 and three control NAND gates 370, 371 and 372. The outputs of the two latter NAND gates 371 and 372 are used to control the former gate 370. This configuration of NAND gates is such that only when both inputs of either of the latter two NAND gates 371 and 372 go true will the flip-flop 354 be reset. The first of these NAND gates 371 has its inputs the "Q" output of the 1.2 second one-shot 290 and the time interval $T_1$. This NAND gate 371 thereby causes the resetting of the flip-flop 354 only at the completion of the first integration interval. The second NAND gate 372 has as its inputs the "not Q" output of the 1.2 second one-shot 290 and the signal $T_3 - T_2$ so that this NAND gate 372 causes the resetting of the flip-flop 354 at the expiration of the $T_2$ signal subsequent to the second integration interval.

The output of the crossover comparator amplifier 288, as previously mentioned, is applied to the latching circuit 91. The latching circuit comprises a flip-flop 374 and an inverting amplifier 376 leading to the reset line of that flip-flop 374. The input to this inverting amplifier 376 is supplied from the op-amp output 288 in the crossover comparator 90. The setting input 378 of the flip-flop 374 is connected to the output of the inverting NAND gate 350 which, when it goes true, initiates the exponential discharge of the output of the integrating op-amp 234. The initiation of this discharge also sets the flip-flop 374 in the latching circuit 91. The flip-flop 374 continues in this condition until the output of the comparator op-amp 288 goes true signifying that the integrator 74 has been discharged until its output equals the value of the integrated test chemistry level. The comparator op-amp 288 output is inverted in the inverting amplifier 376 and the resulting false signal on the reset line of the flip-flop 374 resets the output of the flip-flop to zero. The amount of time for which this flip-flop 374 had a true output is thereby representative of the optical density of the particular test chemistry being analyzed.

Figure 10:
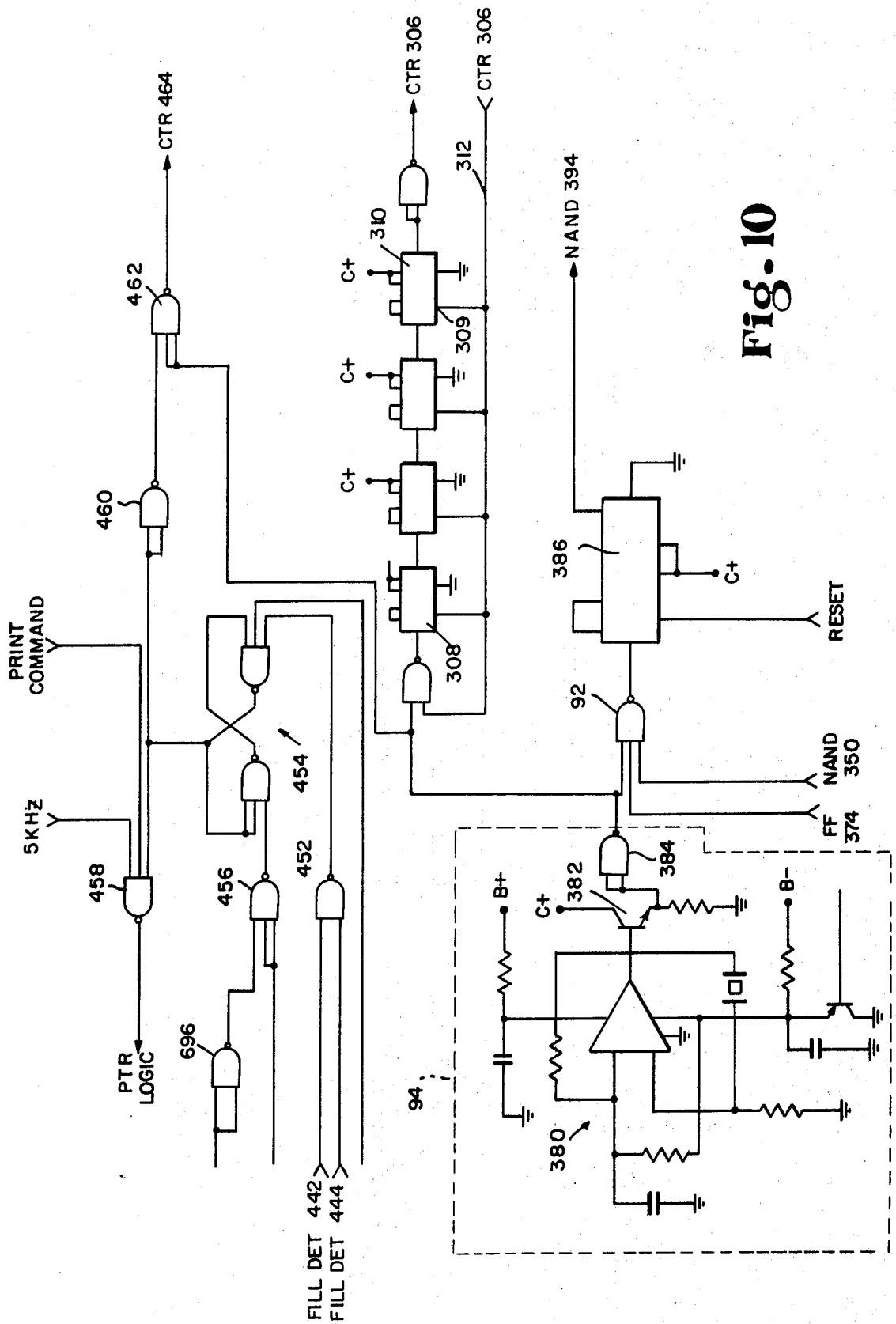
FIG. 10 is a schematic diagram showing the one megahertz clock source and its related gate and controls.

The output of the latching flip-flop 374 is connected as one input of the optical density counter gate 92 (FIG. 10). This gate is comprised of a NAND gate which has one other input from the one megahertz clock 94 and a third input from the output NAND gate 350 in the exponential discharge control 346. The 1 megahertz clock 94 is comprised of a one megahertz crystal oscillator 380 whose output is shaped by a transistor amplifier 382 and inverted by a NAND gate 384 before application to the gating NAND 92. A true signal at the input of the optical density control gate 92 from the latching circuit 91 and from the exponential discharge control 346 enables a 1 megahertz clocking pulse to be applied to a counter 386. This counter 386 is a binary coded decimal counter. Its output is taken from the $2^3$ weighted output line so that the line has a negative going signal on it every time the counter 386 has been clocked nine times by the 1 megahertz clock 94. This divides the clock frequency by 10. The resulting 100 kilohertz output clock pulses are applied to the optical density counter 108.

Each block element in the calculating section 100, as shown in FIG. 3, will be first explained individually with reference to the other blocks. The interaction of the blocks will be explained with more specificity when the details of the programmer 98 are explained.

Figure 11B:
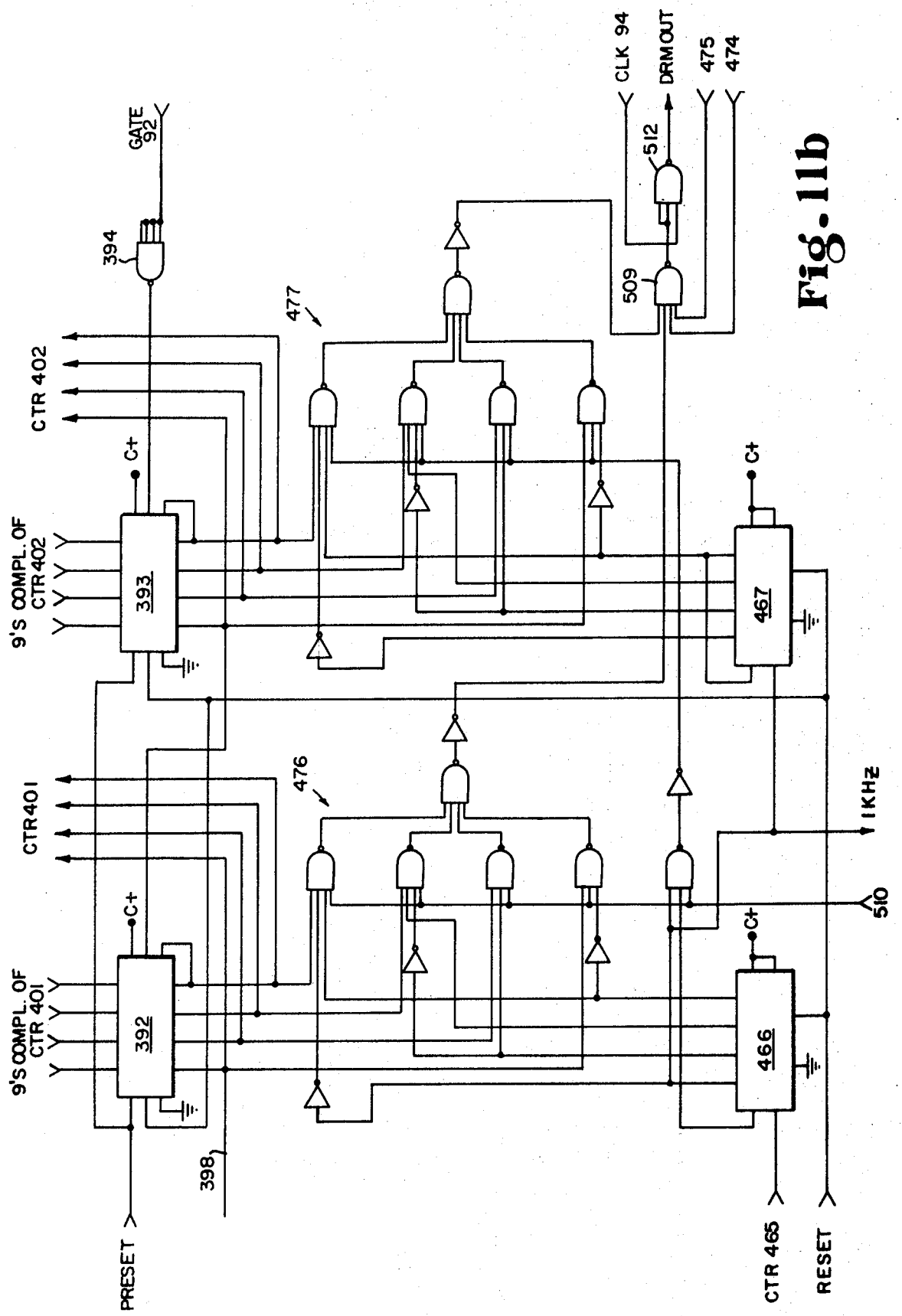
FIGS. 11 A and B are schematic diagrams showing the optical density counter, the digital rate multiplier and the master counter.
Figure 12:
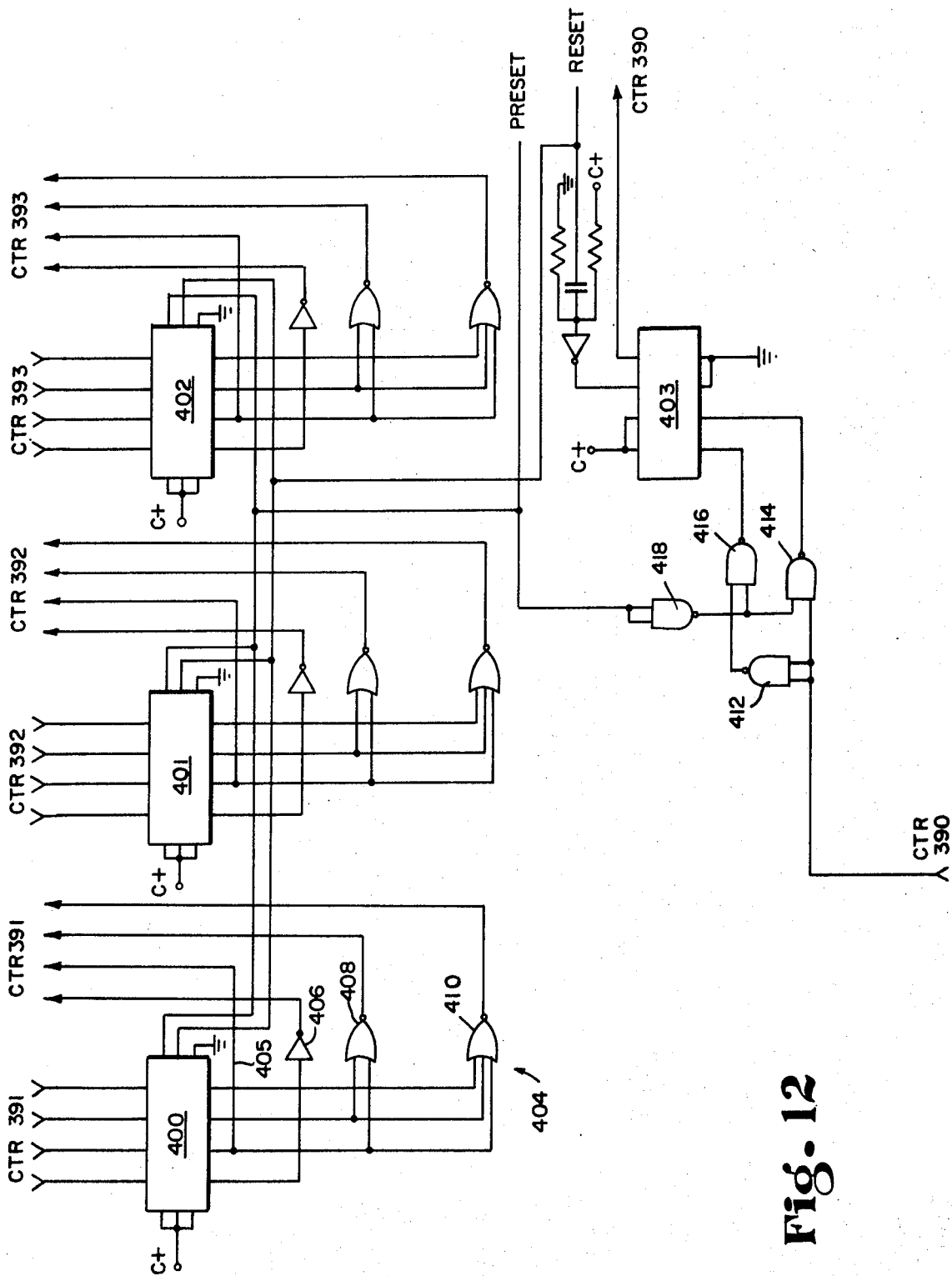
FIG. 12 is a schematic diagram showing the blank storage register and a nines complementor.

The optical density counter 108, the blank storage register 102 and the nines complementor 114 are shown in FIGS. 11a, 11b, and 12. The optical density counter 102 is comprised of four stages 390, 391, 392 and 393 which are combined in a binarily coded decimal counter. The first stage in this counter 390 represents the 1.0 digit in the decimal equivalent of the optical density. The contents of the remaining three stages 391 – 393 represent the 0.1 place, the 0.01 place, and the 0.001 place in the decimal representation of an optical density. For all practical purposes, the optical density never exceeds 1.999 so that the units digit stage 390 is only capable of being set to zero or one.

The output of the optical density counter gate 92 is inverted in a NAND gate 394 before being applied to clock the 0.001 digit 393 of the optical density counter 108. The $2^3$ output of this fourth stage 393 is connected by a conductor 396 to clock the third stage 392 each time the fourth stage 393 receives 10 clock pulses from the counter gate 92. In a similar manner, this second stage 391 has its $2^3$ weighted output line 398 connected to clock the second stage 391 when the third stage has received 10 pulses. The first stage 390 is also clocked by the second stage 391 in this same way.

Each of the last three stages 391, 392 and 393 of the optical density counter 108 have four parallel output lines weighted in binary sequence from $2^0$ to $2^3$. The most significant stage 390 has only one output which has a weight of $2^0$. The four output lines of each of the last three stages 391 through 393 are applied in parallel to the respective preset lines of a like number of stages in the blank storage register 102. As will be seen below, it is necessary to apply only the one output line of the first stage 390 to the corresponding stage 403 in the blank storage register 102.

Each of the first three stages 400 through 402 in the blank storage register 102 pass through a separate but identical stage 404 of the nines complementor 114. Each of the nines complementor stages 404 comprises an inverting amplifier 406, an exclusive OR gate 408 and a NOR gate 410. The $2^0$ output line of the blank storage stage is applied to the input of the inverting amplifier 406. The exclusive OR gate 408 has the $2^1$ and the $2^2$ output lines as its inputs. The NOR gate 410 has inputs from the $2^1$, $2^2$ and $2^3$ output lines of the register stage. The $2^2$ output line is shorted by a jumper 405 to the $2^2$ nines complementor output line.

To use an example for the explanation of the functioning of the nines complementor 404, if the particular stage of the blank storage register has a zero stored in it, the nines complement of that zero would be nine. Each of the four output lines of the particular storage register stage would be false. The false signal applied to the inverting amplifier 406 would yield a true output. The false input to the jumper 405 would thereby have a false output from the nines complementor 404. The two false inputs to the exclusive NOR gate would yield a false output. The three false inputs to the NOR gate 410 would yield a true output. The binarily weighted output lines of the nines complementor stage 404 would then be true, false, false and true, respectively which is the binary equivalent of the number nine.

The presetting of the contents of the 1.0 digit stage 390 into its corresponding blank storage stage 403 is different from the presetting of the contents of the remaining stages 390–392 because this stage 393 can only have a 1 or 0 content. This stage 393 is comprised of a clockable J-K flip-flop. When the preset signal is initiated by the programmer 98 to preset the contents of the optical density counter 108 into the blank storage register 102, the output of the 1.0 digit 390 in the counter 108 is applied to an inverting NAND gate 412 and a setting NAND gate 414 for the 1.0 digit 403 of the blank storage register which also comprises a clockable J-K flip-flop. The output of the inverting NAND 412 is applied to a resetting NAND 416 along with the output of a second inverting NAND 418 which inverts the preset signal from the programmer 98 applied to its input. The inverted preset signal also serves as the other input to the setting NAND 414. This combination of NAND gates 412, 414, 416 and 418, upon a preset signal from the programmer 98 sets the J-K flip-flop 403 if the output of the 1.0 stage 390 in the optical density counter was false, and reset it if the output were true. This has the effect of storing in the first blank storage register stage 403 the inversion of what was stored in the first stage of the optical density counter and effects a pseudo nines complement of that stage 390.

A preset signal from the programmer 98 may subsequently be applied to the blank storage register stages 400 through 403 to preset the nines complemented form of the number in the storage register stages back into the optical density counter stages 390–393. In many instances, the 100 kilohertz pulse train representing the optical density output from the crossover comparator latch 91 is clocked into the optical density counter 108 after it contains this nines complemented number. This process has the effect of subtracting the number whose nines complement is in the optical density counter 108 from the incoming value.

Figure 13A:
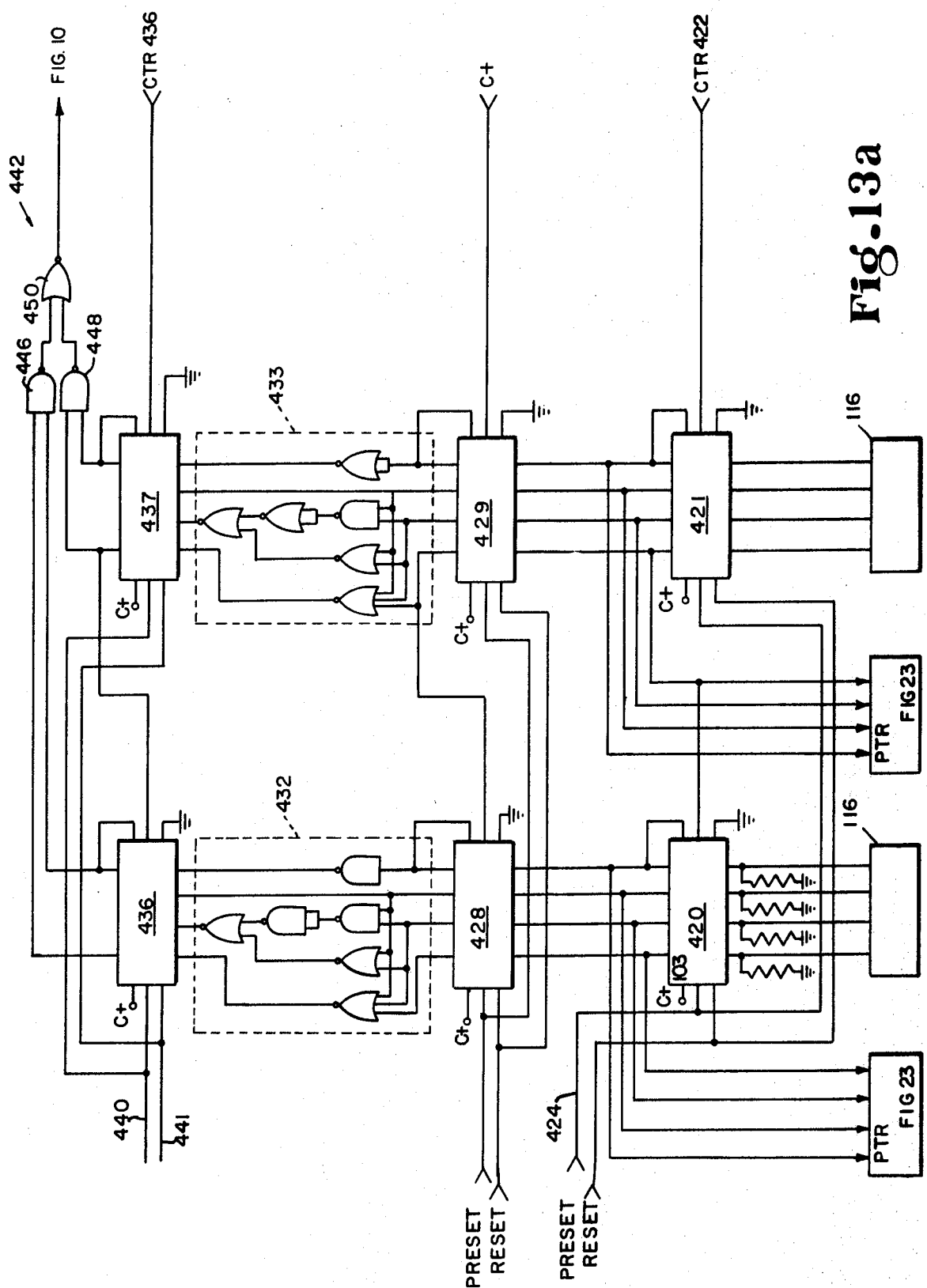
FIG. 13 A and B are schematic diagrams showing the calculation counter and nines complementor, the multiplication accumulator, the percentage concentration counter and the standard unit switches.
Figure 13B:
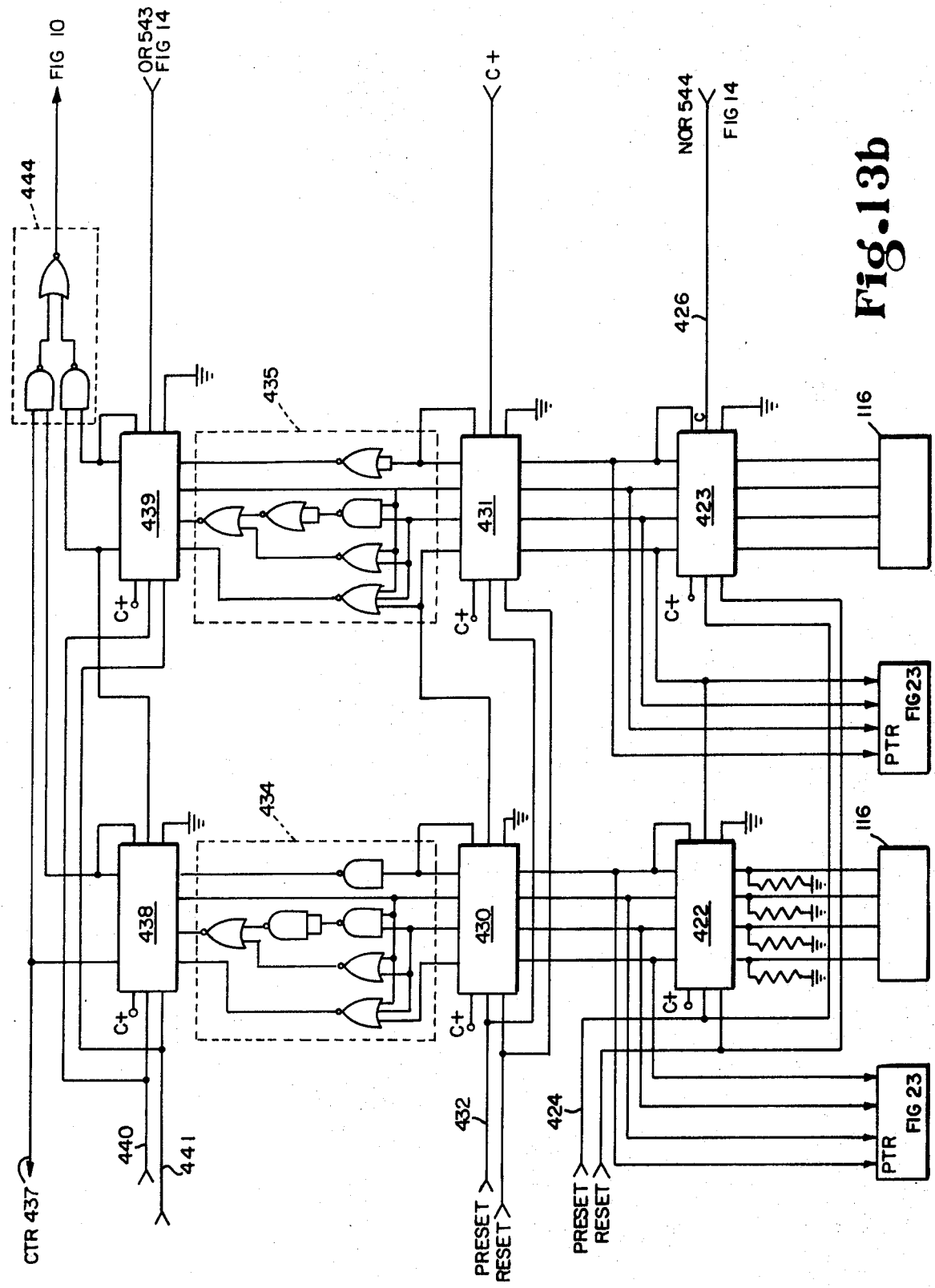
Figure 15A:
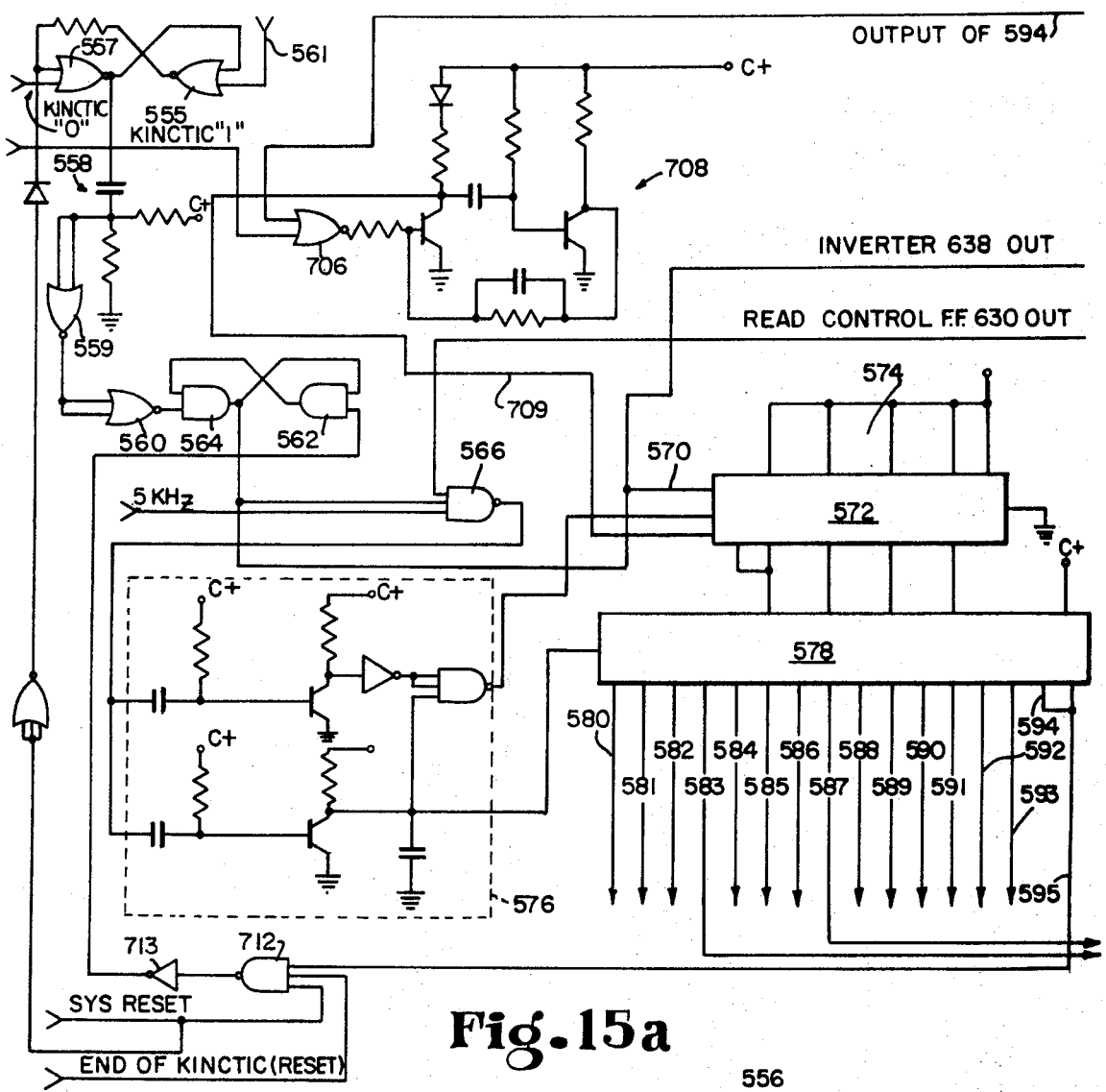
FIG. 15 A and B are schematic diagrams showing portions of the programmer control logic.
Figure 15B:
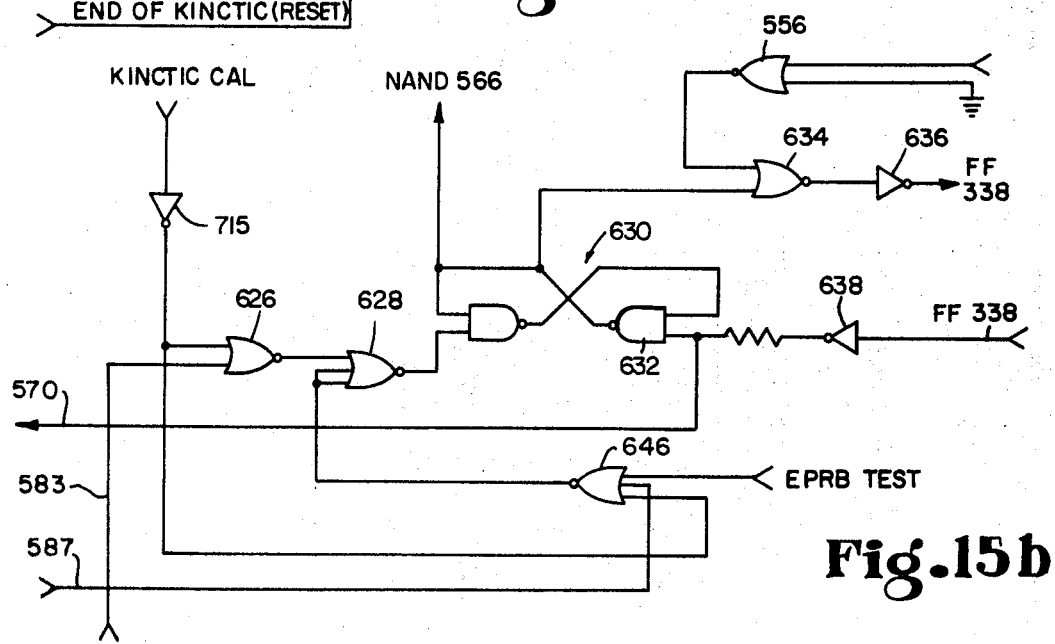
Figure 16:
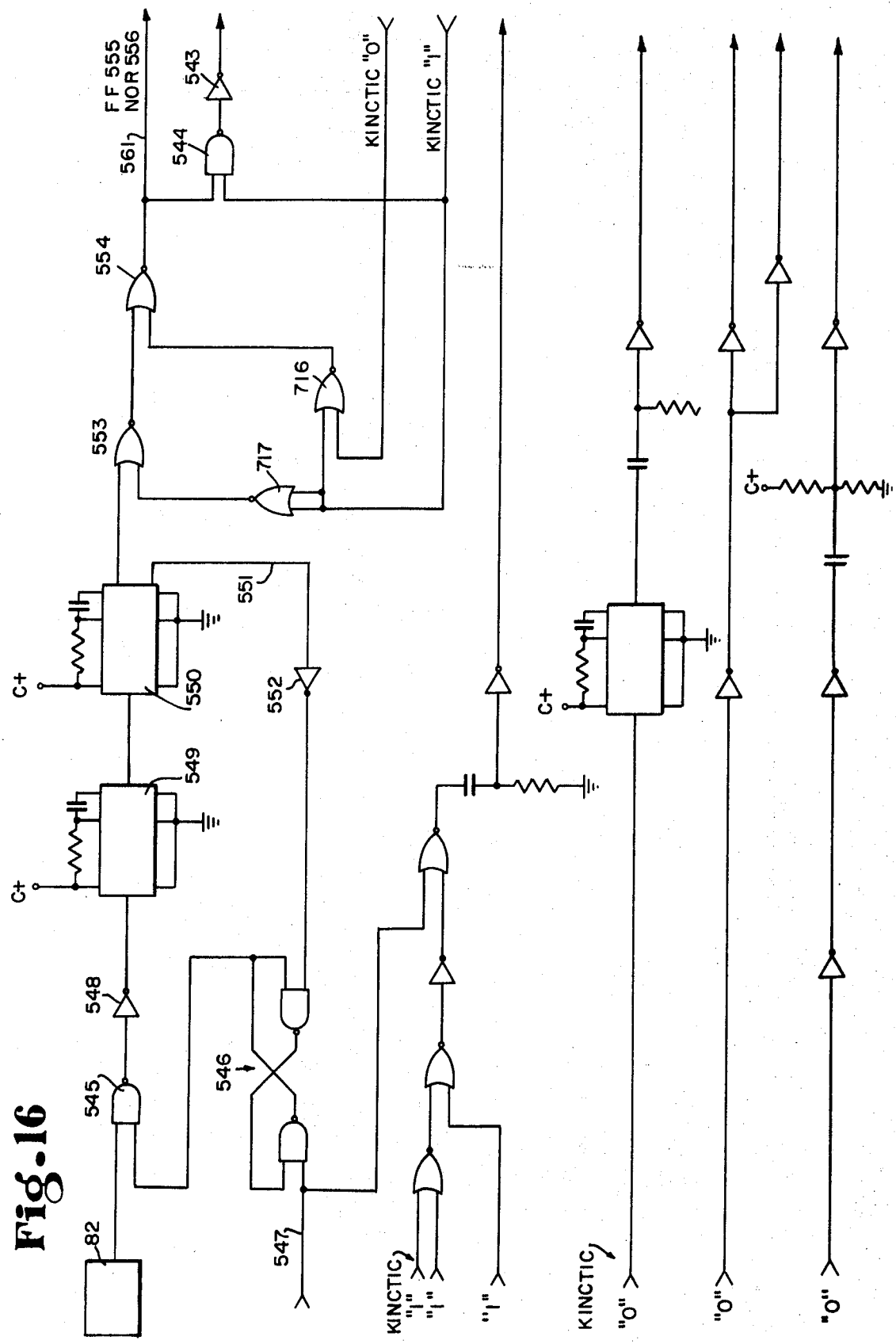
FIG. 16 is a schematic diagram showing another portion of the programmer control logic.
Figure 17:
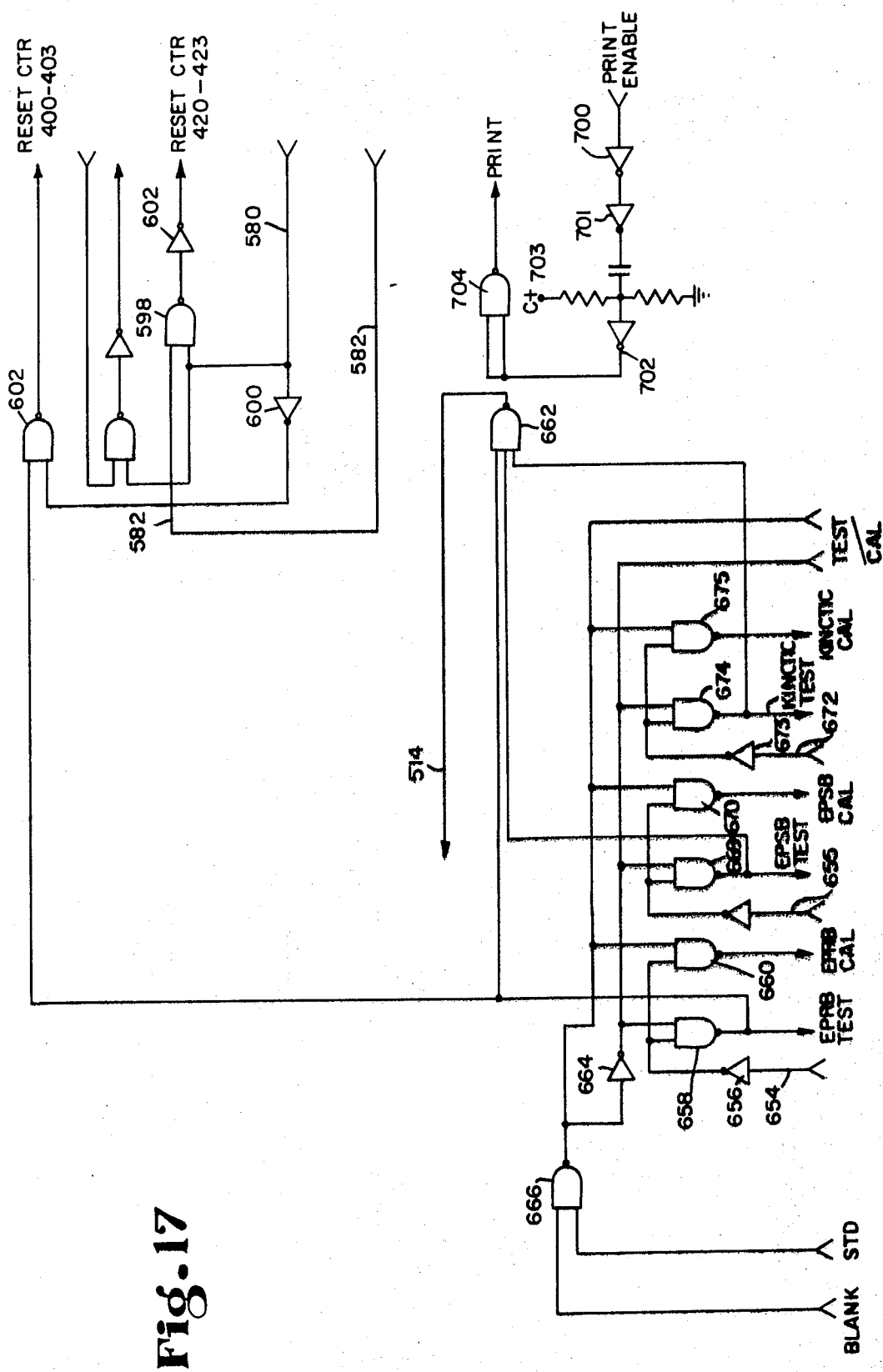
FIG. 17 is a schematic diagram showing a portion of the programmer control logic.
Figure 18:
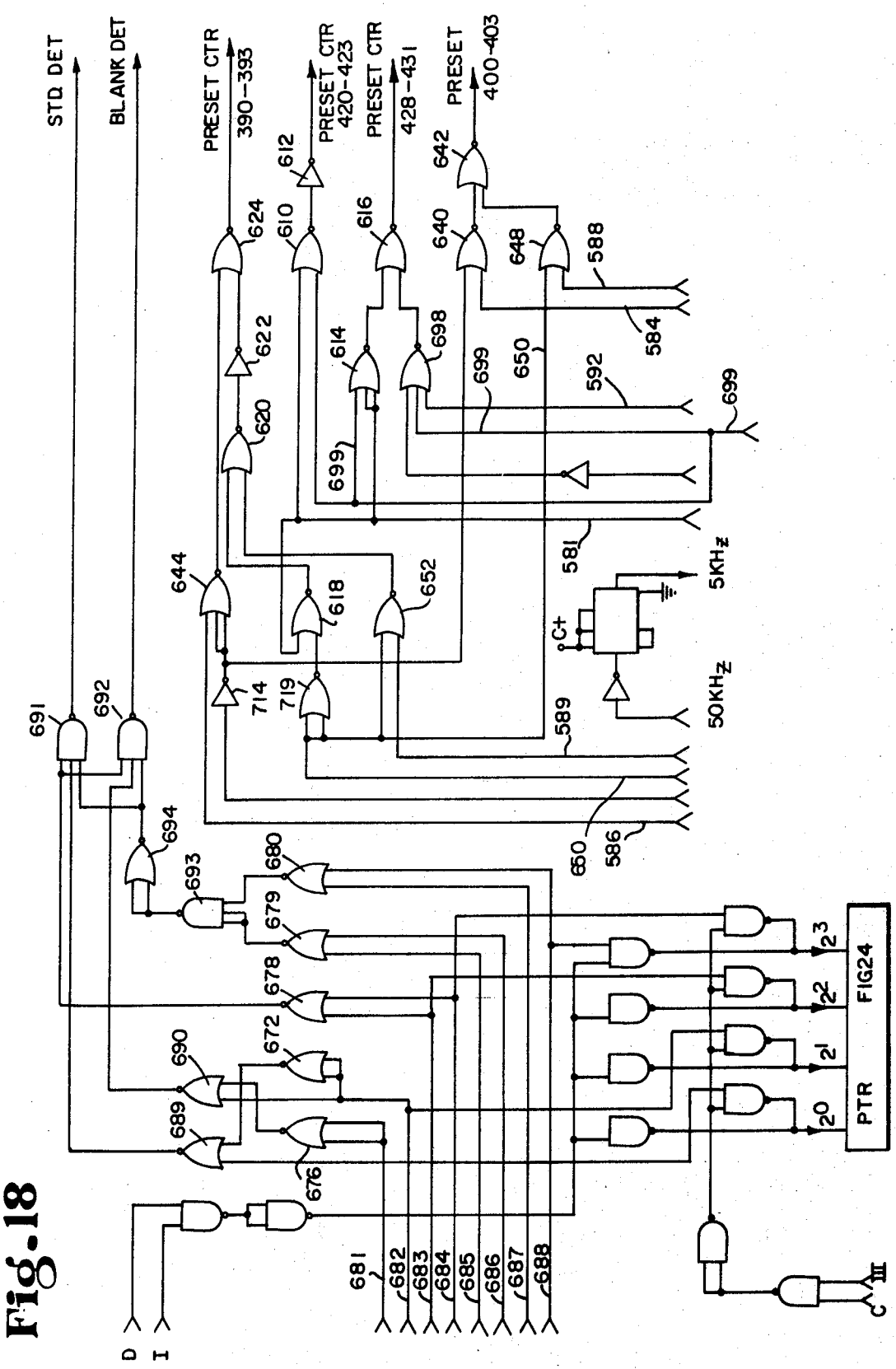
FIG. 18 is a schematic diagram showing a portion of the programmer control logic.
Figure 19:
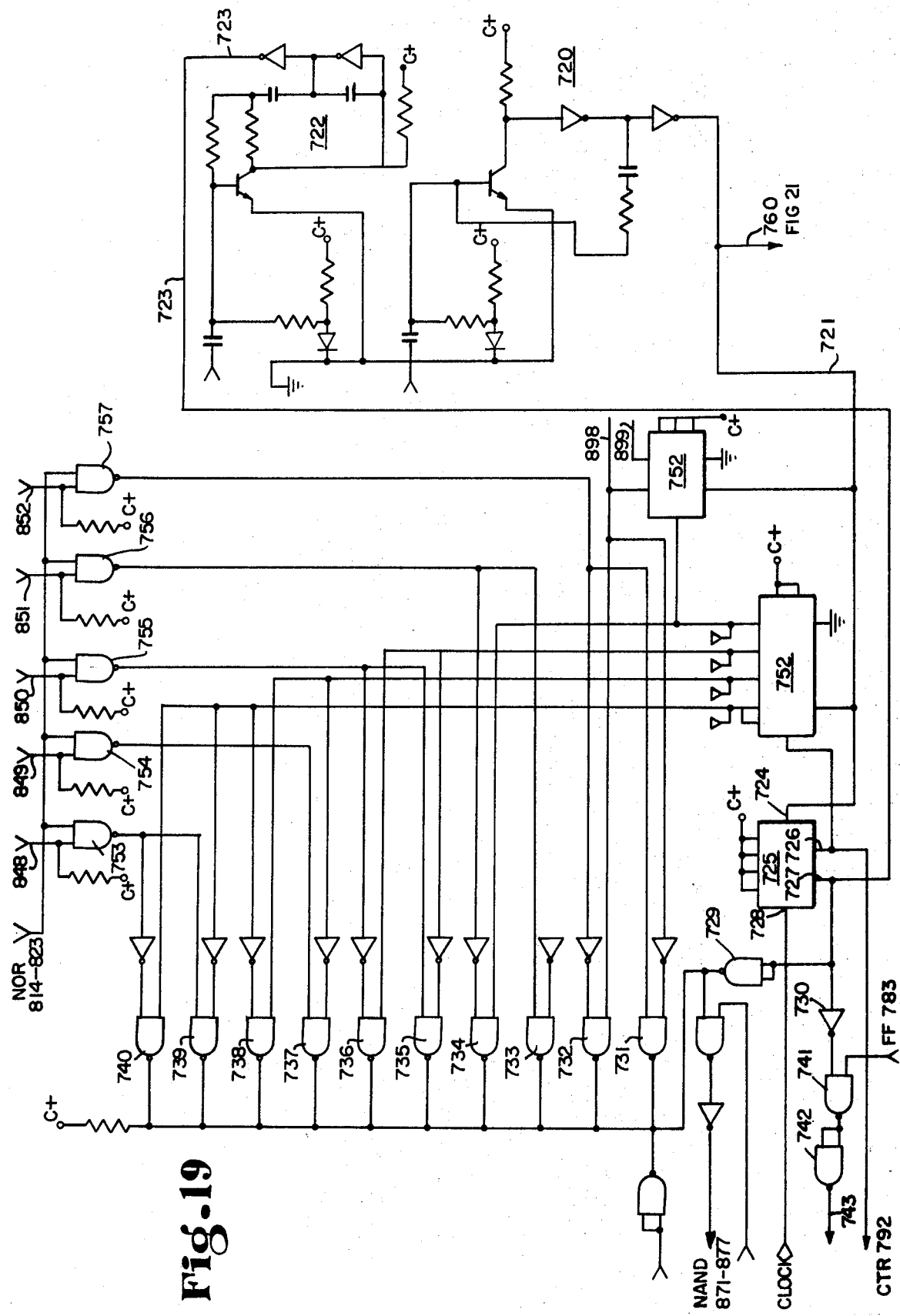
FIG. 19 is a schematic diagram showing part of the printer control logic.
Figure 20:
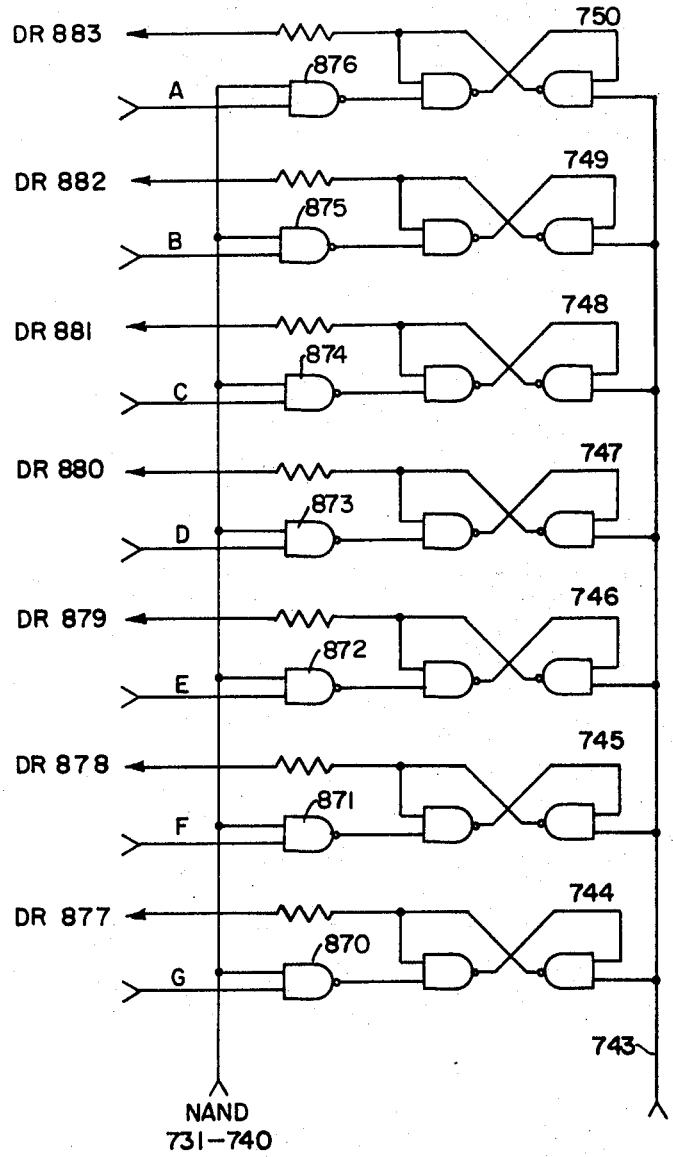
FIG. 20 is a schematic diagram showing a portion of the printer control logic.
Figure 21:
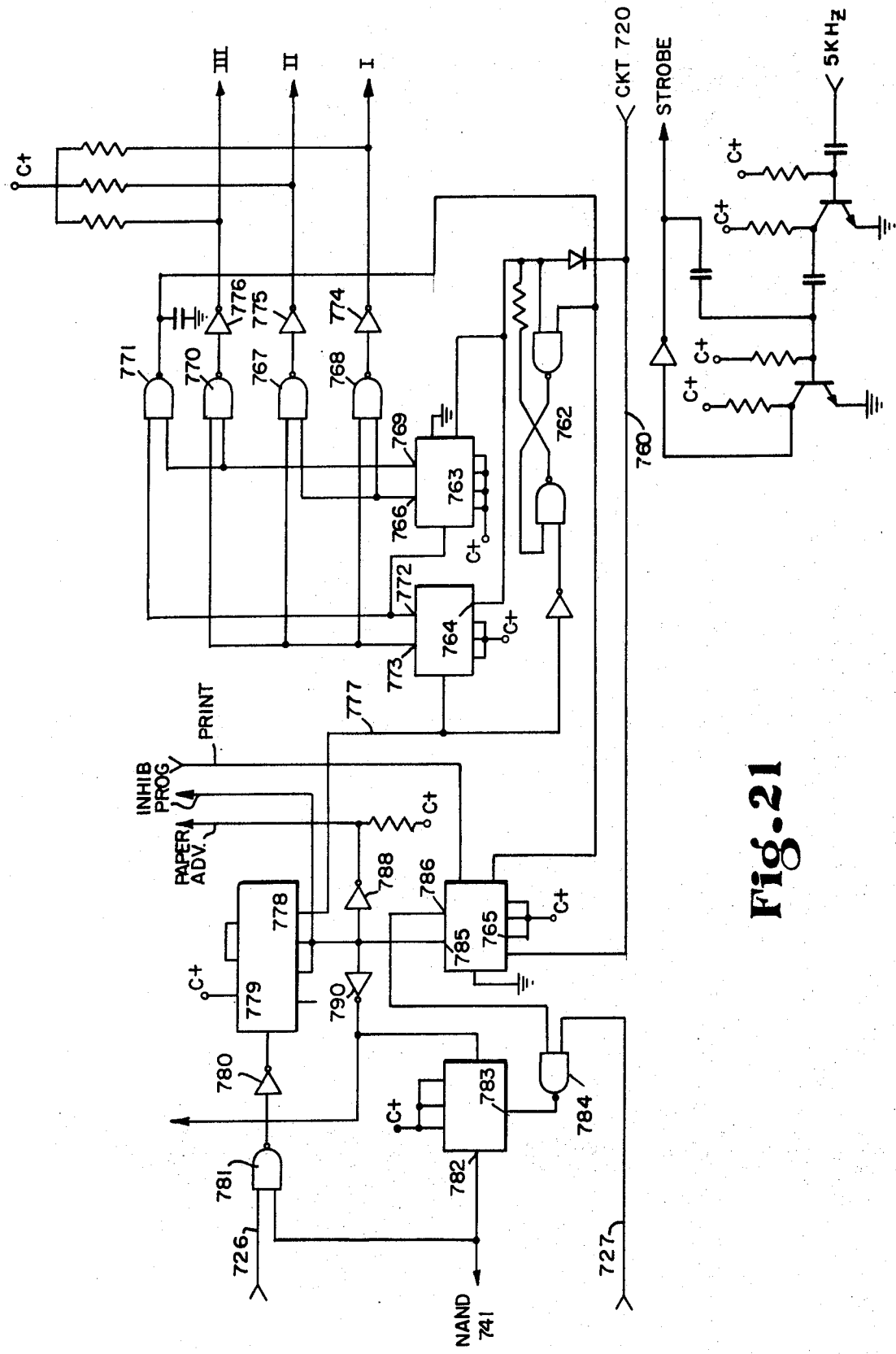
FIG. 21 is a schematic diagram showing part of the printer control logic.
Figure 22:
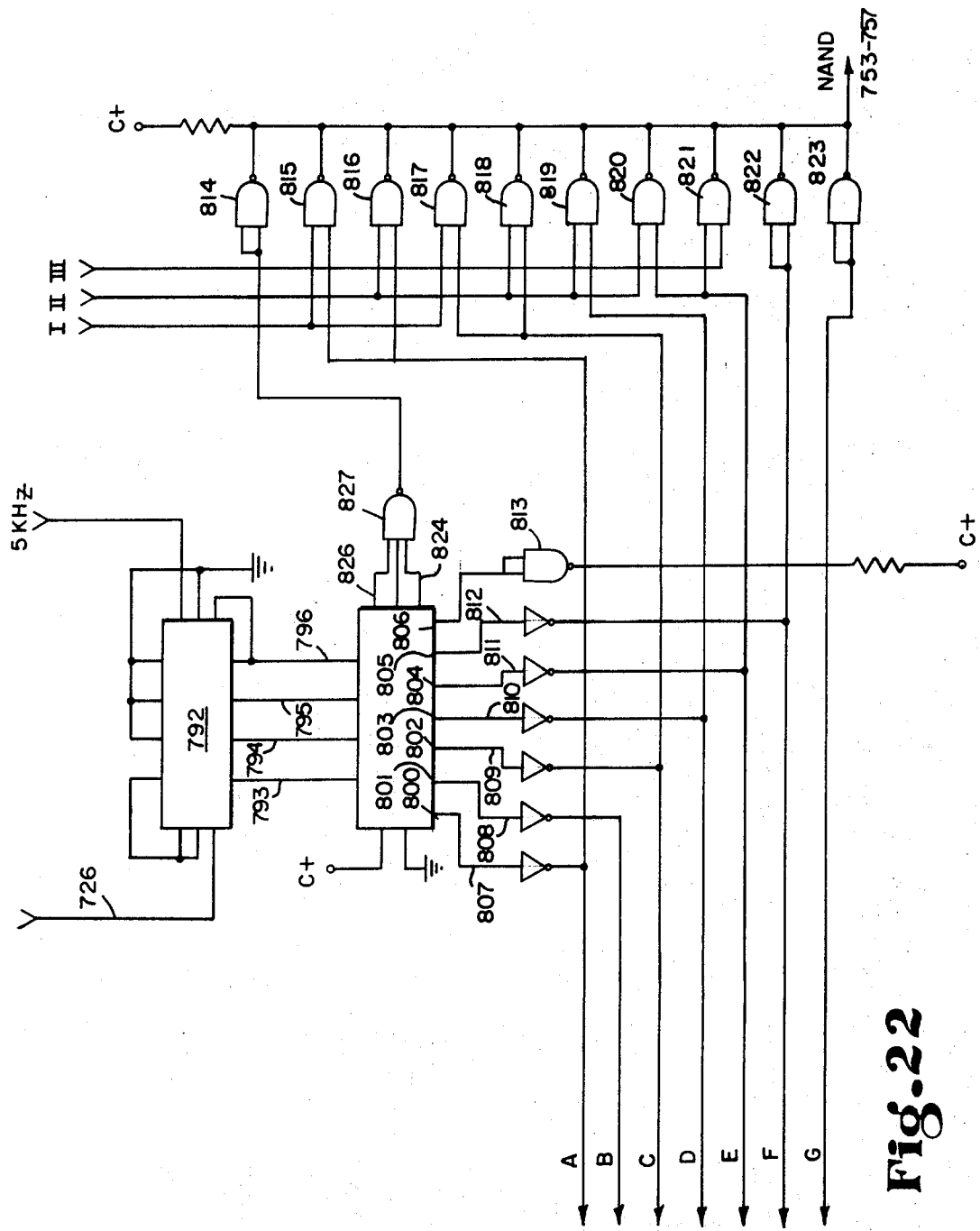
FIG. 22 is a schematic diagram showing a portion of the printer control logic.
Figure 23:
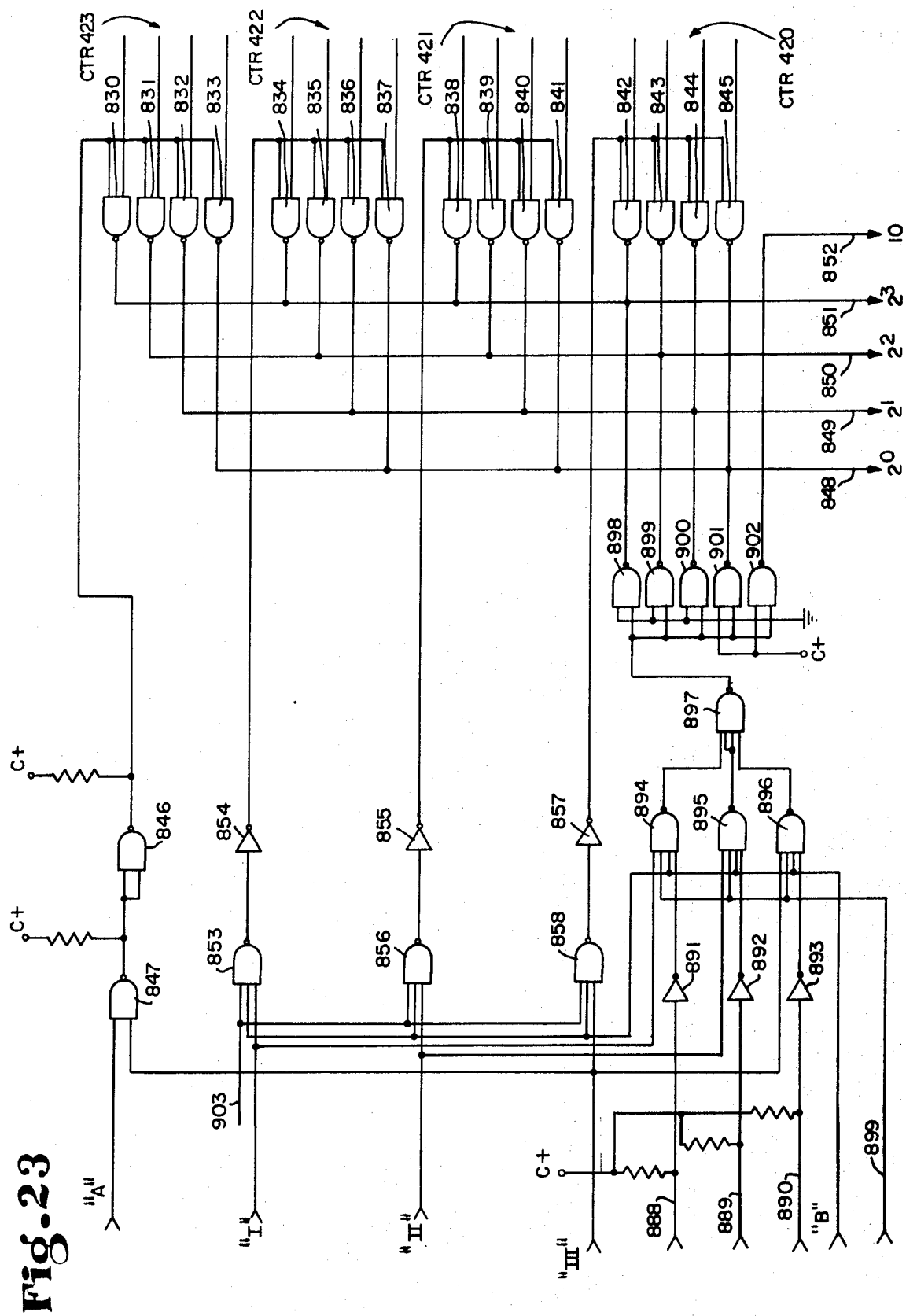
FIG. 23 is a schematic diagram showing a portion of the printer control logic.
Figure 24:
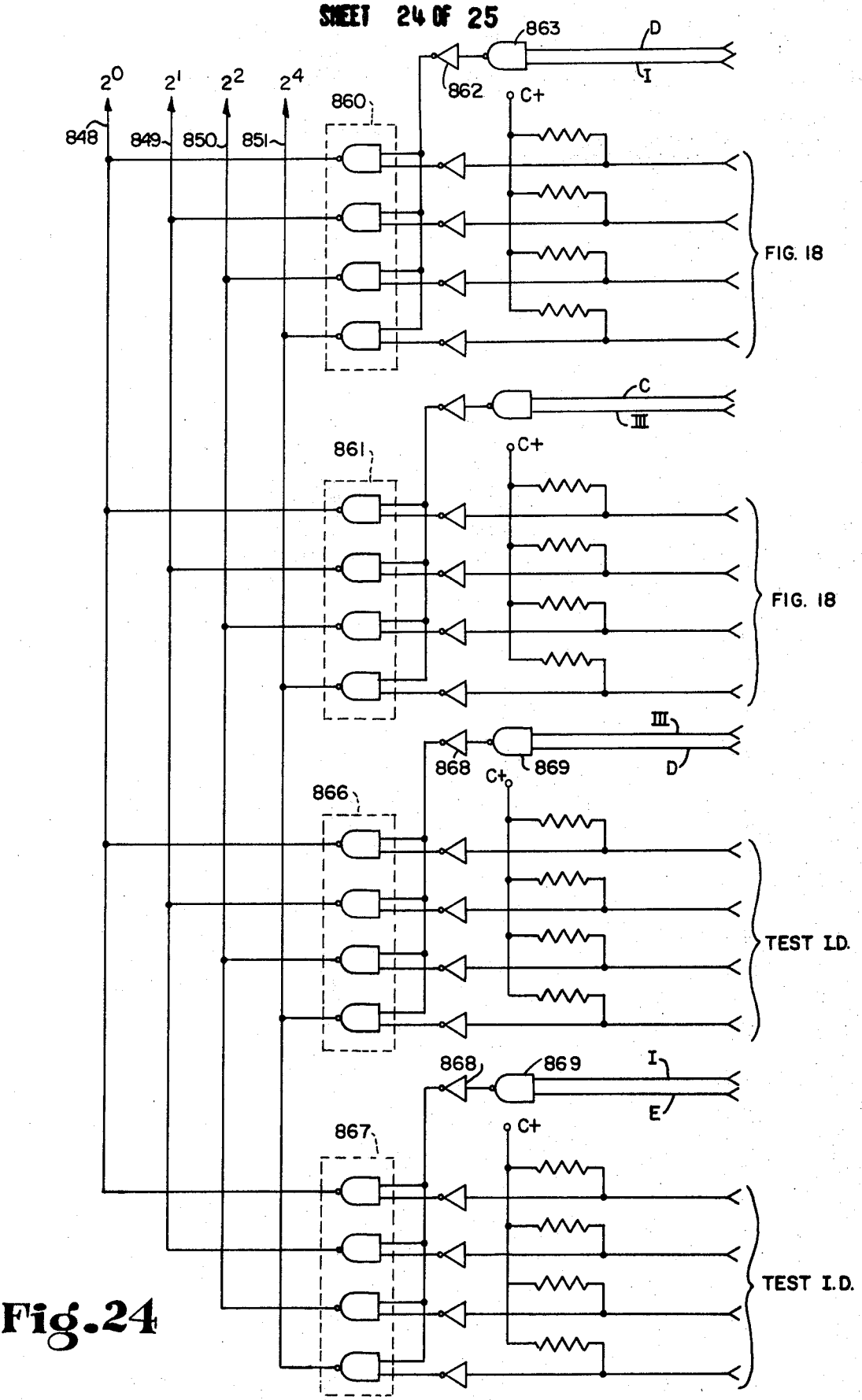
FIG. 24 is a schematic diagram showing a portion of the printer control logic.

Information is also applied to the calculator section 100 from the known standard switch inputs 116 to the percentage concentration counter 112 as shown in FIGS. 13a and 13b. The percentage concentration counter 112 is comprised of four binary coded decimal output stages 420 through 423. These stages have a weighted value of $10^3$, $10^2$, $10^1$ and $10^0$ respectively. Each of these stages 420 through 423 is connected to a common preset line 424. The programmer 98 applies a true signal to this line 424 to preset each of the values dialed in the known standard switch input 116 into the respective stages in the percentage concentration counter 112.

The clocking input to the units stage 423 of the percentage concentration counter 112 is an output line 426 of the multiply and divide decision circuitry 126. Each of the remaining stages 422, 421 and 420 are clocked by a carry condition in the previous stage. The binarily weighted outputs of each of the stages 420 through 423 are applied in parallel to corresponding stages 428, 429, 430 and 431 in the multiplication accumulator 118. The parallel outputs of the percentage concentration counter 112 are also applied to the printer logic 132.

The contents of the percentage concentration counter 112 is preset into the corresponding stages 428 through 431 in the multiplier accumulator 118 when a preset line 432 connected to each of the stages from the programmer 98 has a true signal on it. The four stages 428 through 431 of the multiplier accumulator are not clocked, but are used as a form of buffer storage for the contents of the percentage concentration counter 112 which are preset into it.

The parallel outputs of the four stages 428 through 431 of the multiplier accumulator are complemented in the nines complementor 120 and the resultant values preset into the corresponding four stages 436 through 439 of the calculator counter 110 upon those stages receiving a preset signal on a preset line 440 from the programmer 98. The calculator counter stages 436–439 may also be reset by a signal on a reset line 441 also from the programmer 98.

The nines complementor 120 has individual stages 432 through 435 which are identical in composition to the nines complementor stage 404 described with respect to the nines complementor 114 between the blank storage register 102 and the optical density counter 108.

It should be recalled that in the normal operation or analysis of the test, the calculation counter 110 is normally preset with the nines complement of some scale factor value stored in the multiplier accumulator 118. The counter 110 is then clocked through the multiply and divide circuitry 126 by either the digital rate multiplier 124 or the master counter 104. This clocking continues until a fill detector 128 detects that the counter 110 has received a number of clock pulses equal to the number whose nines complement is stored in that counter 110. More specifically, the filling of the calculator counter 110 with the nines complement of the desired value serves to subtract that value from the total number of incoming pulses. The desired number of pulses have been received when the outputs of each of the stages in the counter 110 equal nine.

The fill or nine detector 128 comprises two stages 442 and 444 each of which are responsible for two of the stages in the calculation counter 110. Preferably, the first detection stage 442 has as its input the $2^0$ and $2^3$ output lines of the thousand and hundreds digit stages 436 and 437. In a similar manner, the like outputs of the remaining counter stages 438 and 439 serve as the inputs for the other detection stage 444. Each of these detection stages 442 and 444 comprise two NAND gates 446 and 448 whose output serves as the input for a NOR gate 450. Each of the NAND gates 446 and 448 are associated with one stage of the counter 110 and thereby have the $2^0$ and $2^3$ output lines of that counter stage as inputs. Only when both stages of the counter contain a nine will the output of the nines detector stage 442, 444 go true. The outputs of the fill detector stages 442 and 444 are applied to a NAND gate 452 in the master counter enabling gate 106. When both inputs to this NAND gate 452 go true, signifying that the calculator counter 110 has received a total number of pulses equal to the number in the multiplier accumulator 118, the false output of this NAND 452 resets a calculation control flip-flop 454 shown in FIG. 10.

The resetting of the flip-flop 454 enables a NAND gate 458 which enables the printer logic 132. A true signal on the output of the reset flip-flop 454 is also inverted in a NAND gate 460 whose output is applied to a NAND gate 462 which inhibits the output of the one megahertz clock 94, thereby stopping the clocking of the master counter 104.

The master counter 104 and the digital rate multiplier 124 are shown in FIG. 11a and 11b. The master counter is comprised of four stages 464, 465, 466 and 467. These stages 464 through 467 are not enabled in a binary coded decimal fashion. The output lines of 468, 469, 470 and 471 of the master counter stages 464 through 467 are weighted with weights of one, two, four and five, respectively. Only the four and five weighted output lines of the first stage 464 are used.

The master counter is clocked from the 1 megahertz clock 94 through the above described gate 106. The carry output of each stage 464 through 467, which is also the five weighted line 471, is connected to clock the next stage. This serial clocking of stages has the net effect of decreasing the rate of clocking by a factor of ten from the rate at which the clocking stage was clocked.

The output lines of the stages 464 through 467 of the master counter are connected in parallel to corresponding stages 474, 475, 476 and 477 of the digital rate multiplier (DRM) 124. The binarily weighted and parallel output lines of the optical density counter stages 390 through 393 also serve as inputs to corresponding stages 474 through 477 of the DRM 124. The function of the DRM 124 is to take the rate at which each of the master counter stages are counting and make it proportional to the number stored in the corresponding stage of the optical density counter 108.

The output pulses of the DRM 124 occur at a rate equal to the 100 kilohertz master clock times the number stored in the optical density counter 108. Each stage 475 through 477 of the DRM 124 is identical in configuration and in its interconnections with the respective optical density counter stage and master counter stage. The first stage of the DRM 474 is different and simplified somewhat since only a 1 or 0 may be stored in the first optical density counter stage 390.

The "five" output 478 of the first master counter stage 464 is inverted in a NAND gate 480 before application to a NAND gate 482 whose other inputs are the output line 484 of the first stage 390 in the OD counter, the 1 megahertz gated supply clock which has inverted by a NAND gate 486 and the output of the "4" output line 484. The "5" output line 478 and the "4" output line 484 are also applied to another NAND gate 486 whose third input comes from the unnegated 1 megahertz gated supply. The output of this latter NAND gate 486 is inverted by an inverting amplifier 488 and used as a common input to all the NAND gates 490 through 494 in the second stage 475 of the DRM 124.

The output of the "5" output lines 478 is connected to the clock input of the second stage 465 and is also applied to one input of the multiply and divide decision circuitry 126. The purpose of this connection will be explained in detail hereinafter.

The output of the controlling NAND gate 482 is applied to a DRM output gating NAND 509 which also has inputs from the remaining stages 475 through 477 of the DRM 124. The controlling NAND 482 in the first stage only permits a true output when the "4" output line 484 of the first master counter stage 464 is true, the "5" output line 478 is false, and when a true output is available on the first optical density counter stage 390. In effect, the first DRM output stage 474 has a one kilohertz output when there is a one stored in the first stage 390 of the optical density counter 108.

In the second stage 465 of the DRM 475, the "5" output line 471 of the corresponding master counter stage 465 is inverted by an inverting amplifier 496 and applied to the first NAND 490 along with the $2^0$ power output 498 of the corresponding stage 391 of the optical density counter. The "5" output line 471 also serves as the input to another NAND 494 and as the clocking input to the next master counter stage 466. The "4" rated output line 470 of the second master counter stage 465 is used as an input to the latter mentioned NAND gate 494 along with the "5" output line 471 and the 10 kilohertz synchronization clock from the first DRM stage 474. This 10 kilohertz clock results from the gating together of the "4" and "5" output lines 464 and 478 of the first stage 464.

The "4" output line 470 of the second stage of the master counter 465 is also applied to the first NAND gate 490 in the second DRM stage 475 and is negated by an inverting amplifier 500 for application to the second NAND gate 493 along with the 10 kilohertz signal from the previous stage 474 and the "5" output line 471. The middle NAND 492 in the DRM stage 475 has as its input the $2^2$ output of the second stage 392 of the optical density counter, the "1" output line 468 of the second master counter stage 465 and the 10 kilohertz output line from the first stage 474 of the DRM. The "1" output line 468 is also inverted by an inverting amplifier 502 and applied to the fourth NAND gate 491 along with the $2^1$ output line 504 of the optical density counter stage 392 and the 10 kilohertz gated output from the first stage 474 of the DRM.

Each of the first four NAND gates 490–493 in the second stage 475 of the DRM are applied to an output NAND gate 506 whose output is inverted by an inverting amplifier 508 before application to the DRM output NAND gate 509. The output of the remaining NAND gate 494 in this DRM stage 475 is inverted by an inverting amplifier 510 and is subsequently used as a gated 1 kilohertz input to each of the NAND gates in the next DRM stage 476.

The effect of each of the first four NAND gates 490 through 493 is to gate the 10 kilohertz output from the preceding stage 474 in accordance with the gating conditions set up by the inputs from the second optical density counter stage 391 and the second master counter stage 465.

By way of example, assume there is a five (0101) stored in the second optical density counter stage 392. Each of the NAND gates 490 through 493 would be presented with the ten kilohertz clock from the inverting amplifier 48 in the preceding stage 474. The output of the first NAND gate 490 having the $2^0$ power input which is true in this case will only permit the output to go false once for each time the master counter stage 465 is clocked 10 times, thereby having a ten kilohertz output signal.

The second NAND gate 491 can never be closed because of the zero output on the $2^1$ power output line 504 of the optical density counter stage 392. The third NAND 492 has its output gated ON and OFF by the ten kilohertz clock each time the "1" output line 468 of the master counter stage 465 is true. This event occurs four times for each 10 clock pulses the counter stage 465 receives, thereby creating a forty kilohertz clock output. The 40 kilohertz clock output and the 10 kilohertz output are combined by the output NAND gate 506 and are inverted in an inverting amplifier 508 and are applied as a 50 kilohertz clock to the DRM output gate 509.

Each of the remaining optical density count stages 392 and 393 and master counter stages 466 and 467 and their respective connections within the corresponding stage 476 and 477 of the DRM are identical to those just described so that the above description will be representative and will not be repeated.

The DRM output NAND gate 509 applies its oscillatory output to a synchronization NAND gate 512 whose other output is provided from the 1 megahertz clock 94 which thereby synchronizes the clocking output of the DRM with the output of the master clock 94.

The output from the DRM 124, and more specifically from the synchronizing NAND gate 512 is applied to the multiply and divide function circuitry 126 (FIG. 14) as is the 100 output line 478 from the "5" output line of the first stage 464 of the master counter. The selection of the multiply path or the divide path within the multiply and divide function 126 is determined by signals from the programmer 98, the origin of which will be explained in detail below with respect to the programmer 98.

Figure 14:
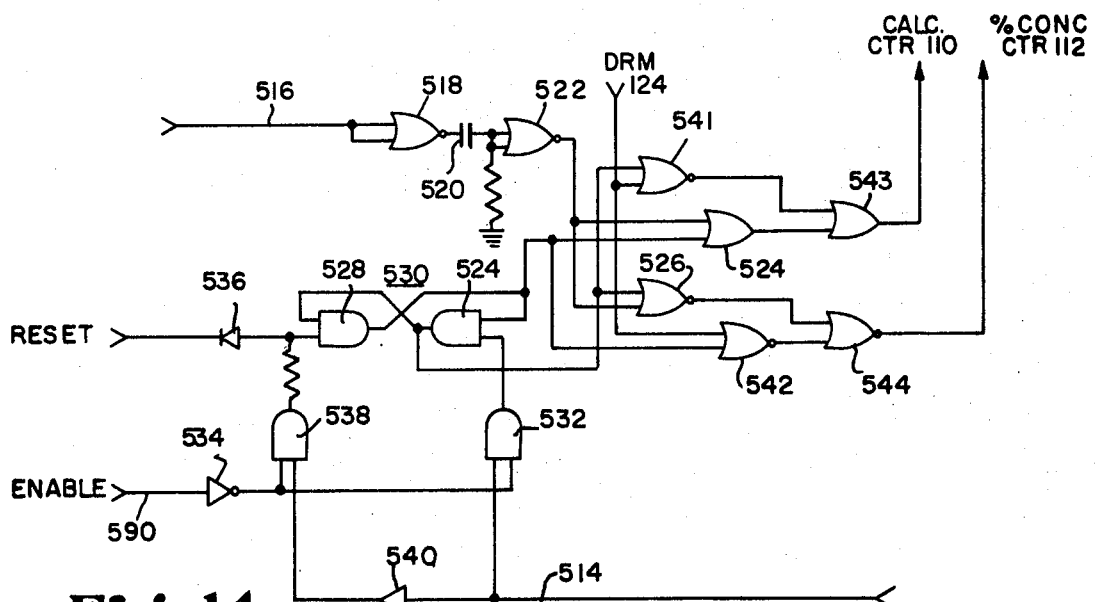
FIG. 14 is a schematic diagram showing the multiply and divide selection logic.

The selection of the multiply or the divide paths, in general, have the effect of either routing the 100 kilohertz clocking input to the calculation counter 110 and the DRM output to the percentage concentration counter 112 or switching these paths to apply the DRM output to the calculation counter 110 and the 100 kilohertz clock to the percentage concentration counter 112. The particular logic involved in this path selection is shown in FIG. 14.

A false signal on the input conductor 514 indicates that a calibration mode is in effect, as selected by the programmer 98, and that the master counter 100 kilohertz output is to be applied to the calculation counter 110 and the DRM output is to be applied to the percentage concentration counter 112. A true signal on this conductor 514 indicates that a test is in progress and that the DRM output will be applied to the percentage concentration counter 112 and the master counter 100 kilohertz output will be applied to the calculation counter 110.

The input conductor 516 from the 100 kilohertz output of the master counter 104 is applied to a NOR gate 518 which inverts the incoming clock pulses and applies them across a capacitor 520 and through a second NOR gate 522 which inverts the squared clocking pulses once more. The output of this latter NOR 522 is applied in parallel to two more NOR gates 524 and 526. The first of these NOR gates 524 has its other input supplied from a NAND gate 528 in a flip-flop 530. The output of the other NAND gate 529 in this flip-flop 530 is applied to the other of the previously mentioned NOR gates 526. The flip-flop 530 is set by the output of a NAND gate 532 whose two inputs are a signal from the programmer enabling the arithmetic function selections through an inverting amplifier 534 and the input conductor 514 from the programmer.

The reset to the flip-flop 530 is applied from a programmer controlled system reset set signal through a diode 536 and another reset is applied from the output of a NAND gate 538 whose two inputs are supplied from the output of the enabling inverter 534 and from a second inverter 540 which inverts the signal on the incoming conductor 514 from the programmer 98.

The gated clocking output from the DRM 124 is applied to the input of two NOR gates 541 and 542. The other inputs to these NOR gates 541 and 542 are the outputs of the flip-flop NAND gate 529 and 528, respectively. The outputs of each pair of NORs, 541 and 524, 526 and 542 having completely different inputs are applied to an OR gate 543 and a NOR gate 544, respectively. The output of the OR gate 543 is applied to the clocking input of the last stage 437 of the calculator counter 110. The output of the latter NOR gate 544 is applied to the last stage 423 of the percentage concentration counter 112.

In operation, when a zero or false signal is applied to the incoming conductor 514 by the programmer 98 signaling a "divide" operation, one NAND 528 in the flip-flop 530 has a true output and the other NAND 529 has a false output. This true and false signal gates the DRM output through a NOR 541 and through an OR gate 543 to the calculation counter 110. The 100 kilohertz input is concurrently gated through one of its connected NOR gates 526 to the output NOR gate 544 for application to the percentage concentration counter 112. The reversal of the signal on the incoming conductor 514 from the programmer to that of a true signal signifies a test is to be performed and that the calibration is completed so that the NAND gates 528 and 529 in the flip-flop 530 reverse their output which routes the DRM input through one of its NOR gates 542 and an output NOR gate 544 to the percentage concentration counter 112, and the 100 kilohertz input through its enabled NOR gate 524 and output OR gates 543 to the input of the calculation counter 110.

The programmer 98 which is the central control for the entire processing sequence from the photomultiplier tube 66 to the printer 134 is under the control of the programmed information in the program input card, the reading and utilization of which is explained in detail in one of the aforementioned copending applications. The programmer section 98 is shown in FIG. 15a through FIG. 18.

The operation of the programmer is initiated by the signal from the flow cell position detection switch 82 which is applied to a NAND gate 545 whose other input is from a test wheel index detector flip-flop 546 which has been set by an input 547 from the test wheel 18 signaling that it has been indexed. The output of the NAND gate 545 is inverted by a second NAND gate 548 and applied to the first 549 of two serially connected one-shots 549 and 550. At the conclusion of the timed interval output of the first of these one-shots 549 the timed output interval of the second one-shot 550 is initiated. The initiation of the second one-shot 550 applies a true signal to its output conductor 551 which is inverted by an inverter 552 and used to reset the test wheel index detector flip-flop 546. The one-shot output is also applied through two NOR gates 553 and 554. The output of the second NOR gate 554 is applied to a program start flip-flop 555 and to a read control NOR gate 556.

The operation of the programmer 98 is enabled by a signal from the machine control logic described in the above mentioned co-pending application i.e., Ser. No. 179,133 which tells the programmer that a test chemistry of some nature has been transferred into the spectrophotometer flow cell. This signal must be applied to the program start flip-flop 555 by a conductor 561 prior to the application of the one-shot signal from the one-shot NOR gate 554. The output of one of the NOR's 557 making up this flip-flop 555 is applied through a capacitor-resistor differentiating circuit 558 and is then inverted twice by a pair of NOR gates 559 and 560. The 3 times inverted signal is then applied to a flip-flop 562 whose output 564 is applied to a NAND gate 566 which gates the 5 kilohertz clocking pulse. The signal is also applied to the reset line 570 of a 16 bit binary counter 572.

The preset lines 574 of this counter 572 are all connected to a true logic voltage so that the number 15 is preset into that counter 572. The true signal on the output 564 of the flip-flop 562 connected to the 5 kilohertz clock gate 566 and the counter 572 enables the clocking gate 566 and removes the preset from the counter 572 and allows it to be updated when clocked.

The 5 kilohertz clock output from the NAND gate 566 is applied through a squaring and delay network 576 before application to the preset input of a 16 line binary to decimal decoder 578 and to the clock of the binary counter 572. The delay circuitry 576 permits the clocking of the counter 572 shortly before the presetting of the counter output into the 16 line decoder 578. The first clock pulse to the counter 572 puts a zero into the counter since it was preset to 15 and is only a four bit binary counter. This zero is decoded by the 16 line decoder 578 and results in a false signal on its first output line 580 while the remainder of the output line 581–595 remain in a true state.

The first output line 580 is applied to a NAND gate 598 and through an inverting amplifier 600 to a second NAND gate 602. The output of the first NAND gate 598 is inverted by an inverting amplifier 604 and then connected to the reset line of the percentage concentration counter 112 to reset that counter. The output of the other NAND gate 602 is applied to the reset input of the blank storage register 102 to reset that register.

The next pulse of the 5 kilohertz clock returns the first output line 580 of the line decoder 578 to a true level and causes the second line 581 to go false. This output conductor 581 is connected to a NOR gate 610 whose output signal is inverted by an inverting amplifier 612 before application to the percentage concentration counter 112 to preset that counter with the contents of the standard units value switches 116. The second decoder output line 581 is also connected through a NOR gate 614 whose output then enables a second NOR gate 616. The output of the latter NOR gate 616 is connected to the preset line of the multiplication accumulator 118 to preset the standard units value being preset into the percentage concentration counter 112 on into the multiplier accumulator 118. Concurrently, the second decoder output line 581 is also applied to a NOR gate 618 whose resulting true output is applied to another NOR gate 620 and then inverted by an inverting amplifier 622 before passing through a third NOR gate 624 for application to the preset line of the optical density counter 108. This particular sequence presets the nines complement of the blank storage register 102 into the optical density counter 108.

The next 5 kilohertz clock pulse steps the counter 572 once more so that a false signal is now available on the third output line 582 of the 16 line decoder 578. This output line 582 is connected to the input of the NAND gate 598, already mentioned, whose output is inverted by an inverter 602 before application to the percentage concentration counter 112 to reset that counter.

The next pulse from the 5 kilohertz clock puts a false signal on the output of the fourth output line 583 of the decoder 578 which is connected to a NOR gate 626. The output of this NOR gate 626 passes through a second NOR gate 628 before setting a flip-flop 630 to inhibit further clocking of the binary counter 572 until a test chemistry value has been read and processed by the spectrophotometer logic. One of the NAND gates 632 in this flip-flop 630 is applied to the input of the clocking NAND gate 566 to inhibit further clocking of the counter 572 by the 5 kilohertz clock. The output of the flip-flop NAND gate 632 is applied to a NOR gate 634 whose output is applied through an inverter 636 to set the read command flip-flop 338 (FIG. 8) to initiate the spectrophotometer logic reading of the test chemistry in the flow cell. As may be recalled from the description of the various tests, the chemistry in the flow cell would be a blank chemistry and this first programmed test cycle would be a calibration cycle for the calculator 100.

The read sequence, once intiated by the programmer 98 in this manner, is placed under control of the spectrophotometer logic 70. The resetting of the read command flip-flop 338 is performed by the timing out of its input from the output of the NAND gate 350 in the exponential discharge control 346. The resetting of the read command flip-flop 338 applies a true signal to the input of an inverting amplifier 638 whose output is applied to the output NAND gate 632 in the read control flip-flop 630. The resulting false signal on an input of this NAND 632 causes the flip-flop 630 to be reset. The resulting time output on this flip-flop 630 once again enables the 5 kilohertz clock gate 566 so that the 5 kilohertz clock is once again applied through the delay circuitry 576 to clock the binary counter 572 and preset each new counter value through the sixteen line decoder 578. This results in the fourth output of the line decoder 583 going true once again and the fifth output 584 going false.

The fifth output line 584 is connected to a NOR gate 640 whose output is connected through a second NOR gate 642 to the preset line of the blank storage register 102. The false signal on the fifth output line of the line decoder 578 presets the number which has been clocked into the optical density counter 108 during the read cycle into the blank storage register 102.

The sixth output line 585 of the 16 line decoder is not used so its output is ignored. The seventh output line 586 is clocked next which applies a false signal to a NOR gate 644 whose output is connected to the optical density counter presetting NOR gate 624. The resulting false signal on the output of this NOR gate 624 presets the optical density counter with the nine complement of the contents of the blank storage register 102.

The next output line 587 of the 16 line decoder 578 is inverted by a NOR gate 646 whose output is connected to the NOR gate 628 which applies the set to the read control flip-flop 630. The output on the eighth line 587 of the 16 line decoder is thereby used to initiate a second read cycle. During the first sequencing, as being explained here, of the sixteen line decoder the second read cycle is generally used to read the optical density of a standard solution which has been placed in the next test tube in the test wheel after that containing the blank solution. The concentration of this standard solution is a known value and is that value which was manually dialed into the standard units value switches 116 by the machine operator and which has previously been preset into the percentage concentration counter 112, through the multiplication accumulator 118 and into the calculation counter 110.

At the conclusion of the second read cycle, a reset signal is again applied from the read command flip-flop 338, inverted by the inverter 638 and used to reset the read control flip-flop 630. This resetting once again enables the five kilohertz clock to clock the binary counter 572 and preset the sixteen line decoder 578.

At the conclusion of the read cycle, the eighth line of the decoder 587 goes true once again and the ninth output line 588 goes false. This output line 588 is connected to the input of a NOR gate 648 which remains inhibited during this, the calibration sequence, by another input line 650 which comes from the program card reader and has a true signal on it unless a kinetic test sequence is in progress. During the kinetic test, however, this output 588 from the decoder would pass through the NOR gate 648 and through the blank storage register NOR gate 642 and be applied to the blank register 102 to preset the optical density counter contents into the blank storage register 102.

The next output line 589 of the decoder 578 also is used to control a kinetic test. It is connected to the input of a NOR gate 652 whose output is gated through another NOR gate 620, inverted by an inverter 622 and applied to the optical density counter NOR gate 624 whose output is used to preset the optical density counter 108. This gating sequence is inhibited, however, by a second input to this first NOR gate 652 which is the conductor 650 coming from the card reader on which the kinetic test is selected.

The next output line 590 of the decoder to go false is connected to two NAND gates 532 and 538 through an inverter 534 to enable those NAND gates 532 and 538. The gates 532 and 538 are used to set and reset, respectively, the flip-flop 530 in the multiply/divide select circuitry 126. Their enablement permits the selection of the proper path for the DRM and master counter clock outputs. Since this is the first cycle of the 16 line decoder, a calibration mode is assumed to be under way. However, the false signal on the eleventh output line 590 of the 16 line decoder enables the NAND gates 532 and 538 in a test mode also. The differentiation between the test and calibration modes is made by using input lines 654, 655 and 672 from a patient-identification decoder. If an end point reagent blank (EPRB) test has been programmed the signal on the input conduct 654 is inverted by an inverter 656 and applied to two NAND gates 658 and 660. The output of the first of these NAND gates 658 is applied to the multiply/divide input NAND gate 662 and to the blank storage register resetting NAND gate 602. This NAND gate 602 is enabled whenever it receives a false signal from the first output line 580 of the programming decoder 578.

The first of the EPRB NAND gates 658 also has an input from an inverter 664 whose input is connected to the output of a NAND gate 666 which comes from the blank and standard solution detection circuitry which will be explained below.

Similarly to the above, the end point serum blank (EPSB) line 656 from the program card reader has its signal inverted by an inverter 668 and is applied to the input of two NAND gates 669 and 670. The output of the first of these NAND gates 669 is also applied to the same NAND gate 662 as the output of the EPRB test NAND gate 658.

An output from the programmer signifying that a kinetic test has been programmed is supplied by a conductor 672 through an inverter 673 to the input of two NAND gates 674 and 675. The output of the first of these NAND gates 674 is applied as an input of the NAND gate 662 whose other inputs are from the EPRB and the EPSB NAND gates 658 and 669, respectively. The output of this NAND gate 662 is the multiply or divide information which selects the proper gating within the multiply and divide selection circuitry 126. It is important also at this point to recall that at the beginning of each test being performed, i.e., the EPRB, the EPSB or the kinetic test, a calibration of the calculator section 100 is necessary and is performed by analyzing first a blank chemistry and then comparing the blank chemistry reading with the reading obtained from a standard chemistry for which the percentage concentration is known.

During the calibrate mode for each of the above tests, the output of the NAND gate 662 whose inputs signify the type of test selected is false during a calibration mode and true during the actual test performance. This output is, in part, decided by the inputs to each of the NAND gates 658, 660, 669, 670, 674, and 675 that each have one input from the card reader and another input from an inverter 664 whose input is supplied from the NAND gate 666 leading from the blank and standard detection logic.

This logic comprises five NOR gates 676-680 which receive, as will be explained, their inputs from conductors leading from the main machine control logic. These lines 681 through 688 represent the position number, i.e., one to one-hundred of the test chemistry under analysis at any given moment. The lines are weighted, respectively, with weights of one, two, four, eight, ten, twenty, forty and eighty. True signals are selectively applied to these conductors to represent the particular test tube in the test extraction position. The first input line 681 is applied to the first NOR gate 676 and to another NOR gate 689. The second input line, representing the second test tube position is similarly connected to the input of the second 677 of the first series of NOR gates 676 through 680 and also to another NOR gate 690. The outputs of the two second series NOR gates 689 and 690 are applied as inputs to two controlling NAND gates 691 and 692.

The third and fourth input lines 683 and 684 are both applied through a first series NOR gate 678 to the inputs of both of the controlling NAND gates 691 and 692. The fifth and sixth inputs 685 and 686 are both applied to a NOR gate 679 and the last two inputs 687 and 688 are both applied to the last NOR gate 680. The outputs of these latter two NOR gates 679 and 680 are both applied to a NAND gate 693 whose output is inverted by a NOR gate 694 and applied to both of the controlling NAND gates 691 and 692. Only when the first or second input lines 681 and 682 are true will either of the controlling NAND gates 691 and 692 have a true output. This is because only the first two test tube positions are used to hold the calibrating blank and standard solutions.

The second of these NAND gates 692 has a true output when the solution in the first test tube is being analyzed and represents the blank chemistry signal. The first of these NAND gates 691 has a true output only during the second analysis which is that of the known standard solution. The outputs of both of these NAND gates 691 and 692 are applied to the input of the NAND gate 666 whose output and inverted output is applied to all of the test selection NAND gates 658, 660, 669, 670, 674, and 675. A true signal on either of these inputs is used to gate the respective NAND gates so that the output of the multiply-divide selection circuit input NAND 662 is false during the calibration mode and true during a test mode. The output conductor 514 of this NAND 662, as has already been explained, is applied to one controlling NAND 532 and inverted and applied to the other controlling NAND 538 for setting or resetting the selection flip-flop 530. These NAND gates 532 and 538 are disabled until the 11th output line 590 of the line decoder 578 goes false.

The 12th line 591 of the line decoder 578 is applied to a NAND gate 696 in the calculation control. The output of this NAND gate 696 is applied to the NAND gate 456 which sets the calculation control flip-flop 454 as previously explained. To reiterate, the output of this flip-flop 454 is inverted by a NAND gate 460 and used to enable a NAND gate 462 whose other input is from the one megahertz clock 94. The enabling of this NAND gate 462 allows the master counter 104 to be clocked. If a calibration mode is under way, the one-hundred kilohertz output of the master counter will be applied to the clocking input of the percentage concentration counter 112 while the one-hundred kilohertz signal will also be multiplied by the contents of the optical density counter 108 in the digital rate multiplier 124 and applied to the calculation counter 110. If, on the other hand, a test is under way, the 100 master counter output will be applied to the calculation counter 110 and the digital rate multiplier output will be applied to the standard units value counter 112. The fill detector 128 resets the calculation control flip-flop 454, as also previously explained, and enables another NAND gate 458 which permits the printer to be clocked from a five kilohertz supply. The latter enablement is also dependent upon a print command originating in the programmer.

The 13th pulse received by the binary counter 572 which is decoded by the line counter 578 places a false signal on the 13th output line 592 of the decoder 578. This false signal on the 13th output line 592 is applied to a NOR gate 698 whose output is applied through a second NOR gate 616 to the preset input of the multiplication accumulator 118. This sequencing is used in the calibration mode to preset the standard units value into the multiplication accumulator 118 from the percentage concentration counter 112 during the calculation enablement by the calculation control flip-flop 454. During a test mode, however, another input 699 to the first NOR gate 698 has a true signal imposed on it by the three test mode NAND gates 558, 669 and 674. The output of these NAND gates is true whenever both inputs to their input NAND gate 666 are true signifying that the contents of either the first or second test tube is not being examined so that a test must be under way.

The 14th output line of the line decoder 578 is the next to go false. This output line 593 is used to initiate the print command to the printer logic 132. Its false signal is applied through two inverters 700 and 701 and inverted again by a third inverter 702 after having its pulse width extended by a capacitive and resistive combination 703. The output of the third inverter 702 is inverted once again by a NAND gate 704 before the print command signal is applied to the print gating NAND 458 which has already been enabled by the termination of a calculation mode by the calculation control flip-flop 454. The other input of this NAND gate 458 is a five kilohertz clock which is used to gate the printer logic sequencing as will hereinafter be described.

The next output line 594 of the line decoder 578 is applied to a NOR gate 706 which is enabled by its other input from the card reader which signifies that a kinetic test has been programmed. If this is the case, this NOR gate 706 will be enabled to put a true signal on its output which is used to initiate the operation of a one-shot 708. The subsequent false going output of this one-shot 709 is connected to reset the binary counter 572 when the one-shot is pulsed by the NOR gate 706. The pulse width of the one-shot output maintains this reset condition on the counter 572 until after the occurrence of the next clock pulse from the five kilohertz clock. The one-shot then times out so that the value preset into the sixteen line decoder 578 is a zero. This has the effect of putting a false signal on the first decoder output line 580 and begins a kinetic recycling of the line decoder outputs to re-read and re-evaluate the same test chemistry at later points in time. This kinetic recycling will continue until the kinetic recycle NOR gate 706 is disabled by its input line from the card reader. The number of recycles is controlled by the main control logic so that when the desired number of recycles has been completed the enabling line to this NOR gate 706 again goes true.

At the conclusion of a test or calibration mode, the 16th output line 595 of the line decoder 578 goes false to initiate a programmer stop and a reset sequence. This output 595 is applied to a NAND gate 712 whose output is inverted by an inverter 713 and applied to the reset input of the programmer control flip-flop 562 to reset that flip-flop and await the next program start pulse. The main sequencing of the 16 line decoder 578, as just described, is identical in the calibration mode for both end point reagent blank test and the end point serum blank test. The kinetic calibration mode, however, is different in some aspects. During the first time period when the fourth output line 583 of the decoder is false, which is used in the EPSB and EPRB to initiate a read command, an output of the kinetic calibration NAND gate 675 is inverted by an inverter 714 and used as an inhibiting input to the NOR gate 626 whose other input is the fourth decoder output line 583. The output of the inverter 714 is also used as an input for the NOR gate 646 which has, as another input, the 8th output line 587 from the decoder, which, for the other test modes, is the read command for the standard solution. These two NOR inputs from the inverter 714 are used to inhibit any reading during the kinetic calibration interval because the kinetic test does not rely on any test standard or test blank for its results but is concerned with changes in each of the examined test chemistries during a precise interval of time.

Each of the three test modes has its own particular requirements. The EPRB test requires the optical density of the blank test chemistry to be stored in the blank storage register 102 after the calibration process. The output of the EPRB test NAND gate 658 is applied as an inhibit to the NAND gate 602 which thereby prohibits the blank storage register 102 from being reset. The percentage concentration counter 112 as well as the multiplier accumulator 118 are inhibited from being reset during the EPRB, or actually any other test, by an inhibit line 699 which is true during any test, and which is connected to the output of each of the test NAND gates 658, 669 and 674. The output of the EPRB test NAND 658 is also applied through an inverting amplifier 714 to inhibit the operation of two NOR gates 644 and 640. The outputs of these NOR gates 644 and 640 thereby inhibit the presetting of the optical density counter 108 and the blank storage register 102, respectively.

The performance of a test implies that neither a test blank nor a standard solution is being analyzed. As previously explained, a true signal has been applied to the multiply and divide input conductor 514 to permit the subsequent one-hundred kilohertz master counter output to be applied to the calculation counter 110 and the digital rate multiplier output to be applied to the percentage concentration value counter 112. As also previously mentioned, the input conductor from the test NAND gates 658, 669 and 674 maintains an inhibit upon the multiplier accumulator preset so that at the conclusion of a test sequence, the test value is not preset into the multiplier accumulator as was the standard units value during the calibration mode.

The end point serum blank test is different from the end point reagent blank test in that two test chemistries are prepared from each serum sample. For this reason, the resetting of the blank storage register 102 is not inhibited when the first output line 580 of the line decoder goes false to reset that register. The presetting of the blank value into the blank storage register 102 when the fifth output line 584 of the 16 line decoder 578 goes false and the presetting of the nines complement of the contents of the blank storage register 102 into the optical density counter 108 on the next count is not inhibited in the EPSB because the value of the first chemistry must be subtracted from that of the second to arrive at the required results.

A kinetic test is different from the two end point tests in that the kinetic test is used to determine a net rate of change instead of taking a reading at only one interval of time. The kinetic test is such that three pairs of readings are taken to ensure that the reaction of the test chemistry was linear and was not affected by an environmental influence which would affect the test parameters. Each test chemistry is examined a total of six times. Since only two read signals are obtained for each complete cycle of the binary counter 572 in the programmer control, the 16th output line of the decoder 594 is used, as previously explained, to recycle the counter 572 and decoder 578. The recycling continues until a counter set in and by the main machine control logic places a true signal on the inhibit line 707 to the recycling NOR gate 706. The time between the two readings taken in each pair of readings must be precisely controlled from the main machine control logic. In the kinetic mode, read pulses are applied to the input of the NOR gate 543 whose other input is from the output of the program read pulse NAND gate 543 which inverts its input from the kinetic program inhibit gate 544. The kinetic read pulse train is also applied to a NOR gate 716 which is gated ON by a false signal from the card reader signifying a kinetic test has been programmed. This false signal is also inverted by a NOR gate 717 and used to inhibit the one-shot 538 output NOR gate 541.

Each of the kinetic read pulses occurring for a pair of readings are for a card programmed time interval, while the pairs of pulses are preferably four seconds apart. The kinetic read pulse train is applied by its read control NOR gate 545 to the input of the read control flip-flop 630 output NOR gate 634. The output signal of this NOR 634 is inverted by an inverter 636 and applied to the read command flip-flop 338.

The 16 line decoder 578 thereby recycles three times to complete a kinetic test of one test chemistry. At the conclusion of the test, the 16th output line 595 of this decoder 578 will go false to stop and reset the programmer as before explained.

The basic kinetic test presupposes that the optical density of the test chemistry will increase over the time of the test interval. There are, however, some tests which are performed which rely on a decrease in optical density of a solution from a known standard as the test chemistry is allowed to react. The ninth and tenth output lines 588 and 589 of the 16 line decoder 578, when sequentially pulsed with a false signal, are used to initiate the special conditions for the optical density loss kinetic test. The output of the 9th line 588 is applied as an input to one of the NOR gates 648 which control the presetting of the optical density counter content 108 into the blank storage register 102. When this line 588 goes false, the true output on the NOR gate 648 is applied to a second NOR gate 642 for presetting the blank storage register 102 with the difference in the optical density of the test chemistry determined from the first pair of readings.

The 10th decoder output line 589 is used as an input to a NOR gate 652 which controls, by means of two other NOR gates 620 and 624 and an inverter 622, the presetting of the optical density counter 108. The false signal on the 10th output line 589 of the decoder causes the optical density counter 108 to be preset with the nines complement of the difference value previously preset into the blank storage register 102. This nines complemented value of the net change in optical density during the interval between readings is then used to alter the master counter output in the digital rate multiplier 124. The effect of this is to recognize the negative change in the optical density occurring between readings.

Each cycling of the 16 line decoder 578 causes a false signal to occur on the 14th output line 593 of the decoder. The false signal on this line is the print enabling signal which controls a NAND gate 458 to allow a five kilohertz oscillator output to be gated to the printer. The printer logic 132 is responsible for supplying the printer 134 with the proper signals delineating the correct column and the information to be placed in that column.

The preferred embodiment of the invention processes the output signals from the program card read specifying the number of the test under way, the patient-identification number corresponding to the test chemistry being analyzed at that moment and the test results from the percentage concentration counter 112. The printer used is a conventional drum printer having a master drum and a secondary control drum. The master drum has a capability of 16 different characters and may print in all or part of 21 columns. The master drum has a magnetic disk on its surface which is detected by a magnetic detector once each time the master drum makes one revolution. The secondary drum has two magnetic disks on its surface which are in close proximity to one another. The secondary drum makes 16 revolutions for each revolution of the master drum. The magnetic disk on the master drum and the first occurring such disk on the secondary drum are detected at the same time to initiate a master reset signal and so that the next 16 pairs of signals from the secondary drum will be in synchronization with the characters presented on the master drum.

The printer logic 132 is shown in detail in FIG. 19 through FIG. 25. The pulse originating from the master drum disk detector (not shown ) is applied to a wave shaping circuit 720 for squaring the pulse and applying it to an output line 721. Similarly, the double pulses of the secondary drum are applied to a wave shaping circuit 722 and the resulting square pulses are applied to an output conductor 723. The output conductor 721 from the master drum pulse shaping circuit 720 is connected to the reset input 724 of a J-K flip-flop 725.

The occurrence of a master drum pulse resets this flip-flop 725 and places a false signal on its J output 726 and a true signal on its K output 727. The output line 723 from the secondary drum pulse shaping circuit 722 is connected to clock this J-K 725. The pulse coming from the master drum pulse shaping circuit 720 occurs at the same point in time as the first pulse in a pair of pulses coming from the secondary drum pulse shaping circuit 722. For this reason, the first such pulse from the secondary drum has no effect upon the J-K flip-flop 725 because the reset input 724 is held false by the pulse from the master drum pulse shaping circuit 720. The second and closely following second pulse from the secondary counter is applied, after shaping, to the clock input 728 of the flip-flop 725. The occurrence of this second pulse begins what will hereinafter be referred to as a window time. This window time extends until the occurrence of the first pulse from the secondary drum on its next revolution.

The first pulse from the secondary drum after the reset pulse, clocks the J-K flip-flop 725 to put a true output on its J output line 726 and a false on the K output line 727. The K output line 727 is connected to the input of a NAND gate 729 and an inverter 730. The NAND gate 729 inverts the true signal on the K output 727 and applies this false signal to the outputs of ten comparator output NAND gates 731 through 740 to remove an inhibit on these gates.

The output of the inverter 730 is applied through two NAND gates 741 and 742 to the reset input conductor 743 for a series of line storage flip-flops 744 through 750. The operation of these flip-flops will be described below.

The first in the pair of pulses from the secondary drum on its second revolution pulses the clock input 728 of the J-K flip-flop 725 to terminate the first window time. The resulting false going signal on the J output 726 clocks a window number counter 752 to put a one in that counter. The window number counter 752 is capable of storing a five bit binary number.

The first occurrence of the double secondary drum pulse signifies that the master drum has indexed to its first character position. This physical first position on the master drum contains the character zero in all 21 columns. A zero is looked for on all of the incoming lines from the standard units value counter 112, the patient-identification section of the control logic and the test number input from the card reader to determine if any zeros are to be printed. As will be described below, the presence of a zero on one of the input lines is detected by a series of comparator input NAND gates 753 through 757 whose outputs are compared with the outputs of the window number selector counter 752. If coincidence is ascertained, the output of a series of comparator output NAND gates 731 through 740 goes false. This false going signal is used to tell the remainder of the logic that one or more of the columns is to have a zero printed in it. A sweep register is then used to ascertain which column is to receive the zero character.

It has been found that to examine each of the 21 possible columns to see if that column is to get the character defined by the number of windows stored in the window counter 752 would require an inordinate amount of circuitry. For this reason, a time sharing of one group of seven general circuits is used thereby requiring the master drum to rotate three times instead of only once. To accomplish this, the occurrence of a master reset signal from the master drum shaping circuit 720 is applied to a conductor 760 which is connected to the reset input of a flip-flop 762, and to the reset inputs of three J-K flip-flops 763 through 765.

The K output 766 of the first of these J-K flip-flops 763 is connected to the inputs of two NAND gates 767 and 768. The J output 769 of this first flip-flop 763 is connected to the inputs of two more NAND gates 770 and 771. The J output 772 of the second J-K flip-flop 764 is connected to the clock input of the first J-K flip-flop 763 and to the second 767 and fourth 771 NAND gates. The K output 773 of the second flip-flop 764 serves as an input for the first 768 and third 770 of the NAND gates. The outputs of each of the first three NAND gates 768 through 770 is inverted by an inverting amplifier 774 through 776.

The output of the first inverter 774 is true during the first revolution of the master drum and then goes false as the second inverter 775 output goes true to signify the second revolution of the drum. Similarly, the third inverter 776 output goes true during the third revolution of the drum. These output signals are used to designate the three common groups of columns to be read on any given revolution of the master drum.

The two J-K flip-flops 764 and 763 are sequenced throgh the three common group designations I, II and III by a clocking conductor 777 leading from the two to the third output 778 of a recyclic four bit binary counter 779. The clocking for this binary counter 779 is provided through an inverter 780 and a NAND gate 781. The inputs for this NAND gate 781 come from the J output 726 of the J-K flip-flop 725 which clocks the window number counter 752. The other input to this NAND gate 781 is from the J output 782 of a J-K flip-flop 783. The J-K flip-flop 783 is set by an input from a NAND gate 784 whose inputs come from the K output 727 of the J-K flip-flop 725 which clocks the window selection counter 752. The other input to this NAND gate 784 is from the J output 785 of the J-K flip-flop 765 which resets the recyclable binary counter 778.

In operation, the J output 726 of the J-K flip-flop 725 clocking the window selection counter 752 goes false for every other input pulse it receives from the secondary drum. The true signal on the output of the NAND gate 781 is inverted in the inverter 780 and clocks the counter 779. The binary counter 779 continues to update until it has received its 16th clock pulse. At that time, the $2^3$ weighted output line 777 goes false which clocks the three phase selector J-K flip-flop 764 and which causes the J output 772 of this flip-flop 764 to go true and the K output 773 to go false. This removes the true signal on the output of the common group I inverter 774. The true signal on the J output of the first flip-flop 764 also causes the common group II output inverter 775 to have a true signal, signifying that the second phase sweep is under way. The inversion of the signals on the outputs 772 and 773 of the first flip-flop 764 also cause the output of the pseudo setting NAND gate 771 to go true. This true signal is applied by a conductor 786 to the clocking input of the third J-K flip-flop 765. The flip-flop 765 is not clocked by the positive going signal since it requires a false going signal for clocking purposes.

The common group II sweep is thereby initiated to cause the appropriate characters to be printed in the columns, where selected, of the master drum control during phase II. The second revolution of the master drum takes place, as mentioned above, as the secondary drum rotates 16 times. The resulting clock pulses to the J-K flip-flop 725 which clocks the window number selector counter 752 thereby causes the J-726 and K-727 outputs to toggle back and forth. This toggling is detected by the input NAND gate 781 and inverter 780 to the recyclable binary counter 779 to clock that counter sixteen times during the second revolution of the master drum. The 16th clock pulse again clocks the second J-K flip-flop 764 which causes the output of the common group II output inverter 775 to go false and the common group III output inverter 776 to have a true output. The second clock pulse applied to the second phase controlling JK 764 also causes the clocking of the first JK 763. The resulting true signal on the input of the preset NAND gate 771 does not change the NAND gate output since the other input to this NAND gate 771 has gone false.

Once again the 16 clock pulses are obtained by the binary counter 779 before clocking the second control J-K flip-flop 764. The toggling of the outputs of this flip-flop 764 causes the output of the pseudo preset NAND gate 771 to go false, which clocks the J-K flip-flop 765 connected to its output. The toggling of the outputs of this J-K flip-flop 765 places a false signal on the K output 785 and a true signal on the J output 786. The J output 786 resets the NAND gate 784 to inhibit further setting pulses for the connected J-K flip-flop 783 from the K output 727 of the comparator control J-K flip-flop 725. The false K output 785 of the resetting flip-flop 765 resets the binary counter 779 and is inverted by two parallel inverters 788 and 790 to reset the digital comparator enabling gate latching flip-flop 783 and to enable the paper and ribbon advance in the printer (not shown).

The output of the pseudo preset NAND gate 771 is also applied to the resetting input of the control flip-flop 762 which it resets. The resulting signal on the output of this flip-flop 762 resets the first and second control J-K flip-flop 763 and 764 to return the output of the common group I inverter 774 to a true signal, which thereby is defined as the common group I condition.

The sequencing of the three printer common group signals I, II and III by the recyclic binary counter 779 is continuous because the master drum and the secondary drum in the printer are constantly rotating. This constant rotation applies pulses to the J-K flip-flop 725 which then accordingly clocks the window number selection counter 752. The recyclic counter 779 in the common group selection circuit is necessary to insure that all 16 indexes of the master drum are performed to permit all of the characters on the drum to be printed if they correspond to some printer logic character input. The print command from the programmer 98 is applied to the setting input of the binary counter control flip-flop 765. Until a print enable signal is received from the programmer this line remains true to hold a reset on the binary counter 779 and a reset on the flip-flop 783 with whose J output 782 is the digital comparator enabling signal applied to the NAND gate 741 in the comparator control.

The 5 kilohertz clocking input which is supplied to the printer from a gating NAND gate 548 and enabled by the calculation control flip-flop 545 as well as the print command NAND gate 703 is applied to a four bit binary counter 792. The output lines 793–796 of this counter 792 are then updated at a 5 kilohertz rate. The signals on these output lines 793 through 796 then pass through a four to ten line decoder 798. The first seven outputs 800 through 806 of this decoder 798 are inverted by inverters 807 through 813. The outputs of these inverters 807 through 813 change sequentially as the counter 792 counts from one to seven.

The inverter outputs are the seven column select scanning signals A through G. These signals, when gated with the I, II and III common group signals are used to scan through all twenty-one columns of the master drum during its three revolutions to initiate the printing of any character in any column. The common group I signal and the column scanning select signals A through G examine columns 1, 4, 7, 10, 13, 16 and 19. Common group II examines columns 2, 5, 8, 11, 14, 17 and 20 as the column select scanners scan from A to G. Common group III and the column select scanners together scan the remaining columns 3, 6, 9, 12, 15, 18 and 21. The preferred embodiment of the invention, however, uses only columns 3 to 6 for the test results, columns 9 and 10 for the patient-identification number and columns 12 and 13 for the test identification number. The combination of the A through G signals and the I through III signals are inhibited when any other columns are selected.

This inhibition is done by a series of 10 NAND gates 814 through 823. The operation of these NAND gates may be explained by way of example. As mentioned above, only columns 3 to 6, 9 to 10, and 12 to 13 are used by the printer logic so that, for instance, when column 8 is designated by the column select scanning signal output and the common group signal output, the digital comparator NAND gates 753 through 757 must be inhibited to prevent anything from being printed in that column. The column 8 signal is designated by the occurrence of the C columns select signal which occurs during the ON time of the common group II. These two signals are applied to one of the NAND gates 818 to make the output of the NAND gate 818 go true to inhibit the comparator input NAND gates 753 through 757. The last three output lines 824 through 826 of the 4 to 10 line decoders 798 are connected through a NAND gate 827 whose output signal is inverted by a NAND gate 814 to place an inhibit on the digital comparator NAND gates 753 through 757 whenever these last three lines go true.

The four place test results, as mentioned above, are printed in columns 3 through 6. Four input lines from each digit of the percentage concentration counter 112 where the test results are finally stored are applied to NAND gates 830 through 833, 834 through 837, 838 through 841 and 842 through 845. The four NAND gates 830 through 833 associated with the 1.0 digit of the percentage concentration counter 112 are all inhibited by the output of a NAND gate 846 which inverts the output of another NAND gate 847. The latter NAND gate 847 has two inputs, one from the column select A signal and one from the common group III signal. The occurrence of a false signal on both of these input lines signifies, as explained above, that the number to be printed in column 3 is ready to be read. Both of these false signals on the input of the NAND gate 847 releases the inhibit on the input NAND gates 830–833 from the units digit of the standard units value counter 112. The true and false signals corresponding to that number from the units digits are then transferred to output lines 848 through 852 which are connected to the inputs of the comparator input NAND gates 753 through 757.

In a similar manner, common group I and column select signal B is applied to a NAND gate 853 whose output is inverted by an inverter 854 and used to release the inhibit on the NAND gates 834 through 837 which receive the true and false signals representing the number in the 10's digit of the percentage concentration counter 112. The outputs of these NAND gates are also applied to the common output lines 848 through 852. The 100's digit input from the percentage concentration counter 112 are inhibited by the signal from an inverter 855 and a NAND gate 856 until the occurrence of common group II and the B column selection signal. The last digit of the percentage concentration counter 112 is inhibited by the output signals from an inverter 857 and a NAND gate 858 until the occurrence of common group III and the B column selection signal. The three NAND gates 853, 856 and 858 also receive an input from the decimal point placement logic as will be described hereinafter.

In a manner similar to that in which the percentage concentration counter digits were applied to the printer logic, the patient-identification numbers to be printed in columns 9 and 10 are applied to two groups of four NAND gates each 860 and 861. Each of these groups of NAND gates 860 and 861 has four input lines which are weighted binarily from one to eight. The inhibit for the units digit NAND gate 860 is provided from an inverter 862 which inverts the output of a control NAND gate 863. The inputs to this NAND gate 863 are the common group I output line and the column selection D signal output line. The NAND gates associated with this digit 860 are inhibited until the concurrent occurrence of both of these signals.

In a similar manner the second group of NAND gates 861 is inhibited through an inverter 864 and a NAND gate 863 until the occurrence of the C column selection signal simultaneously with the common group III signal.

The comparator input from the test identification number which is to be printed in columns 12 and 13 is also provided by two groups of four NAND gates 866 and 867 which receive their numerical input from the test identification number from the program card reader and their inhibitor from an inverter and NAND gate 868 and 869. The output of the NAND gate grouping 866 corresponding to column 12 is inhibited until the occurrence of common group III and the column selection D signal while the NAND gate grouping 867 in column 13 is inhibited until the occurrence of the column selection E signal along with the common group I.

The common group numbers I, II and III are each present for a complete revolution of the master drum. During each revolution of the master drum, the magnetic disk on the surface of the secondary drum pass by their detector sixteen times so that the window number selection counter 752 counts from zero to 15 for each master drum revolution. The time interval between the detection of the second in the pair of magnetic disks on the secondary drum and the subsequent occurrence of the first such disk on the next revolution of the drum defines the window time. This is approximately 16 milliseconds. Concurrently with this, the column selection scanner signals A-G originate from a counter 792 which is being clocked at a 5 kilohertz rate. This results in the repetition of each of the column scanning signals A-G approximately five times during each window time.

The number of the particular window, i.e., zero to 15, corresponds to a character on the master drum. During the first window time only the character zero may be printed, during the second window time only the character one may be printed, only during the third window time may a character two be printed, etc. As mentioned previously in connection with the window number selection counter 752, this counter remains at zero during the first window time. At the conclusion of the first window time this counter 752 is clocked by the toggling of the outputs of its controlling J-K flip-flop 725 to increase its count by one. The output of the window number counter 752 is then one during the second window time which is the same as the character to be printed during that time, i.e., the character "I." The output of the window number counter 752 is always the character which may be printed by the master drum at that point in time. The sweeping of the column selection signals from A to G during the first window time and, assuming that this is the first rotation of the master drum so that the common group I signal is also false, will cause the tens digit of the standard units value counter 112 to be applied to the comparator input lines 848 through 852 upon occurrence of the D signal; will cause the second digit of the patient-identification number to be presented to the comparator lines 848 through 852 upon occurrence of the E signal. Since this is the first window, the window number selector counter 752 will have a zero output.

The presentation by any of these three information digits of the comparator input line 848 through 852 during their respective ON times, signifies that one or more of these digits is to receive a "O." The resulting true output on one of the comparator NAND gates 731 through 740 enables all the NAND gates 870 through 876 in the line storage section. The other inputs to these line storage NAND gates 871 thorugh 876 are obtained from the G through A column scanning signals, respectively. The enablement of these NAND gates which occurs as a result of a zero being read during one of the column scanning signals A-G places a false output on the NAND 870 through 876 whose input is from that particular column signal A through G. The false signal sets the associated one of the line storage flip-flops 744 through 750. The outputs of these flip-flops are each applied to a transistor amplifier 877 through 883. When any of these line storage flip-flops 744 through 750 are set by the detection of coincidence between a character and a particular position of the master drum, the corresponding transistor amplifier 877 through 883 is activated to apply a ground to one side of printer hammer coils in the printer mechanism. The other side of these coils already has voltage applied to it from three other transistor amplifiers 884 through 886 which are turned ON by the common group signals I through III, respectively. Only one printer hammer may thereby be activated at any given time.

The secondary printer drum pulses the window number counter controlling flip-flop 725 each time it makes a revolution to increase the window number count by one. During each window interval, the column scanning signals are swept five times to ensure that the character corresponding to that window number will be printed in the correct column if such character is present on any of the input lines from the test identification number, the patient-identification number or the test results. The conclusion of the first 16 windows is noted by the recyclic binary counter 779 which controls the common group numbers I through III. This counter 779 then clocks its corresponding control J-K flip-flop 764 to initiate the common group II signal. Once again the system goes through 16 window times during which all of the inputs associated with common group II are examined for each of the characters. These too are printed under the control of the line storage flip-flops 744 through 750. The same process is again repeated for the common group III sweep.

The decimal point placement in the test results in column 3 through 6 is placed after the number in either column 4, 5, or 6. The decimal point is carried in the 11th row on the master drum so that when the window selection counter has reached a count of 11, the comparator input lines 848 through 852 are examined for that number. The decimal point placement is selected by the program card in the card reader. The card reader has three decimal point output lines 888, 889 and 890 corresponding to columns 4, 5, and 6, respectively. These become input lines 888 through 890 to the printer logic. Their respective signals are inverted in inverters 891 through 893 before application to three controlling NAND gates 894 through 896. These NAND gates 894 through 896 are sequentially gated ON and OFF by the occurrence of the common groups I, II and III during the column selection D signal. In a manner similar to that for a numerical character, the outputs of these NAND gates 894 through 896 are applied through another NAND gate 897 to a series of five NAND gates 898 through 902 which, when receiving a signal from the preceding NAND gate 897 automatically places the equivalent of the number 11 on the comparator input lines 848 through 852.

The placing of a decimal point in columns 4, 5 or 6 is in effect an offset double strike in that column since that column will also have a number in it. The inhibiting of the three NAND gates 853 through 858 associated with the test results to be printed in columns 4, 5 and 6 are inhibited by an input line 898 from the last digit of the window number counter 752. This line goes true when the window number counter 752 has counted to 16. The other output line 899 of the last digit in the counter 752 goes false at this time. This latter output line 899 is used to inhibit the three decimal point NAND gates 888 through 890 before the count of 16 is reached.

The present invention provides a calculation system and method susceptible of use with other photo-optical inspection apparatus. Various modifications and departures may be made from the preferred embodiment shown within the scope of the invention in its broader aspects. For example, the output device may be a digital display which is selectively energized by a modification of the printer logic just described.

We claim:

1. An apparatus for determining the concentration of an element in a solution, which comprises analyzation means for determining the light transmittance of a solution and for generating a first analog signal in accordance therewith; said analyzation means being adaptable for determining the light transmittance of a reference substance and for generating a second analog signal in accordance therewith; conversion means for generating a first digital signal from said first and second analog signals, said first digital signal having a first numerical value associated therewith as representative of the optical density of said solution; and calculation means for calculating the percentage concentration of the element in said solution from said first digital signal, said calculation means including generation means for generating and storing a second digital signal having a second numerical value associated therewith representative of the concentration of the element needed in said solution for said first numerical value to equal one; a digital pulse generator for generating a first digital pulse train having pulses occurring at a predeterminable frequency and having first and second outputs; frequency alteration means coupled to said conversion means and said first generator output for altering said frequency in accordance with said first digital signal whereby a second digital pulse train is generated; first counting means coupled to said second generator output for counting the pulses occurring in said first pulse train; second counting means coupled to said frequency alteration means for counting the number of pulses occurring in said second pulse train; detection means for detecting when the number of said first pulse train pulses counted by said first counting means equals said second numerical value and for inhibiting said digital pulse generator when the equation occurs, whereby the number of pulses counted by said second counting means prior to the inhibiting of said generator represents the numerical value of the concentration of the element in said first solution.

2. An apparatus as claimed in claim 1 wherein said analyzation means includes a spectrophotometer having light sensitive means for generating said first and second analog signals and automatic feedback means for adjusting the supply voltage to said light sensitive means in accordance with changes in the operating characteristics of said spectrophotometer.

3. An automatic method for determining the percentage concentration of an element in a solution, which comprises the steps of reading the value of the light transmittance of the solution; computing the optical density value of the solution from said light transmittance value; multiplying said optical density value by a scale factor value, said scale factor value being equal to the percentage concentration value of the element which would cause the optical density value to equal one, said multiplying step including generating a first digital pulse train having pulses reoccurring at a predeterminable frequency; counting and storing the number of pulses generated in said first pulse train; generating a second digital pulse train identical to said first pulse train; altering the frequency of said second pulse train in accordance with the optical density of said solution; counting and storing the number of pulses in the thereby altered second pulse train; comparing the stored number of pulses from said first pulse train with said scale factor value; and stopping the generating of said first and second pulse trains when the stored number of from said first pulse train equals said scale factor value, whereby the stored number of pulses having occurred in said altered pulse train represents the percentage concentration of the element in the solution; and storing the resulting value of said multiplying step.

4. An apparatus for determining the concentration of an element in a solution, which comprises analyzation means for determining the value of the optical density of the solution, said analyzation means including optical means for determining the light transmittance of the solution and for generating an analog signal in accordance therewith, conversion means for converting said analog signal to a digital signal representative of the value of the optical density of the solution, and first storage means for storing said digital signal, said analyzation means also being for determining the optical density value of a standard solution having a known concentration value of the element therein, and for determining the optical density value of a blank solution; calculation means for determining a value for a standardizing scale factor representing the concentration of the element in the solution needed for said optical density value to equal one, said calculation means including subtraction means for taking the difference between the optical density value of the standard solution and the optical density value of the blank solution and for storing the difference value thereby obtained in said first storage means, second storage means for storing said known concentration value of said standard solution, and division means for dividing said known concentration by said difference stored in said first storage means to obtain said standardizing scale factor; multiplication means for multiplying said determined optical density by said scale factor value thereby obtaining the value of the concentration of the element in the solution; and display means for presenting said concentration value.

5. An apparatus for determining the concentration of an element in a solution, which comprises analyzation means for determining the value of the optical density of the solution; calculation means for determining a value for a standardizing scale factor representing the concentration of the element in the solution needed for said optical density value to equal one; multiplication means for multiplying said determined optical density value by said scale factor value thereby obtaining the value of the concentration of the element in the solution, including a digital signal generator having first and second outputs for generating a first digital signal having a predetermined frequency on said first and second outputs, a digital rate multiplier coupled to said first generator output and to said analyzation means for altering said digital frequency on said first output in accordance with said optical density value to generate a second digital signal, first storage means for storing a third digital signal representative of said scale factor value, second storage means coupled to said digital rate multiplier for storing said third digital signal, said first storage means being coupled to said second generator output for receiving said first digital signal, and detection means for detecting when the value of said first digital signal equals the value of said third digital signal stored in said first storage means and for inhibiting said generator concurrently with such detection whereby the value of said second digital signal in said second storage means equals the concentration of the element in the solution.

6. An apparatus for determining the concentration of an element in a solution, which comprises analyzation means for determining the value of a parameter characteristic of the solution and the value of said parameter for a standard solution having a known concentration of the element therein; calculation means for determining a value for a standardizing scale factor representing the concentration of the element in the solution needed for said parameter value to equal a predetermined value, said calculation means including arithmetic means for operating on said parameter value for said standard solution in computing said standardizing scale factor value, said arithmetic means also being for operating on said parameter of the solution with said standardizing scale factor to compute the concentration of the element in the solution.

7. An apparatus as claimed in claim 6, wherein said analyzation means includes means for determining the value of said parameter for a blank solution, and wherein said arithmetic means includes means for operating on said parameter value for said blank solution in addition to said parameter value for said standard solution in computing said standardizing scale factor value.

8. An apparatus as claimed in claim 6, wherein said analyzation means also being for determining the value of said parameter for a blank solution, and said arithmetic means includes subtraction means for taking the difference between said standard solution parameter value and said blank solution parameter value and for storing the difference value thereby obtained, storage means for storing said known concentration value of said standard solution, and division means for dividing said known concentration value by said difference value stored in said subtraction means to obtain said standardizing scale factor.

9. An automatic method for determining the percentage concentration of an element in a solution, which comprises the steps of reading the value of a parameter characteristic of the solution; reading the value of said parameter for a standard solution having a known concentration of the element therein; calculating a value for a standardizing scale factor representing the concentration of the element in the solution needed for said parameter of the solution to equal a predetermined value by arithmetically operating on said parameter value for said standard solution; multiplying the calculated scale factor by the value of said parameter for said solution; and storing the result of said multiplying step whereby said result is the value of the percentage concentration of the element in the solution.

10. A method as claimed in claim 9 including the step of reading the value of said parameter for a blank solution and said calculating step includes the steps of subtracting the standard solution parameter value from the blank solution parameter value, storing the difference value obtained in said calculating step, storing the value of the known concentration of said standard solution and dividing said known concentration value by said difference value to obtain the value for said standardizing scale factor.

* * * * *